US008436897B2

(12) United States Patent
Naruoka et al.

(10) Patent No.: US 8,436,897 B2
(45) Date of Patent: May 7, 2013

(54) ARTICLE ESTIMATING APPARATUS AND ARTICLE POSITION ESTIMATING APPARATUS, ARTICLE ESTIMATING METHOD AS WELL AS ARTICLE ESTIMATING PROGRAM

(75) Inventors: Tomonobu Naruoka, Kanagawa (JP); Toru Tanigawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 701 days.

(21) Appl. No.: 12/696,384

(22) Filed: Jan. 29, 2010

(65) Prior Publication Data

US 2010/0134611 A1    Jun. 3, 2010

Related U.S. Application Data

(63) Continuation of application No. PCT/JP2009/003123, filed on Jul. 6, 2009.

(30) Foreign Application Priority Data

Jul. 8, 2008    (JP) .................................. 2008-177996

(51) Int. Cl.
*H04N 7/18* (2006.01)
*G06K 9/00* (2006.01)
(52) U.S. Cl.
USPC ............................................ 348/77; 382/103
(58) Field of Classification Search ..................... 348/77, 348/48, 135, 170, 169, 352; 382/103, 190, 382/218; 340/572.1, 568.1, 573.1
See application file for complete search history.

(56) References Cited

U.S. PATENT DOCUMENTS

| 2006/0111811 | A1* | 5/2006 | Okamoto et al. | ............. 700/214 |
| 2006/0184279 | A1* | 8/2006 | Okamoto et al. | ............. 700/245 |
| 2009/0021381 | A1* | 1/2009 | Kondo et al. | ............. 340/573.1 |
| 2009/0066513 | A1* | 3/2009 | Kondo et al. | ............. 340/572.1 |

FOREIGN PATENT DOCUMENTS

| JP | 7-160665 | 6/1995 |
| JP | 2002-27449 | 1/2002 |
| JP | 2006-92530 | 4/2006 |
| JP | 2007-79918 | 3/2007 |
| JP | 2007-213528 | 8/2007 |
| WO | 2006/109423 | 10/2006 |
| WO | 2007/015548 | 2/2007 |
| WO | 2007/074671 | 7/2007 |

OTHER PUBLICATIONS

International Search Report issued Aug. 4, 2009 in International (PCT) Application No. PCT/JP2009/003123.
International Preliminary Report on Patentability issued Mar. 10, 2011 in International (PCT) Application No. PCT/JP2009/003123.

* cited by examiner

*Primary Examiner* — Behrooz Senfi
(74) *Attorney, Agent, or Firm* — Wenderoth, Lind & Ponack, L.L.P.

(57) ABSTRACT

The apparatus is provided with a holding-state registering database in which an article and a holding state at the time of transporting the article are registered in association with each other, holding-state determination processing device that determines, when a person is transporting an object article, how the object article is held, and first article candidate extraction device that extracts, among articles registered in the holding-state registering database, an article whose holding state, determined by the holding-state determination processing device, is registered therein, as a candidate article.

14 Claims, 39 Drawing Sheets

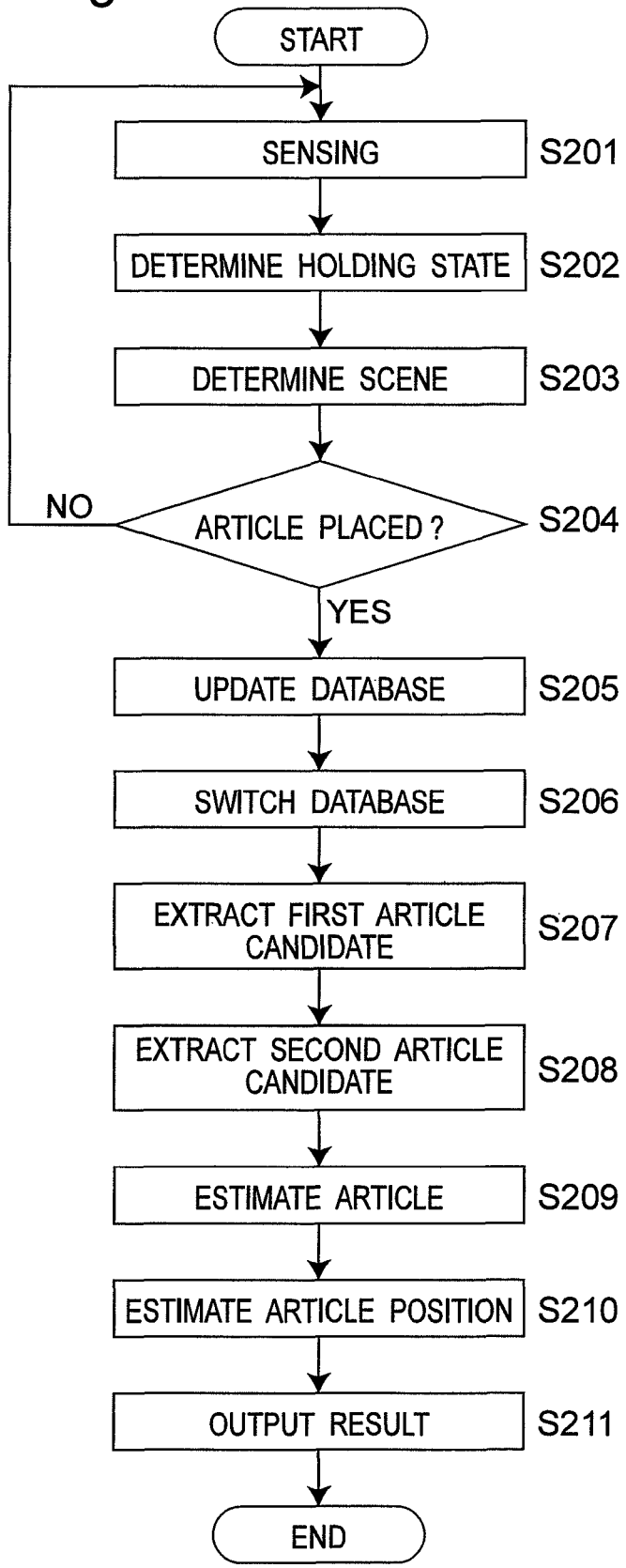

| TIME | POSITION | ARTICLE CANDIDATE |
|---|---|---|
| t11 | (30, 30) | A001<br>A002<br>A003<br>A004<br>A006<br>A007 |
| t11 | (100, 70) | A003 |
| : | : | : |
| t99 | (270, 50) | A002<br>A004<br>A005<br>A007 |
| t99 | (100, 70) | A003 |
| : | : | : |

102

| PERSON ID | PERSON NAME |
|---|---|
| B001 | HANAKO (MOTHER) |
| B002 | TARO (FATHER) |
| B003 | ICHIRO (CHILD) |
| : | : |

| TIME | PERSON ID | POSITION |
|---|---|---|
| : | : | : |
| t21 | B001 | (91, 40) |
| t22 | B001 | (93, 41) |
| t23 | B001 | (95, 42) |
| : | : | : |

BACK SIDE IMAGE

PALM SIDE IMAGE

BACK SIDE IMAGE

1501

PALM SIDE IMAGE

1501

1502

1502

1701

1702

1703

1704

1705

1706

1701A

1702A

1703A

1802

1803

1804

1805

1801A

1802A

1803A

Fig.18I
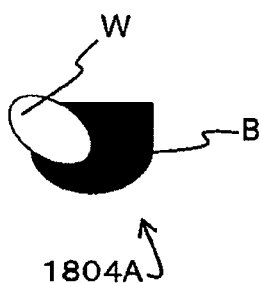
1804A
Fig.18J
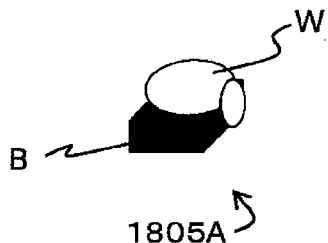
1805A
Fig.19
| TIME | PERSON ID | HOLDING-STATE ID |
|---|---|---|
| t1 | B001 | C000 |
| t2 | B001 | C000 |
| : | : | : |
| t10 | B001 | C000 |
| t11 | B001 | C001 |
| t12 | B001 | C001 |
| : | : | : |
| t98 | B001 | C001 |
| t99 | B001 | C001 |
| t100 | B001 | C000 |
| : | : | : |
1901  1902  1903  108

Fig.20A
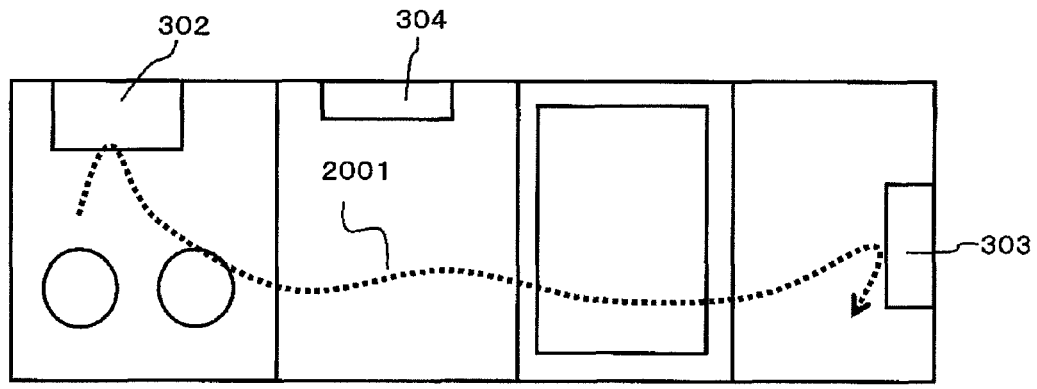
Fig.20B
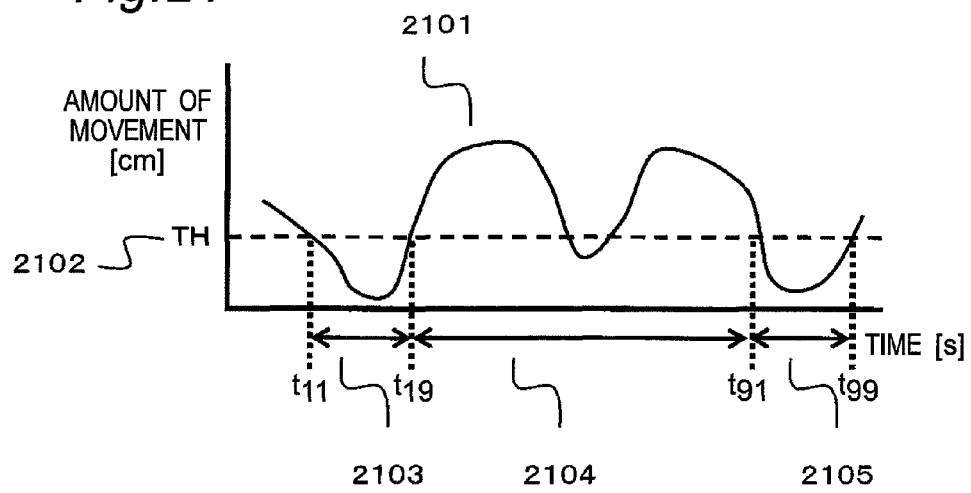
Fig.21

| TIME | PERSON ID | SCENE DETERMINATION RESULT |
|---|---|---|
| t11 | B001 | TAKING-UP SCENE |
| t12 | B001 | TAKING-UP SCENE |
| : | : | : |
| t19 | B001 | TAKING-UP SCENE |
| t20 | B001 | TRANSPORTING SCENE |
| : | : | : |
| t91 | B001 | PUTTING-DOWN SCENE |
| : | : | : |
| t98 | B001 | PUTTING-DOWN SCENE |
| t99 | B001 | PUTTING-DOWN SCENE |

2201   2203   2202   110

2301

| PERSON ID | ARTICLE ID | ITEM NAME | ARTICLE HOLDING STATE | | |
|---|---|---|---|---|---|
| | | | TAKING-UP SCENE | TRANSPORTING SCENE | PUTTING-DOWN SCENE |
| B001 | A001 | GLASS 1 | C006 C002 | C006 | C006 C002 |
| B001 | A002 | GLASS 2 | C006 | C006 | C006 |
| B001 | A003 | MUG 1 | C001 | C001 | C001 |
| B001 | A004 | MUG 2 | C001 | C001 | C001 |
| B001 | A005 | MUG 3 | C001 | C001 | C001 |
| B001 | A006 | PLATE 1 | C005 C001 | C005 | C005 |
| B001 | A007 | PLATE 2 | C005 C001 | C005 | C005 |
| B001 | A008 | TEAPOT 1 | C001 | C001 | C001 |
| B001 | A009 | KNIFE 1 | C003 C004 | C003 C004 | C003 C004 |
| B001 | A010 | FORK 1 | C003 C004 | C003 C004 | C003 C004 |
| B001 | A011 | SPOON 1 | C003 C004 | C003 C004 | C003 C004 |
| ⋮ | ⋮ | ⋮ | ⋮ | ⋮ | ⋮ |
| B002 | A001 | GLASS 1 | C006 C002 | C006 | C006 C002 |
| ⋮ | ⋮ | ⋮ | ⋮ | ⋮ | ⋮ |

| TIME | POSITION | ARTICLE ESTIMATED RESULT |
|---|---|---|
| t99 | (270, 50) | A002 A013 |

| TIME | POSITION | ARTICLE ESTIMATED RESULT |
|---|---|---|
| t99 | (270, 50) | A013 |
| t99 | (100, 70) | A002 |
| t99 | (150, 40) | A001 A008 |
| t99 | (70, 20) | A003 A005 A008 |
| : | : | : |

INPUT ITEM NAME TO SEARCH

TEAPOT

SEARCHED ARTICLE IS PRESENT AT POSITION (70, 20) OR (150, 40)

| TIME | POSITION | ARTICLE CANDIDATE |
|---|---|---|
| t11 | (30, 30) | A009<br>A010<br>A011 |
| : | : | : |
| t99 | – | – |

| TIME | PERSON ID | SCENE DETERMINATION RESULT |
|---|---|---|
| t11 | B001 | TAKING-UP SCENE |
| t12 | B001 | TAKING-UP SCENE |
| : | : | : |
| t19 | B001 | TAKING-UP SCENE |
| t20 | B001 | TRANSPORTING SCENE |
| : | : | : |
| t91 | B001 | TRANSPORTING SCENE |

3502

| TIME | PERSON ID | HOLDING-STATE ID |
|---|---|---|
| t1 | B001 | C000 |
| t2 | B001 | C000 |
| : | : | : |
| t10 | B001 | C000 |
| t11 | B001 | C004 |
| t12 | B001 | C004 |
| : | : | : |
| t19 | B001 | C004 |
| t20 | B001 | C004 |
| : | : | : |
| t91 | B001 | C004 |
| t92 | B001 | C000 |
| : | | |
| t98 | B001 | C000 |
| t99 | B001 | C000 |
| t100 | B001 | C000 |
| : | : | : |

Fig.35A

| PERSON ID | B001 | | | |
|---|---|---|---|---|
| PLACE | KITCHEN | | | |
| ARTICLE ID | ITEM NAME | ARTICLE HOLDING STATE | | |
| | | TAKING-UP SCENE | TRANSPORTING SCENE | PUTTING-DOWN SCENE |
| : | : | : | : | : |
| A009 | KNIFE 1 | C003 C004 | C003 C004 | C003 C004 |
| A010 | FORK 1 | C003 C004 | C003 C004 | C003 C004 |
| A011 | SPOON 1 | C003 C004 | C003 C004 | C003 C004 |
| : | : | : | : | : |

Fig.35B

| PERSON ID | B001 | | | |
|---|---|---|---|---|
| PLACE | LIVING ROOM, DINING ROOM | | | |
| ARTICLE ID | ITEM NAME | ARTICLE HOLDING STATE | | |
| | | TAKING-UP SCENE | TRANSPORTING SCENE | PUTTING-DOWN SCENE |
| : | : | : | : | : |
| A009 | KNIFE 1 | C003 | C003 | C003 |
| A010 | FORK 1 | C003 C004 | C003 C004 | C003 C004 |
| A011 | SPOON 1 | C003 C004 | C003 C004 | C003 C004 |
| : | : | : | : | : |

| TIME | POSITION | ARTICLE CANDIDATE |
|---|---|---|
| t11 | (120, 50) | A004 |
| : | : | : |

| TIME | PERSON ID | SCENE DETERMINATION RESULT |
|---|---|---|
| t11 | B001 | TAKING-UP SCENE |
| t12 | B001 | TAKING-UP SCENE |
| : | : | : |
| t19 | B001 | TAKING-UP SCENE |
| t20 | B001 | TRANSPORTING SCENE |
| : | : | : |
| t98 | B001 | PUTTING-DOWN SCENE |
| t99 | B001 | PUTTING-DOWN SCENE |

4002

| TIME | PERSON ID | HOLDING-STATE ID |
|---|---|---|
| t1 | B001 | C000 |
| t2 | B001 | C000 |
| : | : | : |
| t10 | B001 | C000 |
| t11 | B001 | C006 |
| t12 | B001 | C006 |
| : | : | : |
| t19 | B001 | C006 |
| t20 | B001 | C006 |
| : | : | : |
| t98 | B001 | C006 |
| t99 | B001 | C006 |
| t100 | B001 | C000 |
| : | : | : |

123

| ARTICLE ID | ITEM NAME | ARTICLE HOLDING STATE | | |
|---|---|---|---|---|
| | | TAKING-UP SCENE | TRANSPORTING SCENE | PUTTING-DOWN SCENE |
| A001 | GLASS 1 | C006 C002 | C006 | C006 C002 |
| A002 | GLASS 2 | C006 | C006 | C006 |
| A003 | MUG 1 | C001 | C001 | C001 |
| A004 | MUG 2 | C001 C006 | C001 C006 | C001 C006 |
| A005 | MUG 3 | C001 | C001 | C001 |
| A006 | PLATE 1 | C005 C001 | C005 | C005 |
| A007 | PLATE 2 | C005 C001 | C005 | C005 |
| A008 | TEAPOT 1 | C001 | C001 | C001 |
| A009 | KNIFE 1 | C003 C004 | C003 C004 | C003 C004 |
| A010 | FORK 1 | C003 C004 | C003 C004 | C003 C004 |
| A011 | SPOON 1 | C003 C004 | C003 C004 | C003 C004 |
| : | : | : | : | : |

| TIME | POSITION | ARTICLE ESTIMATED RESULT |
|---|---|---|
| t99 | (270, 50) | A001 |
| : | : | : |

117

ARTICLE ESTIMATING APPARATUS AND ARTICLE POSITION ESTIMATING APPARATUS, ARTICLE ESTIMATING METHOD AS WELL AS ARTICLE ESTIMATING PROGRAM

This is a continuation application of International Application No. PCT/JP2009/003123, filed Jul. 6, 2009.

BACKGROUND OF THE INVENTION

The present invention relates to an article estimating apparatus that estimates articles such as daily necessities or office supplies that are handled by a user in environmental space, such as a home or an office, and also relates to an article position estimating apparatus that finds a position of the estimated article and an article estimating method, as well as an article estimating program.

Articles such as daily necessities or office supplies, located in living space, such as a home or an office (hereinafter, referred to as "environmental space"), are normally placed at various positions, such as on a desk or on a shelf. In an attempt to detect articles in such places, for example, by using an image sensor, a problem arises in which one portion or an entire portion of an object article is concealed by another article or furniture, and is not identified properly.

In order to solve such a problem, as a conventional technique for detecting an article, there has been proposed a technique of recognizing an article based upon movements of fingers trying to grab an object article (Patent Document 1). FIG. 41 is a block diagram showing the conventional article recognizing device described in Patent Document 1.

Movements of fingers to try to grab an object article are detected by a movement detection unit 1. An amount of feature is extracted from finger movement data detected by the movement detection unit 1, by a feature extracting unit 2. In a neural network unit 3, by using preliminarily set learning data, the amount of feature extracted by the feature extraction unit 2 is learned. Based upon the result of learning of the neural network unit 3, a determination unit 4 carries out a recognizing process on the object article.

Upon trying to grab an object article, a person executes an action referred to as "pre-shaping" in which a shape of a hand is prepared in accordance with the shape of the object article, and the above-mentioned method utilizes this action.

PRIOR ART DOCUMENT

Patent Document

Patent Document 1: JP-A No. 7-160665

SUMMARY OF THE INVENTION

In life space such as a home or an office, however, there are various kinds of articles such as daily necessities or office supplies. In these circumstances, in the case where the conventional technique is applied, since a recognizing process is carried out based upon detected movements of fingers and a shape of an object article, when there are a large number of articles having the same shape, a problem arises in that many candidates for the object article are inevitably present.

The present invention has been devised to solve the above-mentioned problems, and an object of the present invention is to provide an article estimating apparatus which, even in the case when one portion or the entire portion of an object article is concealed and when a large number of articles having the same shape are present, can estimate the object article, an article position estimating apparatus that can find the position of the object article and an article estimating method, as well as an article estimating program.

In order to achieve the above-mentioned object, the present invention has the following structures:

According to a first aspect of the present invention, there is provided an article estimating apparatus comprising:

an article sensing unit that detects information of positions of a plurality of articles located in environmental space;

a hand sensing unit that detects information of a position of a hand of a person that exists in the environmental space;

a holding-state determination processing unit that determines a positional relationship between the information of the position of the article and the information of the position of the hand, respectively detected by the article sensing unit and the hand sensing unit, as a holding state of the article by the hand; and an article estimating unit that estimates an article whose ID corresponds to the information of the holding state determined by the holding-state determination processing unit as the article held by the person, based upon a holding-state registering database in which the holding state of each article by the person is registered as a positional relationship between the article and the hand of the person, for each ID of the article.

According to a second aspect of the present invention, there is provided an article estimating apparatus comprising:

an article sensing unit that detects ID information of a plurality of articles located in environmental space and information of positions of the articles so as to register the detected information in an article detection history database;

a hand sensing unit that detects ID information of a person existing in the environmental space and information of a position of a hand of the person so as to register the detected information in a hand detection history database;

a holding-state determination processing unit that determines a holding state of the article by the hand based upon a positional relationship between the positional information of the article and the positional information of the hand, respectively detected by the article sensing unit and the hand sensing unit and registered in the article detection history database and the hand detection history database, so as to register information of the determined holding state in a holding-state determination result history database for each of IDs of the articles;

a first candidate article extraction unit that extracts an ID of an article corresponding to the information of the holding state acquired by the holding-state determination processing unit, from a holding-state registering database in which the holding state of the article by the person is registered as a positional relationship between the article and the hand of the person for each of IDs of the articles, as a first candidate article; and an article estimating unit that estimates the first candidate article extracted by the first article candidate extraction unit as an article that is being carried by the person.

According to a ninth aspect of the present invention, there is provided an article estimating method comprising:

detecting information of positions of a plurality of articles located in environmental space by using an article sensing unit;

detecting information of a position of a hand of a person that exists in the environmental space by using a hand sensing unit; determining a positional relationship between the information of the position of the article and the information of the position of the hand, respectively detected by the article sensing unit and the hand sensing unit, as a holding state of the article by the hand, by using a holding-state determination processing unit; and estimating an article whose ID corresponds to the information of the holding state determined by the holding-state determination processing unit as the article held by the person, based upon a holding-state registering database in which the holding state of each article by the person is registered as a positional relationship between the article and the hand of the person, for each ID of the article, by using an article estimating unit.

According to a 10th aspect of the present invention, there is provided an article estimating method comprising:

detecting ID information of a plurality of articles located in environmental space and information of positions of the articles by using an article sensing unit so as to register the detected information in an article detection history database;

detecting ID information of a person existing in the environmental space and information of a position of a hand of the person by using a hand sensing unit so as to register the detected information in a hand detection history database;

determining a holding state of the article by the hand based upon a positional relationship between the positional information of the article and the positional information of the hand, respectively detected by the article sensing unit and the hand sensing unit and registered in the article detection history database and the hand detection history database by using a holding-state determination processing unit, so as to register information of the determined holding state in a holding-state determination result history database for each of IDs of the articles, by using the holding-state determination processing unit;

extracting an ID of an article corresponding to the information of the holding state acquired by the holding-state determination processing unit, from the holding-state registering database in which the holding state of the article by the person is registered as a positional relationship between the article and the hand of the person for each of IDs of the articles, as a first candidate article by using a first article candidate extraction unit; and estimating the first candidate article extracted by the first article candidate extraction unit as an article that is being carried by the person, by using an article estimating unit.

According to an 11th aspect of the present invention, there is provided an article estimating method comprising:

detecting ID information of a plurality of articles located in environmental space and information of positions of the articles by using an article sensing unit so as to register the detected information in an article detection history database in association with information of time at which the information is detected;

detecting ID information of a person existing in the environmental space and information of the position of a hand of the person by using a hand sensing unit so as to register the detected information in a hand detection history database in association with information of time at which the detected information is detected;

determining the holding state of the article by the hand, or whether or not no article is held by the hand, based upon a positional relationship between the positional information of the article and the positional information of the hand, respectively detected by the article sensing unit and the hand sensing unit, and registered in the article detection history database and the hand detection history database, by using a holding-state determination processing unit, so as to register information of determination result in a holding-state determination result history database in association with information of time at which the respective pieces of information are registered in the article detection history database and the hand detection history database in association with the pieces of information respectively detected by the article sensing unit and the hand sensing unit;

extracting an ID of the article corresponding to the information of the holding state acquired by the holding-state determination processing unit from the holding-state registering database in which the holding state of the article by the person is registered as a positional relationship between the article and the hand of the person for each of IDs of articles by using a first article candidate extraction unit, as a first candidate article;

referring to the holding-state determination result history database by using a scene determination unit to acquire information of time section which includes a point of time at which the holding state of the article is determined;

referring to the hand detection history database by using a second article candidate extraction unit to acquire a position of the hand in time information immediately before the time section acquired by the scene determination unit, and also referring to the article detection history database based upon the acquired information of the position of the hand and the time information immediately before the time section, so as to extract a second candidate article that is present at an original position where the article is placed prior to the transporting of the article by the person; and estimating an article that is in common with the first candidate articles extracted by the first article candidate extraction unit and the second candidate articles extracted by the second article candidate extraction unit as an article being carried by the person, by using an article estimating unit.

According to a 12th aspect of the present invention, there is provided an article estimating program, which allows a computer to function as:

a holding-state determination processing means for determining a positional relationship between positional information of a plurality of articles located in environmental space, detected by an article sensing means, and positional information of a hand of a person existing in the environmental space, detected by a hand sensing means, as a holding state of the article by the hand; and an article estimating means for estimating an article whose ID corresponds to the information of the holding state determined by the holding-state determination processing means as the article held by the person, based upon a holding-state registering database in which the holding state of each article by the person is registered as a positional relationship between the article and the hand of the person, for each ID of the article.

According to a 13th aspect of the present invention, there is provided an article estimating program, which allows a computer to function as:

a holding-state determination processing means for, based upon a positional relationship between positional information of an article and positional information of a hand respectively registered in an article detection history database in which ID information of each of a plurality of articles located in environmental space, detected by an article sensing means, and information of positions of the articles are registered, and a hand detection history database in which ID information of each of persons existing in the environmental space and positional information of the hand of each person, detected by a hand sensing means, are registered, determining the holding state of the article by the hand, and registering the determined information of the holding state in a holding-state determination result history database for each of the IDs of the articles;

a first article candidate extraction means for extracting an ID of an article corresponding to the information of the holding state acquired by the holding-state determination processing means, as a first candidate article, from a holding-state registering database in which the holding state of the article by the person is registered as a positional relationship between the article and the hand of the person for each ID of the article;

an article estimating means for estimating the first candidate article extracted by the first article candidate extraction means as an article that is being carried by the person.

According to a 14th aspect of the present invention, there is provided an article estimating program, which allows a computer to function as:

a holding-state determination processing means for, based upon a positional relationship between positional information of an article and positional information of a hand respectively registered in an article detection history database in which ID information of each of a plurality of articles located in environmental space, detected by an article sensing means, and information of positions of the articles are registered in association with information of time at which the information is detected, and a hand detection history database in which ID information of each of persons existing in the environmental space and positional information of the hand of each person, detected by a hand sensing means, are registered in association with information of time at which the information is detected, determining the holding state of the article by the hand, or whether or not no article is held by the hand, and registering information of determination result in a holding state determination result history database in association with information of time at which the respective pieces of information are registered in the article detection history database and the hand detection history database in association with the pieces of information respectively detected by the article sensing means and the hand sensing means;

a first article candidate extraction means for extracting an ID of the article corresponding to the information of the holding state acquired by the holding-state determination processing means from the holding-state registering database in which the holding state of the article by the person is registered as a positional relationship between the article and the hand of the person for each of IDs of articles, as a first candidate article;

a scene determination means for referring to the holding-state determination result history database to acquire information of time section which includes a point of time at which the holding state of the article is determined;

a second article candidate extraction means for referring to the hand detection history database to acquire a position of the hand in time information immediately before the time section acquired by the scene determination means, and for also referring to the article detection history database based upon the acquired information of the position of the hand and the time information immediately before the time section, so as to extract a second candidate article that is present at an original position where the article is placed prior to the transporting of the article by the person; and an article estimating means for estimating an article that is in common with the first candidate articles extracted by the first article candidate extraction means and the second candidate articles extracted by the second article candidate extraction means as an article being carried by the person.

EFFECTS OF THE INVENTION

In accordance with the present invention, even in the case where one portion or an entire portion of an object article is concealed and when a number of articles having the same shape are present, the holding state of the object article at the time when a person transports the object article is determined so that the article can be estimated by selecting recognizing candidates of the object article in a more focused manner, and by using the estimated result, it becomes possible to estimate the position of the article.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is a view describing an entire processing flow in the first embodiment of the present invention;

FIG. 18I is a view showing an example of images indicating the hand region and the article region respectively extracted from the picked-up image of FIG. 18D in the first embodiment of the present invention;

FIG. 18J is a view showing an example of images indicating the hand region and the article region respectively extracted from the picked-up image of FIG. 18E in the first embodiment of the present invention;

FIG. 19 is a view showing an example of a holding-state determination result history database in the first embodiment of the present invention;

FIG. 20A is a plan view showing an example of a moving track in accordance with the first embodiment of the present invention;

FIG. 20B is a view showing the example of the moving track in a table format in the first embodiment of the present invention;

FIG. 21 is a view showing an example of a graph relating to an amount of a movement per unit time in the first embodiment of the present invention;

FIG. 29B is a view describing yet another integrating method for article position estimating unit in accordance with the first embodiment of the present invention;

FIG. 30 is a view showing an example of an article position estimated result history database in accordance with the first embodiment of the present invention;

FIG. 31 is a view showing an example of a display screen in accordance with the first embodiment of the present invention;

FIG. 33 is a view showing an example of an article detection history database in accordance with the second embodiment of the present invention;

FIG. 34 is a view showing an example of information of scene determination results and information of holding-state determination results in the second embodiment of the present invention;

FIG. 35A is a view describing an example of an article holding-state related database in the second embodiment of the present invention;

FIG. 35B is a view describing another example of an article holding-state related database in the second embodiment of the present invention;

FIG. 38 is a view showing an example of an article detection history database in accordance with the third embodiment of the present invention;

FIG. 39 is a view showing an example of information of scene determination results and information of holding-state determination results in the third embodiment of the present invention;

DETAILED DESCRIPTION OF THE PREFERRED EMBODIMENTS

Figure 1A:
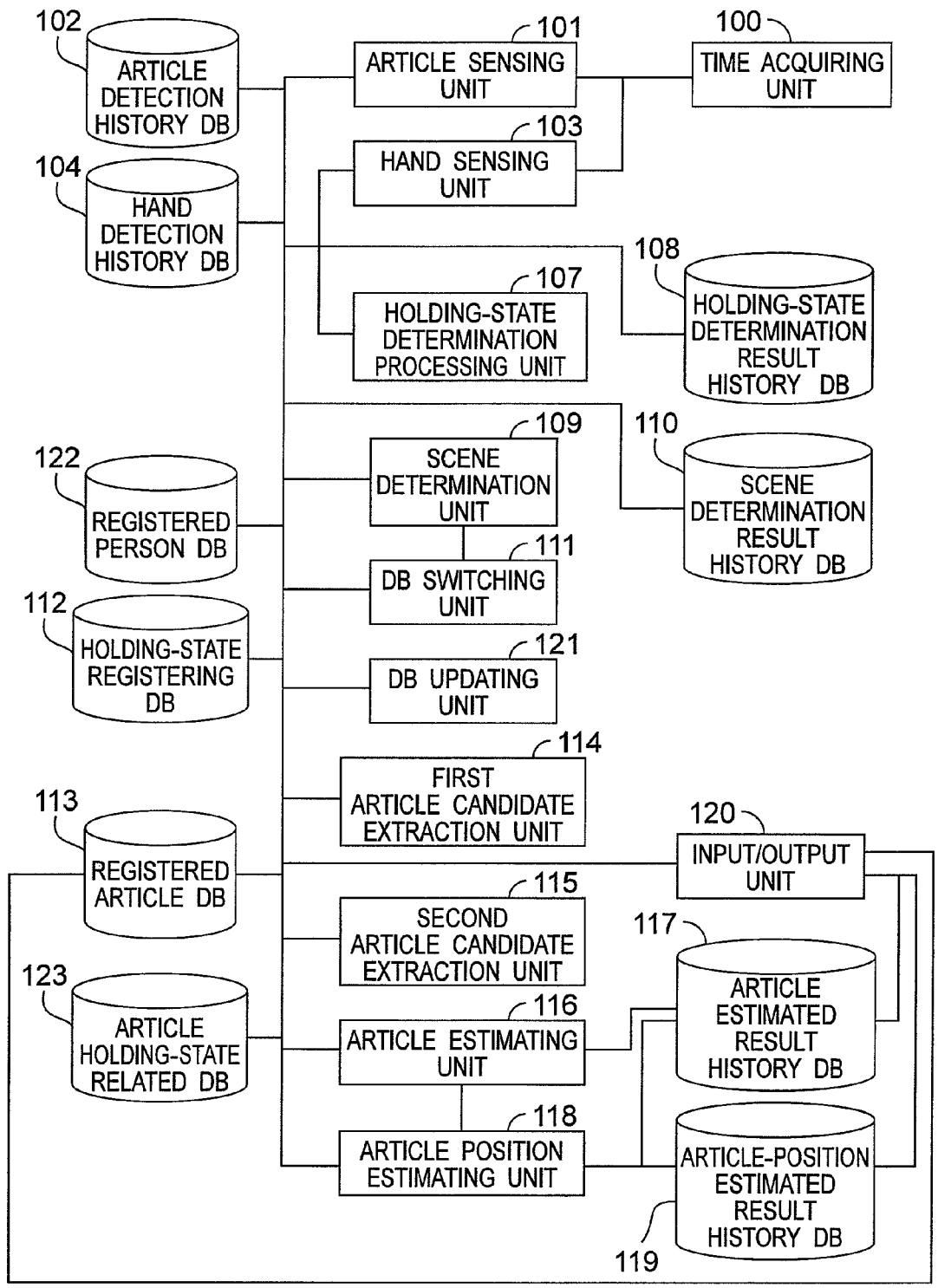
FIG. 1A is a functional block diagram relating to an article estimating apparatus and an article position estimating apparatus in accordance with a first embodiment of the present invention.

Before the description of the present invention proceeds, it is to be noted that like parts are designated by like reference numerals throughout the accompanying drawings.

Prior to the detailed description of embodiments of the present invention based upon the drawings, various aspects for the present invention will be explained.

According to a first aspect of the present invention, there is provided an article estimating apparatus comprising:

an article sensing unit that detects information of positions of a plurality of articles located in environmental space;

a hand sensing unit that detects information of a position of a hand of a person that exists in the environmental space;

a holding-state determination processing unit that determines a positional relationship between the information of the position of the article and the information of the position of the hand, respectively detected by the article sensing unit and the hand sensing unit, as a holding state of the article by the hand; and an article estimating unit that estimates an article whose ID corresponds to the information of the holding state determined by the holding-state determination processing unit as the article held by the person, based upon a holding-state registering database in which the holding state of each article by the person is registered as a positional relationship between the article and the hand of the person, for each ID of the article.

According to a second aspect of the present invention, there is provided an article estimating apparatus comprising:

an article sensing unit that detects ID information of a plurality of articles located in environmental space and information of positions of the articles so as to register the detected information in an article detection history database;

a hand sensing unit that detects ID information of a person existing in the environmental space and information of a position of a hand of the person so as to register the detected information in a hand detection history database;

a holding-state determination processing unit that determines a holding state of the article by the hand based upon a positional relationship between the positional information of the article and the positional information of the hand, respectively detected by the article sensing unit and the hand sensing unit and registered in the article detection history database and the hand detection history database, so as to register information of the determined holding state in a holding-state determination result history database for each of IDs of the articles;

a first candidate article extraction unit that extracts an ID of an article corresponding to the information of the holding state acquired by the holding-state determination processing unit, from a holding-state registering database in which the holding state of the article by the person is registered as a positional relationship between the article and the hand of the person for each of IDs of the articles, as a first candidate article; and an article estimating unit that estimates the first candidate article extracted by the first article candidate extraction unit as an article that is being carried by the person.

According to a third aspect of the present invention, there is provided an article estimating apparatus comprising:

an article sensing unit that detects ID information of a plurality of articles located in environmental space and information of positions of the articles so as to register the detected information in an article detection history database in association with information of time at which the information is detected;

a hand sensing unit that detects ID information of a person existing in the environmental space and information of a position of a hand of the person so as to register the detected information in a hand detection history database in association with information of time at which the information is detected;

a holding-state determination processing unit that determines the holding state of the article by the hand, or whether or not no article is held by the hand, based upon a positional relationship between the positional information of the article and the positional information of the hand, respectively detected by the article sensing unit and the hand sensing unit, and registered in the article detection history database and the hand detection history database, so as to register information of the determination result in a holding-state determination result history database in association with information of time at which the respective pieces of information are registered in the article detection history database and the hand detection history database in association with the pieces of information respectively detected by the article sensing unit and the hand sensing unit;

a first article candidate extraction unit that extracts an ID of the article corresponding to the information of the holding state acquired by the holding-state determination processing unit from a holding-state registering database in which the holding state of the article by the person is registered as a positional relationship between the article and the hand of the person for each of IDs of the articles, as a first candidate article;

a scene determination unit that refers to the holding-state determination result history database to acquire information of time section which includes a point of time at which the holding state of the article is determined;

a second article candidate extraction unit that refers to the hand detection history database to acquire the position of the hand in the time information immediately before the time section acquired by the scene determination unit, and that also refers to the article detection history database based upon the acquired information of the position of the hand and the time information immediately before the time section, so as to extract a second candidate article that is present at an original position where the article is placed prior to the taking-up and transporting states of the article with the hand by the person; and an article estimating unit that estimates an article that is in common with the first candidate articles extracted by the first article candidate extraction unit and the second candidate articles extracted by the second article candidate extraction unit, as an article being carried by the person.

According to a fourth aspect of the present invention, there is provided the article estimating apparatus according to the second or third aspect, wherein at least one of the article sensing unit and the hand sensing unit includes an image sensor that picks up image information including the articles located in the environmental space and the hand of the person, and an image recognizing unit that carries out an image recognizing process based upon the image information picked up by the image sensor, and the image recognizing unit has either a function as the article sensing unit that detects ID information of the articles and the positional information of the articles so as to register the detected information in the article detection history database, or a function as the hand sensing unit that detects ID information of the person and the positional information of the hand of the person so as to register the detected information in the hand detection history database.

According to a fifth aspect of the present invention, there is provided the article estimating apparatus according to the third aspect, wherein the scene determination unit refers to the hand detection history database, and based upon positional information of the hand and information of time at which the positional information of the hand is detected in the acquired information of the time section, calculates an amount of movement of the hand per unit time so that a plurality of pieces of information of time sections in which the calculated amount of movement of the hand becomes a value that is a predetermined threshold value or less are extracted, and determines information of a time section corresponding to earliest time information among the extracted time sections as a taking-up scene of the article, and also determines information of a time section corresponding to latest time information among the extracted time sections as a putting-down scene of the article, with a time section between the taking-up scene of the article and the putting-down scene of the article being determined as a transporting scene of the article, so as to register results of the determination in a scene determination result history database;

an article holding-state related database is prepared in which the holding state of the article by the person is registered for each ID information of the articles and the information of the holding state at time when the person transports the article is registered for each of the scenes, as positional information between the article and the hand of the person; and the first article candidate extraction unit extracts an article whose holding state determined by the holding-state determination processing unit in the scene determined by the scene determination unit, is registered, among articles registered in the article holding-state related database, in the scene registered in the scene determination result history database, as a candidate article.

According to a sixth aspect of the present invention, there is provided the article estimating apparatus according to the fifth aspect, further comprising:

a database switching unit that switches data to be referred to by the first article candidate extraction unit, between the holding-state registering database and the article holding-state related database, in accordance with the person transporting the article by the hand, or a place to which the person is transporting the article by the hand.

According to a seventh aspect of the present invention, there is provided an article position estimating apparatus comprising:

the article estimating apparatus according to any one of the second to third and fifth to sixth aspects; and an article position estimating unit that refers to the article detection history database so that information of a position of an ID of the article corresponding to the ID information of the article estimated by the article estimating unit is estimated as an estimated position.

According to an eighth aspect of the present invention, there is provided the article position estimating apparatus according to the seventh aspect, further comprising:

an input/output unit that receives a request for retrieving the article, and that outputs information of the position of the article corresponding to ID information of the article relating to the request for retrieving, in the ID positional information of the article estimated by the article position estimating unit.

According to a ninth aspect of the present invention, there is provided an article estimating method comprising:

detecting information of positions of a plurality of articles located in environmental space by using an article sensing unit;

detecting information of a position of a hand of a person that exists in the environmental space by using a hand sensing unit;

determining a positional relationship between the information of the position of the article and the information of the position of the hand, respectively detected by the article sensing unit and the hand sensing unit, as a holding state of the article by the hand, by using a holding-state determination processing unit; and estimating an article whose ID corresponds to the information of the holding state determined by the holding-state determination processing unit as the article held by the person, based upon a holding-state registering database in which the holding state of each article by the person is registered as a positional relationship between the article and the hand of the person, for each ID of the article, by using an article estimating unit.

According to a 10th aspect of the present invention, there is provided an article estimating method comprising:

detecting ID information of a plurality of articles located in environmental space and information of positions of the articles by using an article sensing unit so as to register the detected information in an article detection history database;

detecting ID information of a person existing in the environmental space and information of a position of a hand of the person by using a hand sensing unit so as to register the detected information in a hand detection history database;

determining a holding state of the article by the hand based upon a positional relationship between the positional information of the article and the positional information of the hand, respectively detected by the article sensing unit and the hand sensing unit and registered in the article detection history database and the hand detection history database by using a holding-state determination processing unit, so as to register information of the determined holding state in a holding-state determination result history database for each of IDs of the articles, by using the holding-state determination processing unit;

extracting an ID of an article corresponding to the information of the holding state acquired by the holding-state determination processing unit, from the holding-state registering database in which the holding state of the article by the person is registered as a positional relationship between the article and the hand of the person for each of IDs of the articles, as a first candidate article by using a first article candidate extraction unit; and estimating the first candidate article extracted by the first article candidate extraction unit as an article that is being carried by the person, by using an article estimating unit.

According to an 11th aspect of the present invention, there is provided an article estimating method comprising:

detecting ID information of a plurality of articles located in environmental space and information of positions of the articles by using an article sensing unit so as to register the detected information in an article detection history database in association with information of time at which the information is detected;

detecting ID information of a person existing in the environmental space and information of the position of a hand of the person by using a hand sensing unit so as to register the detected information in a hand detection history database in association with information of time at which the detected information is detected;

determining the holding state of the article by the hand, or whether or not no article is held by the hand, based upon a positional relationship between the positional information of the article and the positional information of the hand, respectively detected by the article sensing unit and the hand sensing unit, and registered in the article detection history database and the hand detection history database, by using a holding-state determination processing unit, so as to register information of determination result in a holding-state determination result history database in association with information of time at which the respective pieces of information are registered in the article detection history database and the hand detection history database in association with the pieces of information respectively detected by the article sensing unit and the hand sensing unit;

extracting an ID of the article corresponding to the information of the holding state acquired by the holding-state determination processing unit from the holding-state registering database in which the holding state of the article by the person is registered as a positional relationship between the article and the hand of the person for each of IDs of articles by using a first article candidate extraction unit, as a first candidate article;

referring to the holding-state determination result history database by using a scene determination unit to acquire information of time section which includes a point of time at which the holding state of the article is determined;

referring to the hand detection history database by using a second article candidate extraction unit to acquire a position of the hand in time information immediately before the time section acquired by the scene determination unit, and also referring to the article detection history database based upon the acquired information of the position of the hand and the time information immediately before the time section, so as to extract a second candidate article that is present at an original position where the article is placed prior to the transporting of the article by the person; and estimating an article that is in common with the first candidate articles extracted by the first article candidate extraction unit and the second candidate articles extracted by the second article candidate extraction unit as an article being carried by the person, by using an article estimating unit.

According to a 12th aspect of the present invention, there is provided an article estimating program, which allows a computer to function as:

a holding-state determination processing means for determining a positional relationship between positional information of a plurality of articles located in environmental space, detected by an article sensing means, and positional information of a hand of a person existing in the environmental space, detected by a hand sensing means, as a holding state of the article by the hand; and an article estimating means for estimating an article whose ID corresponds to the information of the holding state determined by the holding-state determination processing means as the article held by the person, based upon a holding-state registering database in which the holding state of each article by the person is registered as a positional relationship between the article and the hand of the person, for each ID of the article.

According to a 13th aspect of the present invention, there is provided an article estimating program, which allows a computer to function as:

a holding-state determination processing means for, based upon a positional relationship between positional information of an article and positional information of a hand respectively registered in an article detection history database in which ID information of each of a plurality of articles located in environmental space, detected by an article sensing means, and information of positions of the articles are registered, and a hand detection history database in which ID information of each of persons existing in the environmental space and positional information of the hand of each person, detected by a hand sensing means, are registered, determining the holding state of the article by the hand, and registering the determined information of the holding state in a holding-state determination result history database for each of the IDs of the articles;

a first article candidate extraction means for extracting an ID of an article corresponding to the information of the holding state acquired by the holding-state determination processing means, as a first candidate article, from a holding-state registering database in which the holding state of the article by the person is registered as a positional relationship between the article and the hand of the person for each ID of the article;

an article estimating means for estimating the first candidate article extracted by the first article candidate extraction means as an article that is being carried by the person.

According to a 14th aspect of the present invention, there is provided an article estimating program, which allows a computer to function as:

a holding-state determination processing means for, based upon a positional relationship between positional information of an article and positional information of a hand respectively registered in an article detection history database in which ID information of each of a plurality of articles located in environmental space, detected by an article sensing means, and information of positions of the articles are registered in association with information of time at which the information is detected, and a hand detection history database in which ID information of each of persons existing in the environmental space and positional information of the hand of each person, detected by a hand sensing means, are registered in association with information of time at which the information is detected, determining the holding state of the article by the hand, or whether or not no article is held by the hand, and registering information of determination result in a holding state determination result history database in association with information of time at which the respective pieces of information are registered in the article detection history database and the hand detection history database in association with the pieces of information respectively detected by the article sensing means and the hand sensing means;

a first article candidate extraction means for extracting an ID of the article corresponding to the information of the holding state acquired by the holding-state determination processing means from the holding-state registering database in which the holding state of the article by the person is registered as a positional relationship between the article and the hand of the person for each of IDs of articles, as a first candidate article;

a scene determination means for referring to the holding-state determination result history database to acquire information of time section which includes a point of time at which the holding state of the article is determined;

a second article candidate extraction means for referring to the hand detection history database to acquire a position of the hand in time information immediately before the time section acquired by the scene determination means, and for also referring to the article detection history database based upon the acquired information of the position of the hand and the time information immediately before the time section, so as to extract a second candidate article that is present at an original position where the article is placed prior to the transporting of the article by the person; and an article estimating means for estimating an article that is in common with the first candidate articles extracted by the first article candidate extraction means and the second candidate articles extracted by the second article candidate extraction means as an article being carried by the person.

Referring to the drawings, the following description will discuss embodiments of the present invention.

First Embodiment

FIG. 1A is a functional block diagram relating to an article estimating apparatus and an article position estimating apparatus in accordance with a first embodiment of the present invention.

The article estimating apparatus includes: time acquiring unit 100, article sensing unit 101, an article detection history database (article detection history DB) 102, hand sensing unit 103, a hand detection history database (hand detection history DB) 104, holding-state determination processing unit 107, a holding-state determination result history database (holding-state determination result history DB) 108, scene determination unit 109, a scene determination result history database (scene determination result history DB) 110, database switching unit 111, a holding-state registering database (holding-state registering DB) 112, an article holding-state related database (article holding-state related DB) 123, a registered article database (registered article DB) 113, first article candidate extraction unit 114, second article candidate extraction unit 115, article estimating unit 116, an article estimated result history database (article estimated result history DB) 117, input/output unit 120 and database updating unit 121 so that an article to be handled by a person can be estimated.

Moreover, the article position estimating apparatus in accordance with the first embodiment further includes article position estimating unit 118 and an article-position estimated result history database (article-position estimated result history DB) 119 so that it becomes possible to estimate a position of an article based upon information of the estimated result.
<<Brief Descriptions of Respective Components>>

The respective components will be briefly described below.

The time acquiring unit 100 acquires information of the current time, and outputs the resulting data.

The article sensing unit 101 detects ID information and positional information of each of articles, such as daily necessities or office supplies, located in living space (hereinafter, referred to as "environmental space") 91, such as a home or an office. The article sensing unit 101 acquires the information of time thus detected from the time acquiring unit 100, and registers the information of the time, the ID information of the article, and information of the position thereof in the article detection history database 102 all together.

The article detection history database 102 stores the ID information and the positional information of an article detected by the article sensing unit 101 and the time information acquired from the time acquiring unit 100 in association with each other.

The hand sensing unit 103 detects ID information of a person who is working in the environmental space 91 and information of the position of a hand of the person. The hand sensing unit 103 acquires information of the detected time from the time acquiring unit 100, and registers the information of the corresponding time, ID information of the person and information of the position of the hand of the person in the hand detection history database 104 all together.

The hand detection history database 104 stores the information of the hand position detected by the hand sensing unit 103 and the time information acquired from the time acquiring unit 100 in association with each other.

With reference to the ID information and positional information of the article registered in the article detection history database 102 and the ID information of the person and the information of the hand position of the person registered in the hand detection history database 104, the holding-state determination processing unit 107 determines how the person is holding the article, or whether nothing is held by the person, based upon information of the hand and a peripheral area thereof. Information of the determination result is registered in the holding-state determination result history database 108 together with the information of the time, for each of ID information of articles.

The holding-state determination result history database 108 stores the information of the holding state of an article determined by the holding-state determination processing unit 107 and the time information in association with each other for each ID of the article.

Referring to the position of the hand registered in the hand detection history database 104 in a time-sequential manner, the scene determination unit 109 finds a moving track of the hand when a person transfers an article. Moreover, based upon the moving track of the hand, the scene determination unit 109 determines the corresponding scene. In this case, "the scene" refers to any one of circumstances that a person takes upon trying to transfer an article, that is, a circumstance in which the person is taking up an article that is placed (taking-up scene), a circumstance in which the person is transporting the article that has been taken up (transporting scene) and a circumstance in which the person is putting down the holding article (putting-down scene). The information relating to the moving track and determination result is registered in the scene determination result history database 110 in association with the time information by the scene determination unit 109.

The scene determination result history database 110 stores the information of the moving track of the hand and the scene determination result found by the scene determination unit 109 in association with the corresponding time information.

Referring to the ID information of the person and the information of the hand position registered in the hand detection history database 104, the database switching unit 111 makes a switch to data that is suitable for the circumstance among a plurality of data in the holding-state registering database 112, and allows the corresponding data to be referred to by the first article candidate extraction unit 114. Moreover, also with respect to the article holding-state related database 123, the database switching unit 111 makes a switch to data that is suitable for the circumstance, and allows the corresponding data to be referred to by the first article candidate extraction unit 114.

The holding-state registering database 112 registers data that is prepared by classifying holding states of an article and registering determination conditions of the respective holding states. The data is respectively written for each of ID information of a person, as well as for each of positional information thereof, and is also switched by the database switching unit 111 to data suitable for the corresponding circumstance.

In association with pieces of information of the respective articles registered in the registered article database 113, the article holding-state related database 123 registers data that describe the holding state for each of the corresponding scenes. The data are respectively written for each of the ID information of a person, as well as for each of the positional information thereof, and are also switched by the database switching unit 111 to data suitable for the corresponding circumstance.

The registered article database 113 registers pieces of information about articles, such as daily necessities or office supplies, located in environmental space 91, that form subjects to be dealt with. The registered article database 113 include at least ID information of each of the articles, name information of each of the articles and information that is used by the article sensing unit 101 for detecting the ID information and positional information of each of the articles (for example, template image information, color information and the like).

Referring to the holding-state determination result history database 108 and the scene determination result history database 110, the first article candidate extraction unit 114 compares the holding states of an object article with each other in respective scenes, and thus extracts information of the first article candidate for the object article from the data registered in the holding-state registering database 112 and/or the article holding-state related database 123.

Referring to the article detection history database 102 and the scene determination result history database 110, the second article candidate extraction unit 115 extracts information of an article detected in the transfer destination of the moving track of the object article as information for the second article candidate.

The article estimating unit 116 obtains pieces of information of candidates for the object article that are commonly extracted in the first article candidate extraction unit 114 and the second article candidate extraction unit 115 as information of the estimated result of the object article. The information of the estimated result is registered in the article estimated result history database 117 in association with the corresponding time information by the article estimating unit 116.

The article estimation result history database 117 stores the information of the article estimated result given by the article estimating unit 116 in association with the corresponding time information.

By referring to the article detection history database 102 and the article estimated result history database 117, the article position estimating unit 118 estimates the position of the object article. The information of the estimated result is registered in the article position estimated result history database 119 in association with the corresponding time information by the article position estimating unit 118.

The article position estimated result history database 119 stores the information of the article position estimated result given by the article position estimating unit 118 and the corresponding time information in association with each other.

The input/output unit 120 receives information for requesting an article retrieval from the user, and upon receipt of the information for an article retrieving request, retrieves the article position estimated result history database 119 for the article related to the article retrieving request, and outputs the positional information of the article. Moreover, by using the input/output unit 120, an access is made to a desired database of the present invention on demand so that information may be added to the registered information in the database, or the registered information therein may be updated.

By referring to the article detection history database 102, the holding-state determination result history database 108 and the scene determination result history database 110, the database updating unit 121 updates the contents of the holding-state registering database 112 and/or the article holding-state related database 123.

The registered person database (registered person DB) 122 registers pieces of information of persons who work in the environmental space 91. The pieces of information include at least ID information and name information of each person.

<<Entire Processing Flow>>

Referring to FIG. 2, the following description will discuss the entire processing flow of the article position estimating apparatus in accordance with the first embodiment of the present invention.

In step S201, pieces of information including ID information and positional information of a plurality of articles inside the environmental space 91, positional information of the hand of a person and ID information of the person having the hand are respectively detected by the sensing unit, and respectively registered in the databases 102 and 104. More specifically, the article sensing unit 101 detects pieces of information including ID information and positional information of a plurality of articles, such as daily necessities and office supplies, located within the environmental space 91, and registers the resulting data in the article detection history database 102 in association with the corresponding time information of the detection. The hand sensing unit 103 detects pieces of information including the positional information of the hand of each of persons existing in the environmental space 91 and the ID information of a person having the hand, and registers the resulting data in the hand detection history database 104 in association with the corresponding time information of the detection.

Next, in step S202, by referring to the article detection history database 102 and the hand detection history database 104, the holding-state determination processing unit 107 acquires the positional relationship of an article and the hand, and based upon the positional relationship and data (data including registered determination conditions of the holding-states of the classified articles) of the holding-state registering database 112, determines how the person is holding the article, or whether nothing is held by the person, and registers the information of the determination result in the determination result history database 108 for each of IDs of the articles.

Next, in step S203, referring to the position of the hand in the hand detection history database 104 in a time-sequential manner, the scene determination unit 109 finds a moving track of the hand, and based upon the moving track, determines the scene ("taking-up scene", "transferring scene" or "putting down scene"), and registers the information of the resulting scene in the scene determination result history database 110, in association with the determined scene information and the corresponding time information of the scene determination. Moreover, by referring to the hand detection history database 104, the scene determination unit 109 specifies the information of "ID of the person" corresponding to the moving hand, and registers the resulting information in the scene determination result history database 110. Moreover, the scene determination unit 109 also registers the positional information of the hand of a person corresponding to the specified ID information of a person and the corresponding detected time information of the positional information, as a moving track of the hand in which the two pieces of information are associated with each other.

Next, in step S204, based upon the resulting information determined in step S203 and registered in the scene determination result history database 110, the second article candidate extraction unit 115 determines whether or not "the putting-down scene" of the article has been completed, and in the case where the second article candidate extraction unit 115 determines that it is prior to the completion of "the putting-down scene" of the article, steps are repeated from the sensing process in step S201, while, in the case where the second article candidate extraction unit 115 determines that "the putting-down scene" of the article has been completed, processes for article estimation of step S205 and thereafter are started.

In step S205, in the case where, by referring to the article detection history database 102, the holding-state determination result history database 108 and the scene determination result history database 110, the article sensing unit 101 has specified that the article to be transferred in the same manner as in the moving track of the hand registered in the scene determination result history database 110 is a single article, the database updating unit 121 updates the data of the holding-state registering database 112 and/or the article holding-state related database 123 relating to the holding state of the article to the information of the holding state that has been determined in step S202.

Next, in step S206, based upon the information of the position of the hand of the person and the ID information of the person obtained by referring to ID information 2203 of the person registered in the scene determination result history database 110 and the hand detection history database 104, the database switching unit 111 makes a switch among a plurality of pieces of data registered in the holding-state registering database 112 to data that correspond to the circumstance, and allows the switched data to be collated by the first article candidate extraction unit 114 in the next step. For example, based upon the ID information of the person, the ID can be switched in the positional relationship of the hand region and the article region; and more specifically, it becomes possible to deal with such circumstances in which the holding states of the article are different between those of an adult and a child.

Next, in step S207, referring to the ID information of the person and the scene information registered in the holding-state determination result history database 108 and the scene determination result history database 110, the first article candidate extraction unit 114 extracts the information of the first article candidate from the data registered in the holding-state registering database 112 and/or the article holding state related database 123, based upon the holding state of the article in each of the scenes.

Next, in step S208, by referring to the article detection history database 102 and the scene determination result history database 110, based upon the moving track of the hand registered in the scene determination result history database 110, the second article candidate extraction unit 115 extracts information of an article estimated at a position prior to the transportation of the article (hereinafter, referred to as "original position before transportation") as information of the second article candidate.

Next, in step S209, the article estimating unit 116 defines information of an article that is commonly found in the information of the first article candidate and the information of the second article candidate extracted in the first article candidate extraction unit 114 and the second article candidate extraction unit 115 as resulting information after the article estimation. The article estimating unit 116 stores the resulting information after the article estimation by the article estimating unit 116 in the article estimated result history database 117 in association with the corresponding time information. The article estimating apparatus may output the information of the estimated result of the article in this state in step S211. Prior to step S211, the article estimating apparatus carries out the following operations of step S210.

Next, in step S210, by referring to the article detection history database 102 and the article estimated result history database 117, the article position estimating unit 118 estimates the position of the object article.

Next, in step S211, the information of the estimated result is outputted by the input/output unit 120 so that the processes are completed.

<<Descriptions of Respective Means>>

Figure 3:
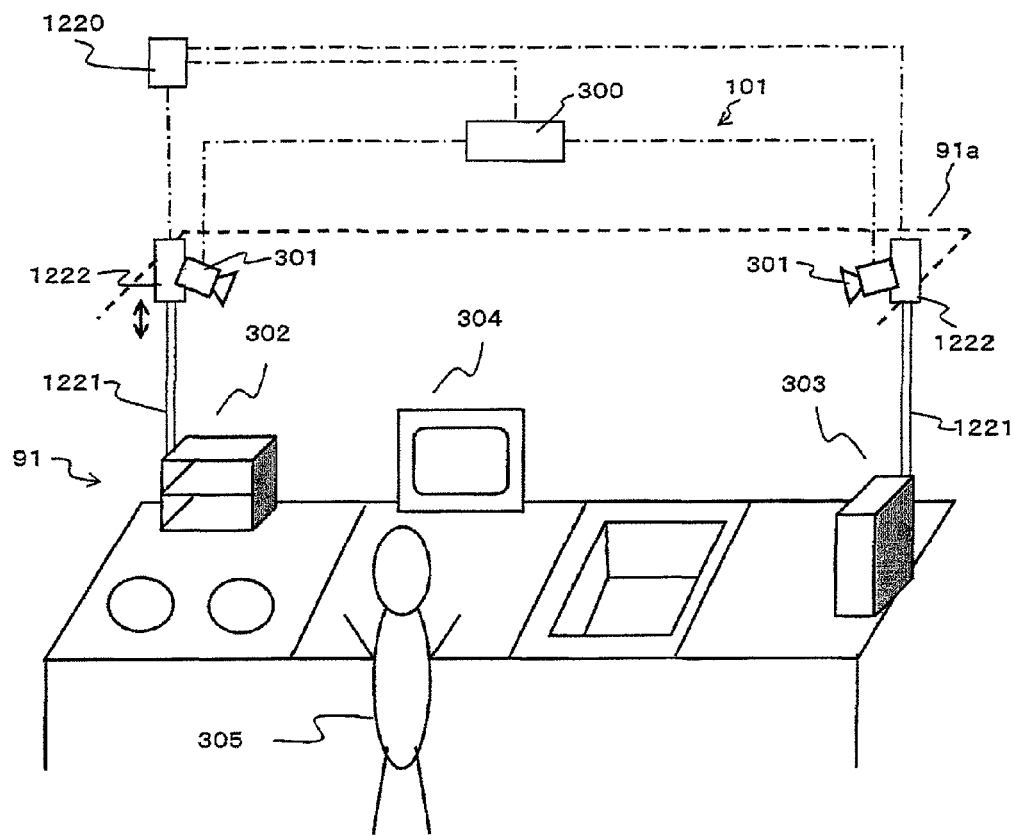
FIG. 3 is a view describing kitchen environmental space serving as life space in the first embodiment of the present invention.

The following description will discuss the contents of specific processes carried out in the respective unit. In this case, a scene is exemplified in which, as shown in FIG. 3, in the environmental space 91 of a kitchen, a kitchen utensil is dealt. In the present invention, the environmental space 91 is not limited by the kitchen, but may include another space, such as a living room or a dining room; however, for convenience of understanding, the following description will be given by exemplifying the kitchen.

Figure 4:
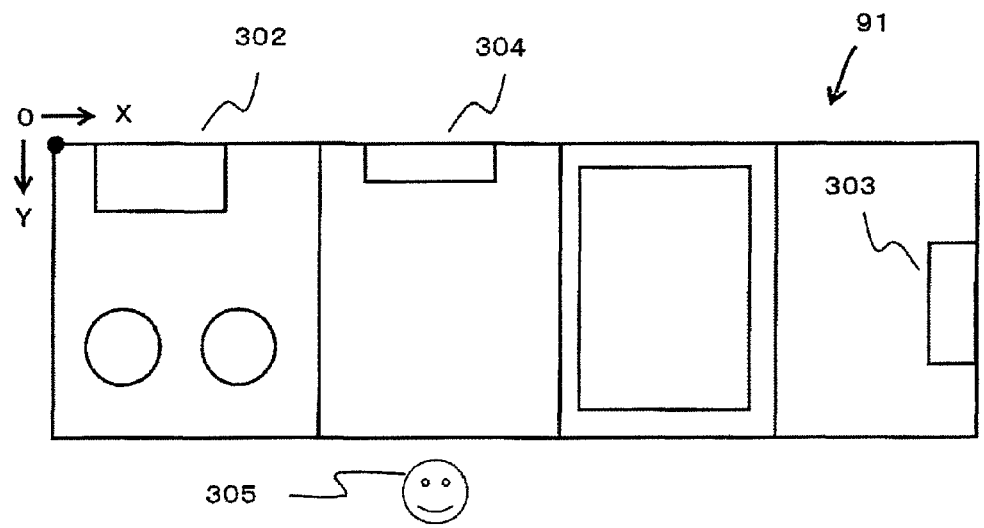
FIG. 4 is a view describing a coordinate system in the first embodiment of the present invention.

A camera 301 serving as one example of a sensor is attached to a ceiling 91a of the environmental space 91 of the kitchen so that sensing operations are carried out in the environmental space 91. In the system kitchen, a storage rack 302 is placed on a rear side of a gas stove on one end of the system kitchen, and another storage rack 303 is placed on a side portion of the other end of the system kitchen, and upon sensing a kitchen utensil by using the camera 301, a problem, such as a concealed state of the kitchen utensil, is caused by the storage rack 302 or 303. Moreover, a monitor 304 for use in a display output is also placed on a rear side of a cooking counter of the system kitchen. A person 305 carries out operations, while moving inside the environmental space 91. In the following description, suppose that, as shown in FIG. 4, there is a coordinate system, with an upper left corner being defined as the origin.

Figure 5A:
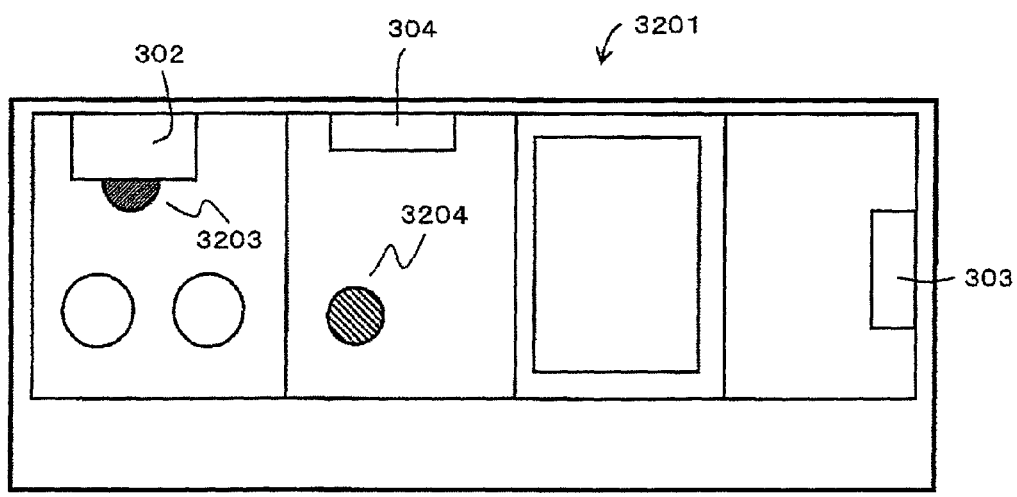
FIG. 5A is a plan view showing an example of an article state at time t11 in the environmental space in accordance with the first embodiment of the present invention.
Figure 5B:
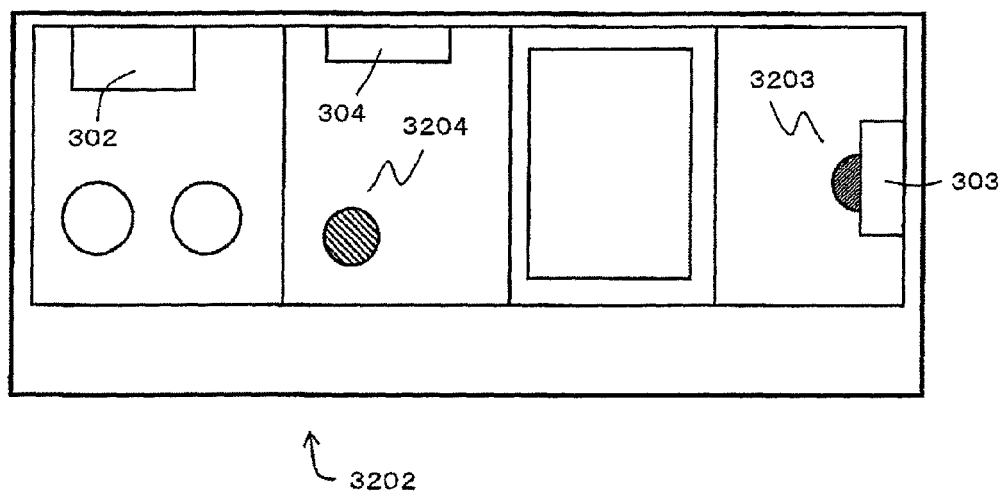
FIG. 5B is a plan view showing an example of an article state at time t99 in the environmental space in accordance with the first embodiment of the present invention.

In this environmental space 91, a mug 3203 is placed on the storage rack 302, with one portion of the mug 3203 being concealed by the storage rack 302. Suppose that Hanako takes this mug 3203 out of the storage rack 302 at time t11, and carries this, and puts the mug 3203 in another storage rack 303 at time t99 at such a position that one portion of the mug 3203 is concealed. At this time, another mug 3204 is also placed at a position on a front side that is clearly viewed from the monitor 304. Suppose that the above-mentioned circumstance is prepared. FIGS. 5A and 5B respectively show an article state 3201 at time t11 and an article state 3202 at time t99. In the article state 3201 of time t11, the mug 3203 is placed on the storage rack 302 in such a manner that the half of the round-shaped mug 3203 is concealed by the storage rack 302, with only the semi-circular shaped area of the mug 3203 indicated by slanting lines being exposed from the storage rack 302 to be viewed, while the mug 3204 indicated by a round area with slanting lines is being viewed at a position on the front side that is clearly viewed from the monitor 304. In the state 3202 of the article at time t99, the mug 3203 is placed on the storage rack 303 in such a manner that the half of the round-shaped mug 3203 is concealed by the other storage rack 303, with the result that only the semi-circular area indicated by slanting lines of the mug 3203 is exposed from the storage rack 303 to be viewed, and the round-shaped area of the mug 3204 indicated by slanting lines is also viewed from the position on the front side that is clearly viewed from the monitor 304.

<<Sensing Means>>

The sensing unit includes article sensing unit 101 and hand sensing unit 103. The article sensing unit 101 and the hand sensing unit 103 may be provided as different devices or unit, or may be provided as common devices or unit (for example, image sensors, and the like).

In the present embodiment, the article sensing unit 101 includes, for example, an information acquiring device used for acquiring information of a plurality of articles located in the environmental space 91 (ID information of a plurality of articles and positional information of the articles) and specifying unit (specifying unit) used for specifying an article from the information obtained by the information acquiring device. For example, a camera 301, such as a known image sensor capable of acquiring shape and color information or the like of an article, may be used as the information acquiring device. For example, known image recognizing unit 300 or the like may be used as the specifying unit. Thus, images of a plurality of articles located in the environmental space 91 are picked up by the image sensor 301, and based upon the picked-up image, the ID information of the articles and the positional information of the articles are detected by the image recognizing unit 300 so that the resulting information is registered in the article detection history database 102; thus, functions as the article sensing unit 101 are obtained. Additionally, in the same manner as in the article sensing unit 101, the hand sensing unit 103 may also have a structure in which images of a plurality of persons or a single person and the hand thereof, located in the environmental space 91, are picked up by the image sensor 301, and based upon the picked-up image, the ID information of the persons or the person and positional information of the person(s) and the positional information of the hand(s) are detected by the image recognizing unit 300 so that the resulting pieces of information are registered in the hand detection history database 104.

From pieces of information of a plurality of articles located in the environmental space 91, the article sensing unit 101 detects ID information and positional information of the articles, such as a plurality of daily necessities or office supplies located in the environmental space 91.

Figure 6A:
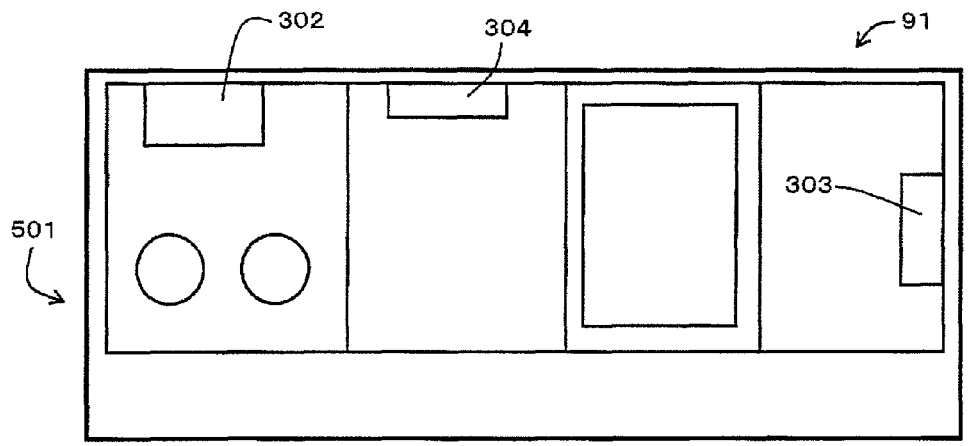
FIG. 6A is a view describing a background image in an image sensor processing in the first embodiment of the present invention.
Figure 6B:
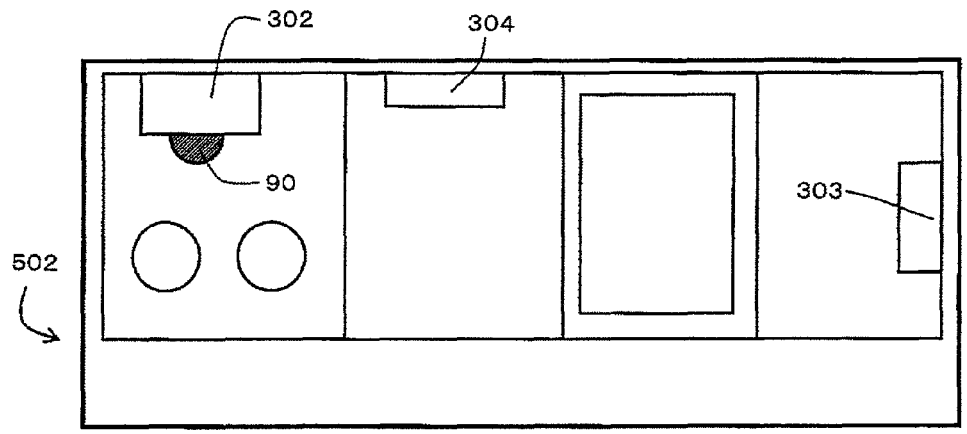
FIG. 6B is a view describing a picked-up image in the image sensor processing in the first embodiment of the present invention.
Figure 6C:
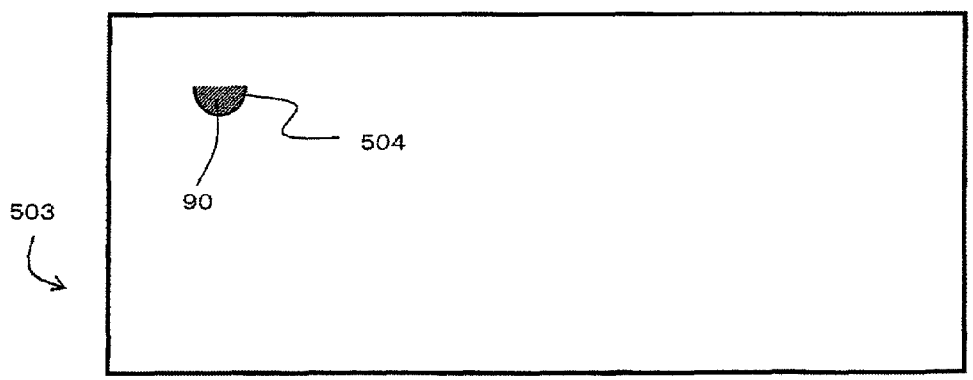
FIG. 6C is a view describing a differential image in the image sensor processing in the first embodiment of the present invention.

Referring to FIGS. 6A to 6C, the following description will discuss an example of operations in the case where, by using the image sensor 301, pieces of information of a plurality of articles located in the environmental space 91 are acquired by the article sensing unit 101.

In a state where, as shown in FIG. 3, a camera 301 serving as one example of the image sensor of the article sensing unit 101 is attached to a ceiling 91a of the kitchen environmental space 91, an image including no article to be detected is preliminarily picked up by the camera 301 as a background image 501 (see FIG. 6A) and the resulting image is maintained in the registered article database 113. Then, in the case where an article to be detected is present in the environmental space 91, the image of the environmental space 91 is picked up by the camera 301 so that image information including a plurality of articles that are located in the environmental space 91 at that time is acquired, and a difference between the background image 501 and the image of the environmental space 91 picked up by the camera 301 is calculated by the image recognizing unit 300 so that the ID and the position of the article are detected. In this case, as shown in FIG. 6B, in the case where an article 90 is put in such a position that one portion thereof is concealed by the storage rack 302, by finding the difference between an input image 502 (see FIG. 6B) at the time when the article 90 is placed and the background image 501 (see FIG. 6A) by using the image recognizing unit 300, a differential image 503 (see FIG. 6C) is obtained. A position of a center of gravity of a region 504 indicated by slanting lines, extracted from the differential image 503, is defined as the position of the article 90 to be detected.

Figure 7:
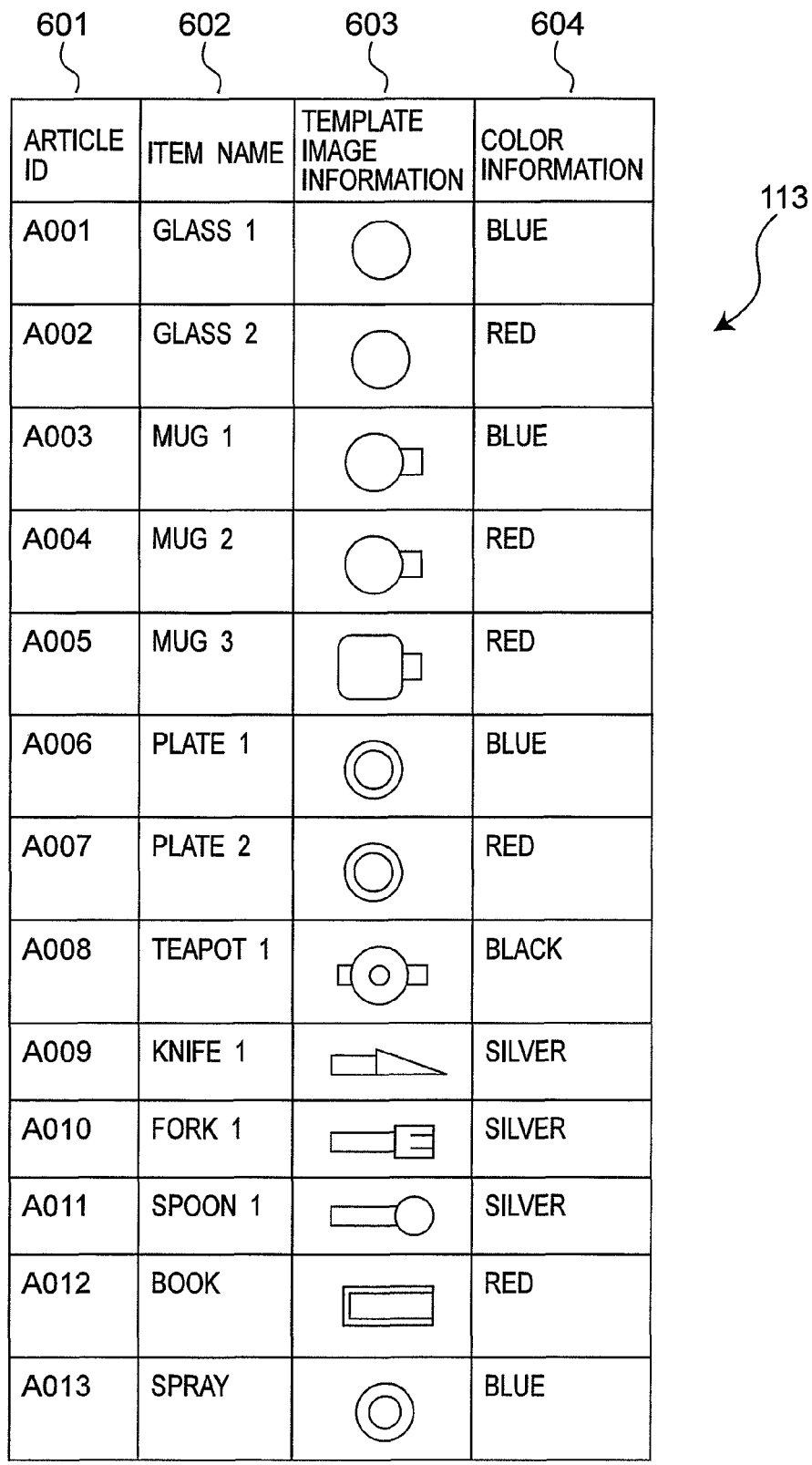
FIG. 7 is a view showing an example of a registered article database in the first embodiment of the present invention.

On the other hand, information to be used for detecting an article is preliminarily registered in the registered article database 113 by using the input/output unit 120 or the like. In this case, FIG. 7 shows an example in which template image information and color information are registered in the registered article database 113 in association with ID information and information of an item name of an article. That is, in FIG. 7, in the registered article database 113, ID information 601, item name information 602, template image information 603 and color information 604 are registered in association with one another. With respect to the template image information 603, images taken from various directions (for example, images taken from six directions, that is, images of top face, bottom face, left side face, right side face, front face and rear face) are actually registered; however, for simplicity of description, only the image taken from above is exemplified in this case.

Referring to the information registered in the registered article database 113 by using the image recognizing unit 300, ID information of an article is detected by the image recognizing unit 300 based upon the differential image calculated by the image recognizing unit 300 from the background image 501 and the image of the environmental space 91 picked up by the camera 301, and pieces of information, such as template image information 603 or the like, corresponding to the differential image.

For example, by collating the region 504 with slanting lines extracted from the differential image 503 of FIG. 6C with the template image information 603, the ID of an article is identified. In the case where one portion of the article is concealed, or when, even if all the portions of the article are shown, the picked-up image is too rough to accurately collate with the template, or in the case where a number of articles having the same shape are registered, it is difficult to specify the article as one article. Therefore, a plurality of articles in which the degree of similarity between the region 504 and the template image information 603 not less than a predetermined threshold value are defined as information candidates, and pieces of ID information of the corresponding articles are registered in the article detection history database 102. In this case, for example, the ratio of matching between the picked-up image and the template image may be used as the degree of similarity.

Moreover, in the case where the color information 604 is utilized, by comparing the color of the extracted region 504 with the color information 604 of an article by the use of the image recognizing unit 300, the article is identified so that the ID information of the article is acquired by the image recognizing unit 300. In the case where it is difficult to specify the article as one example in the same manner as in the case of utilizing the template image information 603, pieces of ID information of a plurality of articles may be registered in the article detection history database 102 as information candidates by the image recognizing unit 300. The methods for detecting and recognizing an article are not limited to the methods described herein; however, since difficulties in specifying an article occur in many cases in the same manner, pieces of ID information of a plurality of candidates are registered in the article detection history database 102 by the image recognizing unit 300.

Figures 8, 9A:
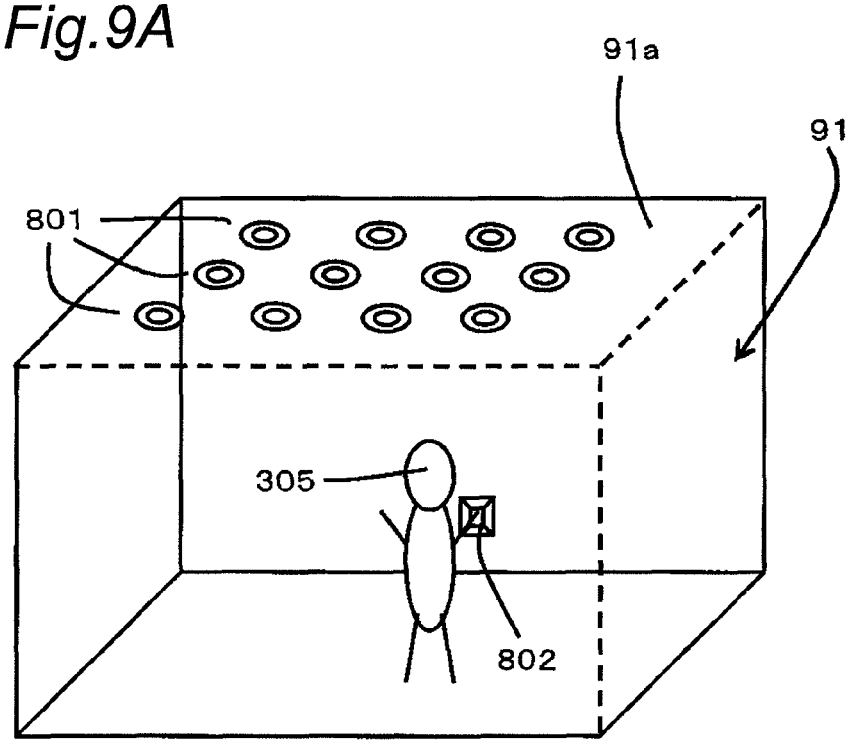
FIG. 8 is a view showing an example of an article detection history database in the first embodiment of the present invention.
FIG. 9A is a perspective view describing a process in an ultrasonic tag sensor in the first embodiment of the present invention.

FIG. 8 shows an example of the article detection history database 102 in which the resulting information obtained by the article sensing unit 101 is registered. In the article detection history database 102, time 701 at which an article is detected by the article sensing unit 101, positional information (for example, XY coordinates) 702 where the article is detected and pieces of information of candidates for the detected article (for example, pieces of ID information of a plurality of articles corresponding to the candidates of the detected article) 703 are registered. In FIG. 8, for example, information as a result of detection at time t11 and information as a result of detection at time t99 are shown as respective pieces of positional information.

Figures 9B, 10:
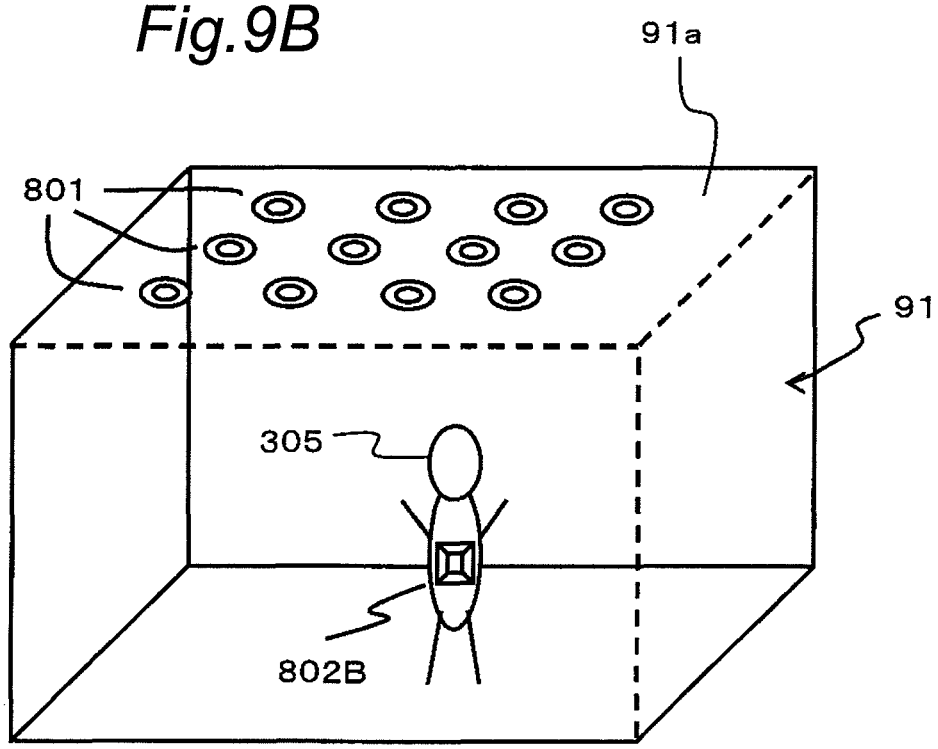
FIG. 9B is a perspective view describing a process in an ultrasonic tag sensor in a modified example of the first embodiment of the present invention.
FIG. 10 is a view showing a registered person database in accordance with the first embodiment of the present invention.

The hand sensing unit 103 detects ID information and positional information of a hand of a person 305 that is working in the environmental space 91. For example, referring to FIG. 9A, the following description will exemplify operations in which an ultrasonic tag sensor 802 of a wrist watch type that is detachably attached to the wrist of the person 305 is used. Additionally, FIG. 9B shows another example in which an ultrasonic tag sensor 802B that is detachably attached to the clothes of the person 305 is used; however, since the operations are the same as those in FIG. 9A, the following description will be given based upon the ultrasonic tag sensor 802 of FIG. 9A. A plurality of ultrasonic receivers 801 are preliminarily attached to a ceiling 91a or walls, and the ultrasonic transmitter 802 of the wrist watch type is attached to the wrist of the person 305 so that the person 305 is made to carry the ultrasonic transmitter 802. Thus, an ultrasonic wave transmitted by the ultrasonic transmitter 802 is received by the plurality of ultrasonic receivers 801 so that a three-dimensional position of the ultrasonic transmitter 802 can be found based upon differences of arrival times of the ultrasonic waves; thus, this position is defined as a position of the hand of the person 305. Moreover, by preliminarily registering the ID of the person 305 in the ultrasonic transmitter 802, the hand sensing unit 103 is allowed to collate the registered person database 122 so that it becomes possible to identify who the detected person 305 is. That is, the hand sensing unit 103 also identifies the ID of the person by using the registered person database 122. Upon recognizing the ID of the person, differences or the like of the holding states the article depending on persons can be found by allowing the hand sensing unit 103 to refer to the article holding-state related database 123 and the like.

FIG. 10 shows an example of the registered person database 122. In FIG. 10, ID information 901 and registered person name information 902 are registered in the registered person database 122. As another example of detecting the position of the hand of the person 305, a method may be proposed in which an image is picked up by using the image sensor 301 (or by using an image picked up by the article sensing unit 101), and a skin color region in the picked-up image is extracted by the image recognizing unit 300 so that the resulting region is tracked. For example, a method, disclosed by JP-A No. 2007-148663 and the like, may be used.

The resulting information obtained by the above-mentioned processes is registered in the hand detection history database 104.

Figure 11:
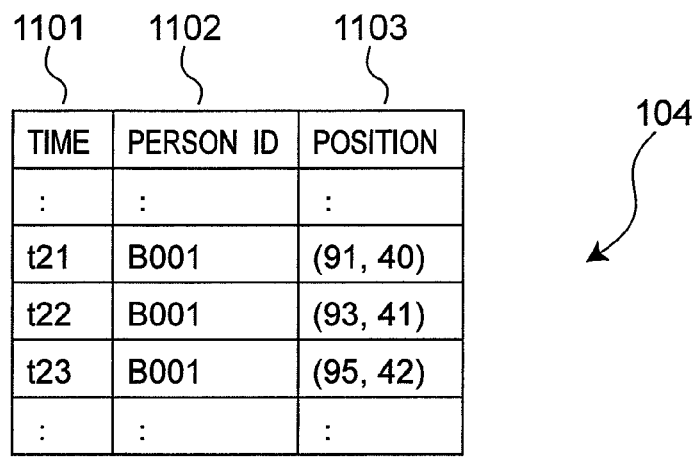
FIG. 11 is a view showing an example of a hand detection history database in accordance with the first embodiment of the present invention.

FIG. 11 shows an example of the hand detection history database 104 in which the resulting information has been registered. In the hand detection history database 104, information 1101 of detected time, ID information 1102 of the detected hand (corresponding to the ID information of the person 305 having the hand) and information (XY coordinates) 1103 of the detected position are registered.

<<Sensing Control Means>>

For example, as shown in FIG. 3, the sensing control unit 1220 controls the camera 301 serving as one example of an image sensor so as to be moved along a rail 1221 vertically placed by using a moving device 1222 so that the three-dimensional position of the camera 301 is changed. Thus, image pickup processes are carried out by the camera 301 from different positions so that, by changing image information of an object (article or person) located in the image-pickup environmental space 91, image information to be used in the image recognizing unit 300 constituting the article sensing unit 101, the hand sensing unit 103 and the like can be controlled. In this manner, pieces of image information with various angles (in the case where no obstacle is present between the image sensor 301 and the object, pieces of image information of the object viewed from all the directions of 360 degrees) can be obtained in a manner so as to correspond to the positional relationship between the hand and the article registered in a holding-state registering database 112 and the article holding-state related database 123, which will be described later. In specific controlling operations, which will be described later, for example, by changing the position of the image sensor 301 to the height of the hand detected by the hand sensing unit 103, image information of an object located in the environmental space is obtained.

<<Holding-State Determination Processing Means>>

Referring to the position of the hand registered in the hand detection history database 104, as well as referring further to the article detection history database 102, holding-state determination processing unit 107 determines how the person is holding the article, or whether nothing is held by the person, based upon the positional information between the hand and an article located on the periphery thereof.

Figure 12A:
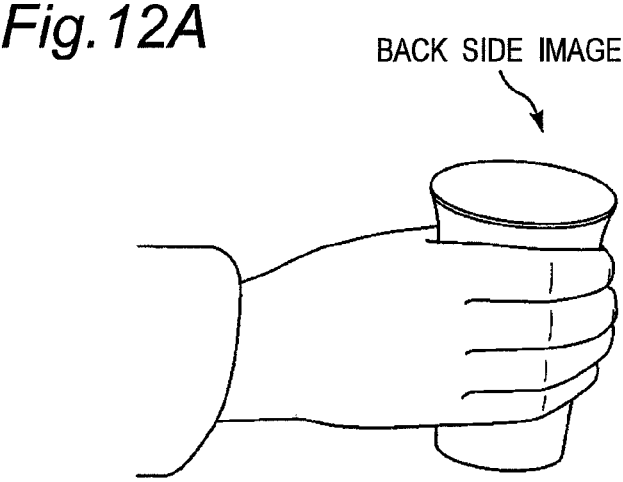
FIG. 12A is a view showing an example of a picked-up image of a hand and its peripheral region taken from the back of the hand in the first embodiment of the present invention.
Figure 12B:
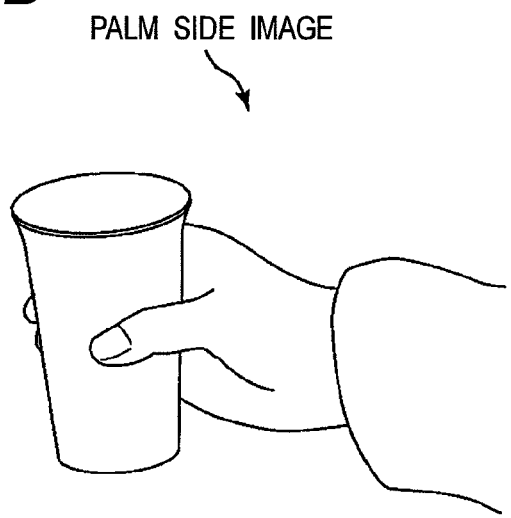
FIG. 12B is a view showing an example of a picked-up image of a hand and its peripheral region taken from the palm side of the hand in the first embodiment of the present invention.

The determination is carried out by comparing images of the hand and the peripheral region thereof, obtained by controlling the plurality of cameras 301 by the sensing control unit 1220. FIG. 12A is an image of the hand picked up from the back side thereof, and FIG. 12B is an image of the hand picked up from the palm side thereof. As long as images taken from many directions can be obtained by the person who moves about, it is not necessarily required to install a plurality of cameras 301. Moreover, a distinction between an image of the back side of the hand and an image of the palm side of the hand can be made, for example, in a following manner. After two images have been acquired, the image having a more hand region can be dealt as an image of the back side of the hand, and the image having less hand region can be dealt as an image of the palm side of the hand.

Figure 13:
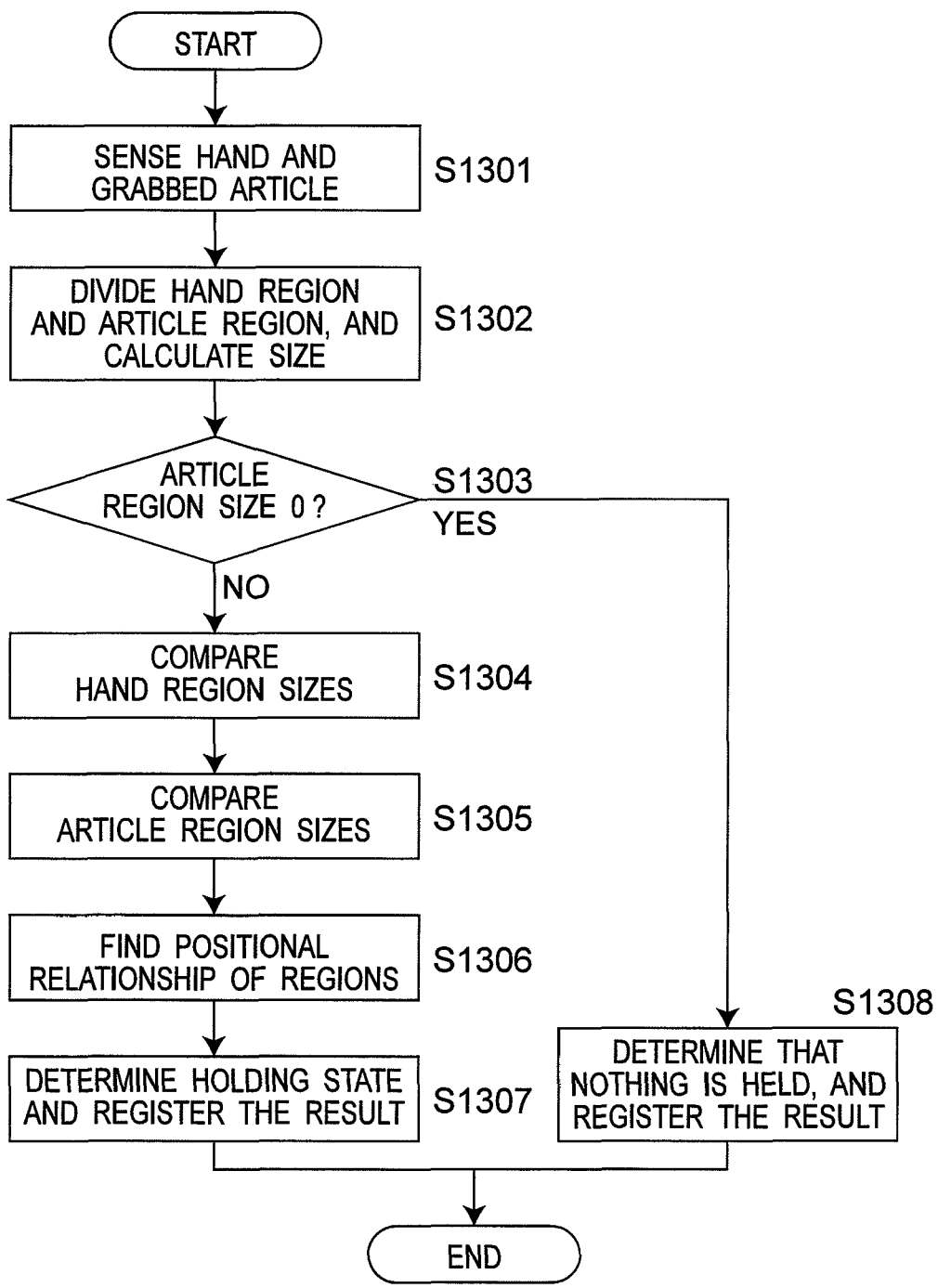
FIG. 13 is a view describing a processing flow of holding-state determination processing unit in the first embodiment of the present invention.

Referring to FIG. 13, the following description will discuss the contents of holding-state determining processes by the holding-state determination processing unit 107.

First, in step S1300, the sensing control unit 1220 controls the height position of the camera 301. For example, a shifting device 1222 is drive-controlled to control the height of the camera 301 so that the camera 301 is located at a position corresponding to the height direction of the hand detected by the hand sensing unit 103; thus, image information of the hand of a person 305 and the peripheral region of the hand can be picked up by the camera 301 and acquired. In this case, for example, picked-up images of the hand of the person 305 and the article grabbed by the hand can be obtained.

Next, in step S1301, from the image information of the hand and the peripheral region of the hand obtained by the camera 301, the hand of a person and an article that is located on the periphery thereof (an article estimated as being held by the hand of the person 305) are detected by using the article sensing unit 101 and the image recognizing unit 300 of the hand sensing unit 103. A hand detecting process is carried out by the hand sensing unit 103, by using a skin color detection or the like using the image recognizing unit 300 that processes the picked-up image of the image sensor 301. With respect to a predetermined region centered on the position of the detected hand (for example, a spherical region having a diameter of 50 cm centered on the position of the hand), the image recognizing unit 300 is allowed to extract a differential region from the preliminarily acquired background image so that a hand and an article located on the periphery of the hand are detected by the image recognizing unit 300.

Figure 14A:
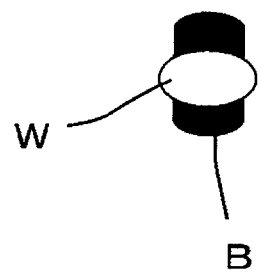
FIG. 14A is a view showing an example of an image of a hand region and a region of an article held by the hand extracted from FIG. 12A in the first embodiment of the present invention.
Figure 14B:
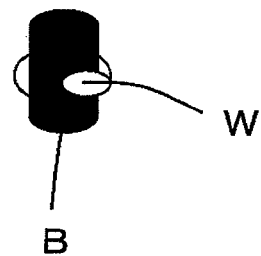
FIG. 14B is a view showing an example of an image of a hand region and a region of an article held by the hand extracted from FIG. 12B in the first embodiment of the present invention.

In this case, the height positions of two cameras 301 are controlled by the sensing control unit 1220 so that images of two sides of one hand (the back side and the palm side of the hand) can be simultaneously picked up. Based upon the image information of the hand thus obtained, the image recognizing unit 300 carries out an image recognizing process, and the image information picked up from a direction that has more skin-color region to be viewed is referred to as "back side image of the hand" (see FIG. 12A), while the image information picked up from a direction that has less skin-color region to be viewed, that is, from the palm side of the hand, is referred to as "palm side image of the hand" (see FIG. 12B). FIGS. 14A and 14B respectively show examples of images extracted from "the back side image of the hand" (see FIG. 12A) and "the palm side image of the hand" (see FIG. 12B). In FIGS. 14A and 14B, a white portion W having an elliptical shape represents the hand portion, and a black column shaped portion B represents an article portion (a glass, in this example).

Figure 1B:
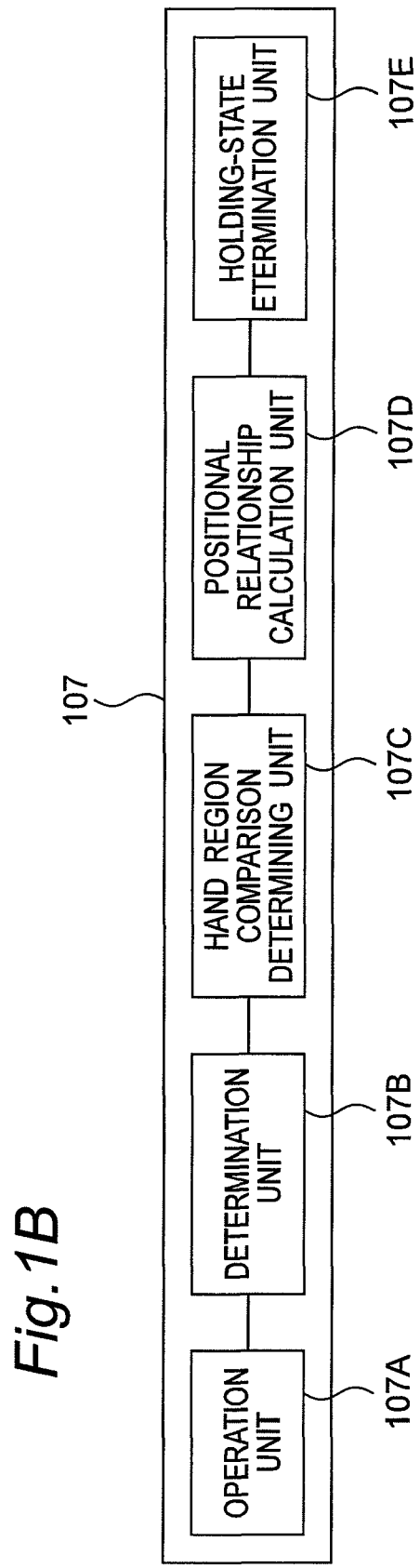
FIG. 1B is a functional block diagram relating to holding-state determination processing unit in the article estimating apparatus and the article position estimating apparatus in accordance with the first embodiment of the present invention.
Figure 15A:
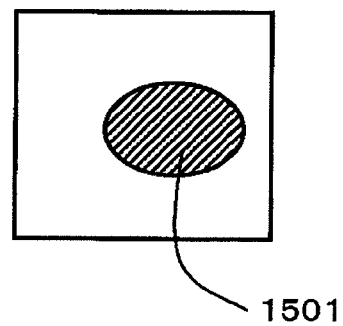
FIG. 15A is a view showing an example of an image obtained by detecting the hand region and the article region in the first embodiment of the present invention.
Figure 15B:
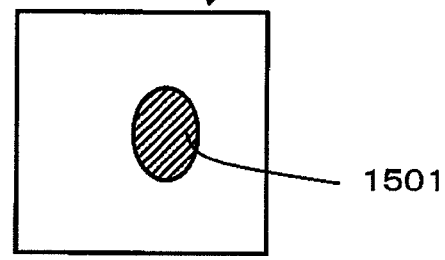
FIG. 15B is a view showing another example of an image obtained by detecting the hand region and the article region in the first embodiment of the present invention.
Figure 15C:
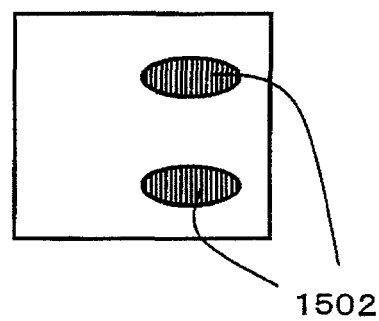
FIG. 15C is a view showing still another example of an image obtained by detecting the hand region and the article region in the first embodiment of the present invention.

Next, in step S1302, the hand region and the article region are respectively divided so that the sizes of the respective regions are found. More specifically, among regions detected by carrying out the image recognizing process in step S1301 by the image recognizing unit 300, the skin color region is defined as the hand region, and the region other than the skin color region is defined as an article region. Moreover, the areas of the respective regions are found by an operation unit 107A (see FIG. 1B) forming one portion of the holding-state determination processing unit 107. FIGS. 15A to 15D respectively show a hand region 1501 including an image of the back side of the hand and an image of the palm side of the hand, and an article region 1502 including an image viewed from the back side of the hand and an image viewed from the palm side of the hand. FIG. 15C shows a state in which the article region 1502 is divided into a plurality of joint components.

Next, in step S1303, a determination unit 107B (see FIG. 1B) forming one portion of the holding-state determination processing unit 107 is allowed to determine whether or not the size of the article region 1502 is 0 (zero). In the case where a hand region comparison determining unit 107C (see FIG. 1B) forming one portion of the holding-state determination processing unit 107 has determined that the sizes of the article region 1502 are 0 in both of the image of the back side of the hand and the image of the palm side of the hand, it is determined that nothing is held by the hand of the person in step S1308, and the information of the determination result is registered in the holding-state determination result history database 108 so that the holding-state determining processes are completed. Moreover, in the case where, in step S1303, a hand-region comparison determining unit 107C forming one portion of the holding-state determination processing unit 107 determines that the size of the article region 1502 is not 0, the sequence proceeds to the next step S1304.

In the case where, by referring to the hand detection history database 104, the position of the hand is kept higher than the height of the waist for a predetermined continuous time, it may be determined that the person has a small article that fits in the hand.

In step S1304, with respect to the hand region 1501, the sizes of the image on the back side of the hand and the image on the palm side of the hand are compared with each other by the hand region comparison determining unit 107C that forms one portion of the holding-state determination processing unit 107.

If it is determined that the size of the hand region 1501 of the image of the back side of the hand and the size of the hand region 1501 of the image of the palm side of the hand are substantially equal to each other, the hand region comparison determining unit 107C forming one portion of the holding-state determination processing unit 107 defines this state as "type A1", and if it is determined that the size of the hand region 1501 of the image of the back side of the hand is larger than the size of the hand region 1501 of the image of the palm side of the hand, the hand region comparison determining unit 107C forming one portion of the holding-state determination processing unit 107 defines this state as "type A2".

Next, in step S1305, with respect to the sizes of the article region 1502, the image of the back side of the hand and the image of the palm side of the hand are compared with each other, by the hand region comparison determining unit 107C forming one portion of the holding-state determination processing unit 107. If it is determined that the size of the article region of the image of the back side of the hand and the size of the article region of the image of the palm side of the hand are substantially equal to each other, the hand region comparison determining unit 107C forming one portion of the holding-state determination processing unit 107 defines this state as "type B1", and it is determined that the size of the article region of the image of the back side of the hand is larger than the size of the article region of the image of the palm side of the hand, the hand region comparison determining unit 107C forming one portion of the holding-state determination processing unit 107 defines this state as "type B2". In this case, it is assumed that, upon holding an article by the hand, the size of the article region of the image on the back side of the hand normally becomes smaller than the size of the article region of the image on the palm side of the hand.

Figure 15D:
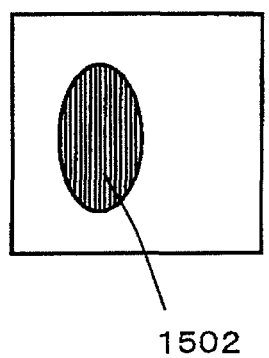
FIG. 15D is a view showing yet another example of an image obtained by detecting the hand region and the article region in the first embodiment of the present invention.

Next, in step S1306, the positional relationship of the hand region 1501 and the article region 1502 is found by the positional relationship calculation unit 107D (see FIG. 1B) forming one portion of the holding-state determination processing unit 107. That is, more specifically, the positional relationship is found by a positional relationship calculation unit 107D forming one portion of the holding-state determination processing unit 107, through processes in which the respective positions of centers of gravity of the regions of the hand region 1501 and the article region 1502 are found by a positional relationship calculation unit 107D forming one portion of the holding-state determining unit 107, and based upon the positional relationship between the centers of gravity of the respective regions thus found, it is found by the positional relationship calculation unit 107D forming one portion of the holding-state determining unit 107. In the case where each of the regions is divided into a plurality of joined components (for example, in the case where the article region 1502 is divided into a plurality of joined components as shown in FIG. 15D), the position of the center of gravity is used for each of the joined components. The specific description thereof will be given in a specific determination on the holding method described below.

Next, in step S1307, the determination of the holding state is carried out by a holding-state determination unit 107E (see FIG. 1B) that forms one portion of the holding-state determination processing unit 107. By referring to the holding-state registering database 112 by the holding-state determination unit 107E that forms one portion of the holding state processing unit 107, and based upon the determination conditions, the holding state is determined by the holding-state determination unit 107E forming one portion of the holding state processing unit 107 so that the resulting information of the determination is registered in the holding-state determination result history database 108 by the holding-state determination unit 107E that forms one portion of the holding state processing unit 107, thereby completing the holding-state determining process. In this case, the resulting information of the determination to be registered in the holding-state determination result history database 108 includes ID information of the holding state, time acquired from the time acquiring unit 100 at the time of the determination and ID information of the person (see FIG. 19).

Figure 16:
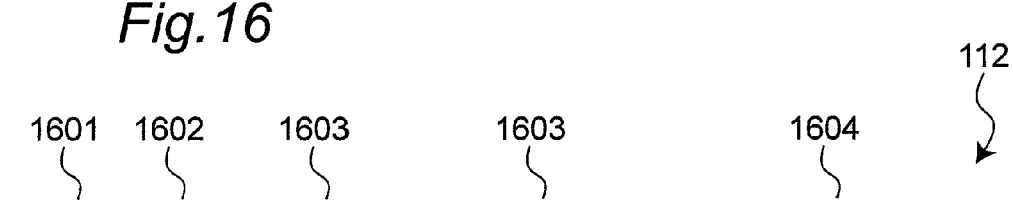
FIG. 16 is a view showing an example of a holding-state registering database in the first embodiment of the present invention.
Figure 17A:
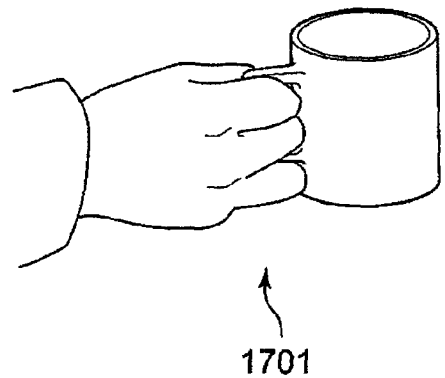
FIG. 17A is a view showing an example of a picked-up image that indicates the holding state of the article by the hand in the first embodiment of the present invention.
Figure 17B:
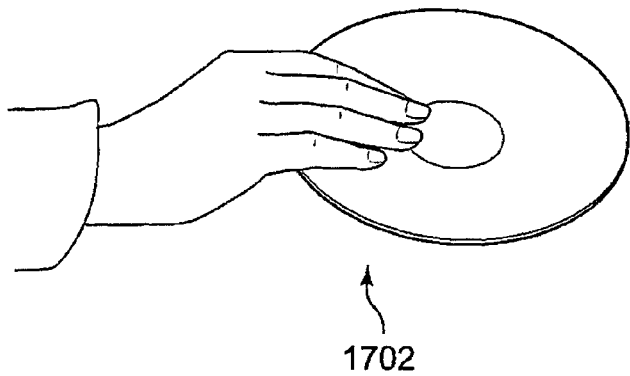
FIG. 17B is a view showing another example of picked-up image that indicates a holding state of an article by the hand in accordance with the first embodiment of the present invention.
Figure 17C:
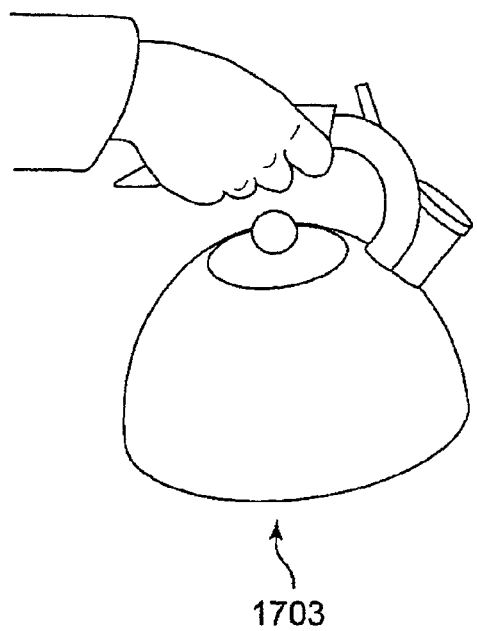
FIG. 17C is a view showing another example of a picked-up image that indicates a holding state of an article by the hand in accordance with the first embodiment of the present invention.
Figure 17D:
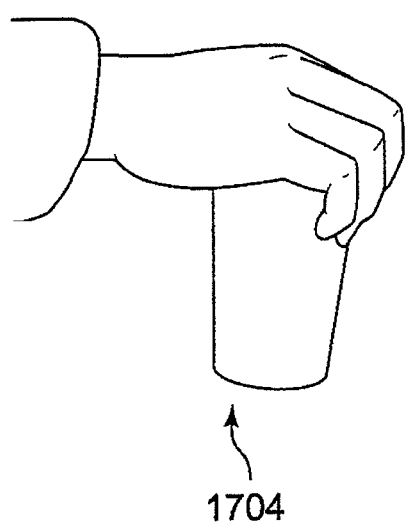
FIG. 17D is a view showing another example of a picked-up image that indicates a holding state of an article by the hand in accordance with the first embodiment of the present invention.
Figure 17E:
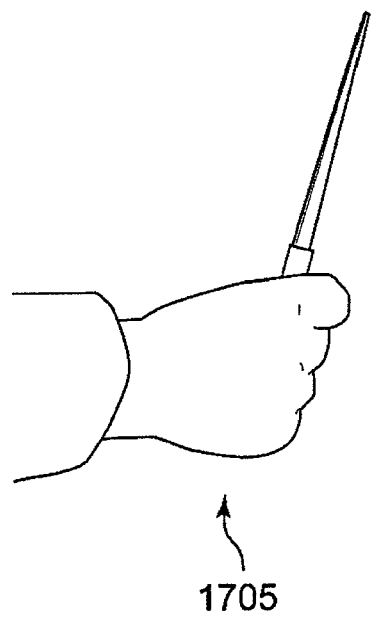
FIG. 17E is a view showing still another example of a picked-up image that indicates a holding state of an article by the hand in accordance with the first embodiment of the present invention.
Figure 17F:
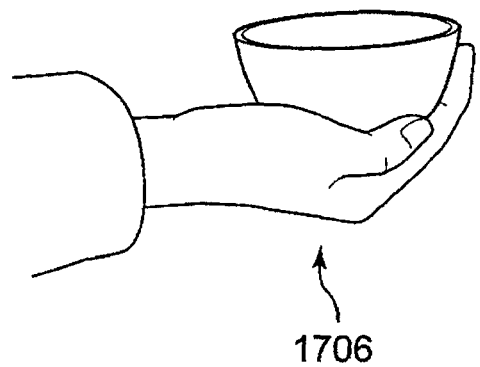
FIG. 17F is a view showing yet another example of a picked-up image that indicates a holding state of an article by the hand in accordance with the first embodiment of the present invention.
Figure 17G:
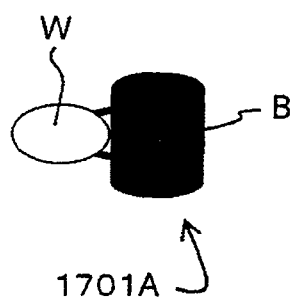
FIG. 17G is a view showing an example of images indicating the hand region and the article region respectively extracted from the picked-up image of FIG. 17A in the first embodiment of the present invention.
Figure 17H:
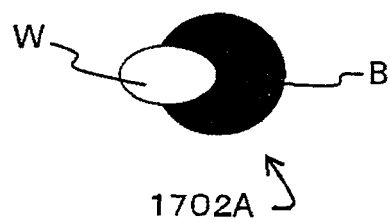
FIG. 17H is a view showing an example of images indicating the hand region and the article region respectively extracted from the picked-up image of FIG. 17B in the first embodiment of the present invention.
Figure 17I:
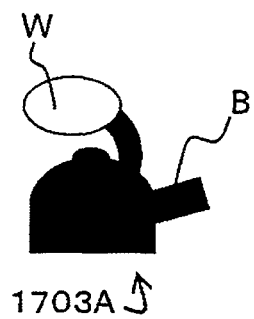
FIG. 17I is a view showing an example of images indicating the hand region and the article region respectively extracted from the picked-up image of FIG. 17C in the first embodiment of the present invention.
Figure 17J:
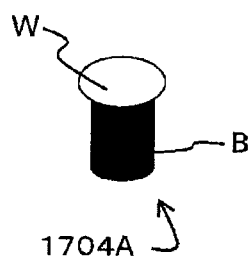
FIG. 17J is a view showing an example of images indicating the hand region and the article region respectively extracted from the picked-up image of FIG. 17D in the first embodiment of the present invention.
Figure 17K:
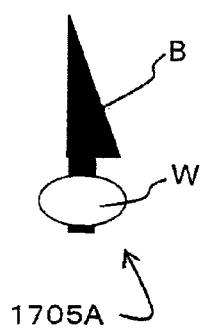
FIG. 17K is a view showing an example of images indicating the hand region and the article region respectively extracted from the picked-up image of FIG. 17E in the first embodiment of the present invention.
Figure 17L:
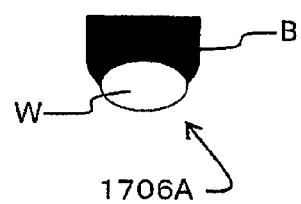
FIG. 17L is a view showing an example of images indicating the hand region and the article region respectively extracted from the picked-up image of FIG. 17F in the first embodiment of the present invention.
Figure 18A:
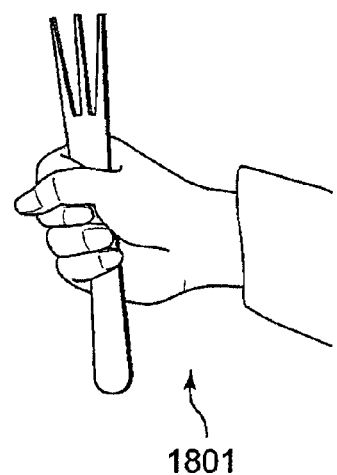
FIG. 18A is a view showing an example of a picked-up image that indicates the holding state of the article by the hand in the first embodiment of the present invention.
Figure 18B:
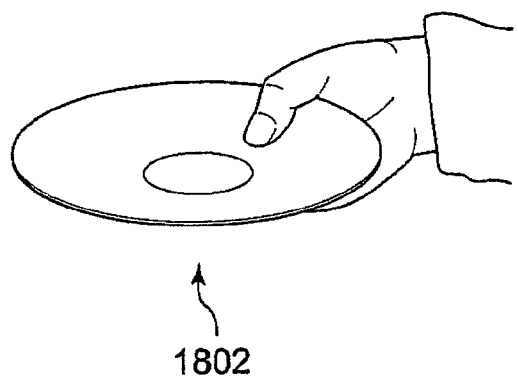
FIG. 18B is a view showing another example of a picked-up image that indicates a holding state of an article by the hand in accordance with the first embodiment of the present invention.
Figure 18C:
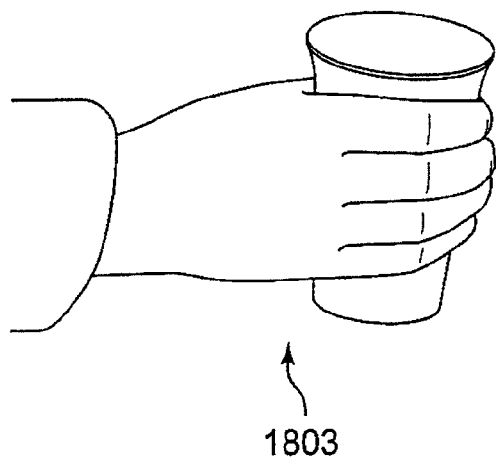
FIG. 18C is a view showing still another example of a picked-up image that indicates a holding state of an article by the hand in accordance with the first embodiment of the present invention.
Figure 18D:
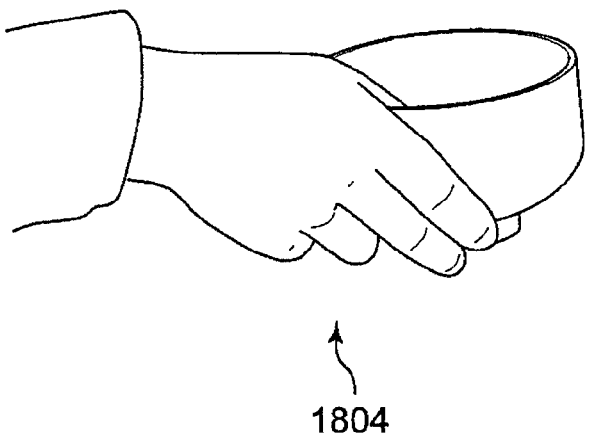
FIG. 18D is a view showing still another example of a picked-up image that indicates a holding state of an article by the hand in accordance with the first embodiment of the present invention.
Figure 18E:
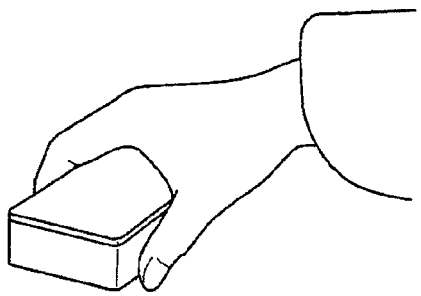
FIG. 18E is a view showing yet another example of a picked-up image that indicates a holding state of an article by the hand in accordance with the first embodiment of the present invention.
Figure 18F:
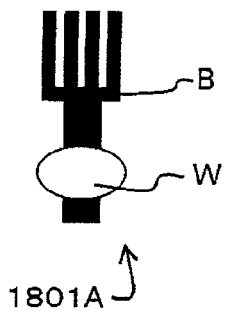
FIG. 18F is a view showing an example of images indicating the hand region and the article region respectively extracted from the picked-up image of FIG. 18A in the first embodiment of the present invention.
Figure 18G:
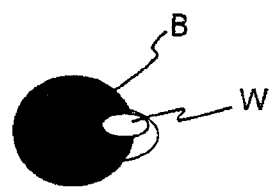
FIG. 18G is a view showing an example of images indicating the hand region and the article region respectively extracted from the picked-up image of FIG. 18B in the first embodiment of the present invention.
Figure 18H:
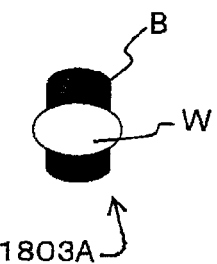
FIG. 18H is a view showing an example of images indicating the hand region and the article region respectively extracted from the picked-up image of FIG. 18C in the first embodiment of the present invention.

FIG. 16 shows an example of the holding-state registering database 112. In this database, ID information 1600 of the person, ID information 1601 relating to the holding state, information 1602 relating to the size comparison result of the hand region 1501 in step S1304 serving as a determination condition of the holding state, information 1603 relating to the size comparison result of the article region 1502 and information 1604 indicating the positional relationship between the hand region 1501 and the article region 1502 are registered. In the information 1604 indicating the positional relationship between the hand region 1501 and the article region 1502, the left side is defined as the body side of the person, the circle represents the center of gravity of the hand region 1501, and the square represents the center of gravity of the article region 1502.

In FIG. 16, holding state ID=C001 on the second stage from above of the holding-state registering database 112 includes the size comparison result of the hand region=A1 (referred to as type A1) and the size comparison result of the article region=B1 (referred to as type B1), and represents a positional relationship between the hand region and the article region in which the article region is present in front of the hand region. This case, for example, corresponds to holding states (respectively exemplified as 1701 in FIGS. 17A and 1701A in FIG. 17G) in which the handle of a mug is grabbed by the hand. Alternatively, this case corresponds to holding states in which a plate is grabbed by the hand from the front side and raised (respectively exemplified as 1702 in FIGS. 17B and 1702A in FIG. 17H). Note that FIGS. 17A to 17F are picked-up images showing states in which an article is held by the hand, and FIGS. 17G to 17L show examples of images 1701A, 1702A, 1703A, 1704A, 1705A and 1706A indicating the hand region and the article region respectively extracted from picked-up images 1701, 1702, 1703, 1704, 1705 and 1706 of FIGS. 17A to 17F. In FIGS. 17G to 17L, the portion W having a white elliptical shape represents the hand portion, and the portion B having a black column shape represents an article portion (in this case, a glass).

In FIG. 16, holding state ID=C002 on the third stage from above of the holding-state registering database 112 of FIG. 16 includes the size comparison result of the hand region=A1 and the size comparison result of the article region=B1, and represents a positional relationship between the hand region and the article region in which the article region is present below the hand region. This case corresponds to holding states (respectively exemplified as 1703 in FIGS. 17C and 1703A in FIG. 17I) in which, for example, the handle of a tea pot is grabbed by the hand. Alternatively, this case corresponds to holding states in which the upper portion of a glass is grabbed by the hand from above (respectively exemplified as 1704 in FIGS. 17D and 1704A in FIG. 17J).

In FIG. 16, holding state ID=C003 on the fourth stage from above of the holding-state registering database 112 includes the size comparison result of the hand region=A1 and the size comparison result of the article region=B1, and represents a positional relationship between the hand region and the article region in which the article region is present above the hand region. This case, for example, corresponds to holding states (respectively exemplified as 1705 in FIGS. 17E and 1705A in FIG. 17K) in which the edge portion of the grip of a knife is grabbed by the hand. Alternatively, this case corresponds to holding states in which a small plate is supported by the hand from below (respectively exemplified as 1706 in FIGS. 17F and 1706A in FIG. 17L).

In FIG. 16, holding state ID=C004 on the fifth stage from above of the holding-state registering database 112 includes the size comparison result of the hand region=A1 and the size comparison result of the article region=B1, and represents a positional relationship between the hand region and the article region in which article regions are present above and below the hand region. This case corresponds to holding states (respectively exemplified as 1801 in FIGS. 18A and 1801A in FIG. 18F) in which, for example, the center of the grip of a fork is grabbed by the hand. Additionally, FIGS. 18A to 18E are picked-up images showing states in which an article is held by the hand, and FIGS. 18F to 18J show examples of images 1801A, 1802A, 1803A, 1804A and 1805A indicating the hand region and the article region respectively extracted from picked-up images 1801, 1802, 1803, 1804 and 1805 of FIGS. 18A to 18E. In FIGS. 18F to 18J, the portion W having a white elliptical shape represents the hand portion, and the portion B having a black column shape represents an article portion (in this case, a glass).

In FIG. 16, holding state ID=C005 on the sixth stage from above of the holding-state registering database 112 includes the size comparison result of the hand region=A2 and the size comparison result of the article region=B1, and represents a positional relationship between the hand region and the article region in which the article region is present on the rear side of the hand region in an image showing the back side of a hand, and the article region is also present on the front side of the hand region in an image showing the palm side of the hand. This case corresponds to holding states (respectively exemplified as 1802 in FIGS. 18B and 1802A in FIG. 18G) in which, for example, a plate is held by the hand in a manner so as to scoop sideways.

In FIG. 16, holding state ID=C006 on the seventh stage from above of the holding-state registering database 112 includes the size comparison result of the hand region=A2 and the size comparison result of the article region=B2, and represents a positional relationship between the hand region and the article region in which the article regions are present above and below the hand region on an image showing the back side of the hand, and the article region is present in front of the hand region on an image showing the palm side of the hand. This case corresponds to holding states (respectively exemplified as 1803 in FIGS. 18C and 1803A in FIG. 18H) in which a glass is grabbed by the hand sideways.

In FIG. 16, holding state ID=C007 on the eighth stage from above of the holding-state registering database 112 includes the size comparison result of the hand region=A2 and the size comparison result of the article region=B2, and represents a positional relationship between the hand region and the article region in which the article region is present in front of the hand region on an image showing the back side of the hand, and the article region is also present in front of the hand region on an image showing the palm side of the hand. This case corresponds to holding states (respectively exemplified as 1804 in FIGS. 18D and 1804A in FIG. 18I) in which a bowl is grabbed by the hand sideways.

In FIG. 16, holding state ID=C008 on the ninth stage from above of the holding-state registering database 112 includes the size comparison result of the hand region=A2 and the size comparison result of the article region=B2, and represents a positional relationship between the hand region and the article region in which the article region is present below the hand region on an image showing the back side of the hand, and the article region is also present below the hand region on an image showing the palm side of the hand. This case corresponds to holding states (respectively exemplified as 1805 in FIGS. 18E and 1805A in FIG. 18J) in which, for example, a sponge is grabbed by the hand from above and raised.

In FIG. 16, holding state ID=C009 on the tenth stage from above of the holding-state registering database 112 includes the size comparison result of the hand region=A2 and the size comparison result of the article region=B2, and represents a positional relationship between the hand region and the article region in which the article regions are present on the front side and rear side of the hand region in an image showing the back side of the hand, and the article regions are also present on the front side and rear side of the hand region in an image showing the palm side of the hand. This case corresponds to a holding state (exemplified as 2301 in FIG. 23A) in which, for example, a book is held by the hand.

Next, FIG. 19 shows an example of the holding-state determination result history database 108 in which the resulting information of the determination is registered in step S1307. In the holding-state determination result history database 108, time information 1901, ID information 1902 of the person relating to the holding state thus determined, and ID information of the holding state thus determined are registered. In the case where, in step S1308, it has been determined that "nothing is held", it is supposed that C000 is registered in ID information 1903 of the holding state. In FIG. 19, C000 is registered in ID 1903 of the holding state from time t1 to time t10, C001 is registered in ID 1903 of the holding state from time t11 to time t99, and C000 is registered in ID 1903 of the holding state from time t100 and thereafter. Therefore, FIG. 19 indicates information relating to the results of detection in that a person having ID=B001 (Hanako), for example, takes up an article to be held in a holding state of ID=C001, for example, a mug, at time t11 and carries and puts the mug on another place at time t99. As a result, it is found that the person having ID=B001 (Hanako) has kept the holding state of ID=C001 from time t11 to time t99.

<<Scene Determination Means>>

Referring to information of the position of the hand registered in the hand detection history database 104 in a time-sequential manner, the scene determination unit 109 calculates a moving track of the hand when a person transfers an article, with the information of the position of the hand being made in association with information of time at which the hand is detected for each of the IDs of the hands corresponding to the moving hand (that is, the ID of the person). Moreover, based upon the moving track, the corresponding scene is determined by the scene determination unit 109. As described earlier, "the scene" corresponds to any one of circumstances that a person takes, upon trying to transfer an article, that is, a circumstance in which the person is taking up an article that is placed (taking-up scene), a circumstance in which the person is transporting the article that has been taken up (transporting scene) and a circumstance in which the person is putting down the holding article (putting-down scene). Therefore, by referring to the holding-state determination result database 108 of FIG. 19, the scene determination may be carried out by the scene determination unit 109 only during a period in which the scene determination unit 109 determines that the person is carrying any article, that is, only upon receipt of the time data in which the holding-state ID other than C000 is registered. However, in the case where the holding-state ID is changed from C000 to an ID other than C000, within a second threshold value time described later, the scene determination is carried out by the scene determination unit 109 as time data at which any holding-state ID other than C000 is registered (that is, time data at which the holding state is determined).

The resulting information of the determination of the scene, executed in the scene determination unit 109, is registered in the scene determination result history database 110.

Hand positional data, registered in the hand detection history database 104 during a period defined by giving a predetermined fixed period of time as a margin before and after the period in which the scene determination unit 109 determines that the person is holding any article (holding-state ID: other than C000) (for example, from one second before "the taking-up scene" to one second after "the putting-down scene"), is extracted by the scene determination unit 109, and the scene determination unit 109 examines the data in a time-sequential manner so that the moving track of the hand can be obtained by the scene determination unit 109. More specifically, the scene determination unit 109 refers to the holding-state determination result history database 108 so that the time data for a period of time from the time at which the holding-state ID has changed from C000 to an ID other than C000 to the time at which the holding-state ID changes from the ID other than C000 to C000, with the holding state being kept for a predetermined period of time or more, is acquired by the scene determination unit 109. The scene determination unit 109 is then allowed to refer to the hand detection history database 104 so that the hand positional data corresponding to the acquired time data is cut out by the scene determination unit 109 for each of the IDs of the hand, and by assuming that the position of the hand is moving time-sequentially, the scene determination unit 109 acquires the moving track of the hand. FIG. 20A is a plan view of a kitchen on which an example 2001 of the moving track found by the scene determination unit 109 is indicated by a dotted line. In FIG. 20B, the example of the moving track is shown as 2002 in a table format. In the table 2002, the moving track is indicated by time and positions of XY coordinates.

By using the positional data of the hand corresponding to the extracted moving track, the scene determination unit 109 calculates the amount of movement per unit time so that the scene determination unit 109 determines the scene. That is, since it is considered that, when a person takes up or puts down an article, a period of time in which the moving speed of the hand slows down naturally continues for more than a predetermined period of time, the scene is determined by the scene determination unit 109 based upon this fact.

With respect to the cut-out data for use in the scene determination by the scene determination unit 109, the amount of movement per unit time is calculated by the scene determination unit 109, and the scene determination unit 109 extracts a time section during which the calculated amount of movement becomes a predetermined threshold value or less (for example, 0.05 m/s) for a first threshold time or more (for example, 3 seconds or more). Moreover, among a plurality of extracted time sections, the time section that comes earliest is determined by the scene determination unit 109 as "the taking-up scene". After the time determined by the scene determination unit 109 as "the taking-up scene", the scene determination unit 109 extracts a time section during which the calculated amount of movement becomes a predetermined threshold value or less (for example, 0.05 m/s) for a second threshold time or more (for example, 3 seconds or more). Then, among a plurality of extracted time sections, the time section that comes latest is determined by the scene determination unit 109 as "the putting-down scene". Furthermore, the scene determination unit 109 determines that a time section between "the taking-up scene" and "the putting-down scene" corresponds to "the transporting scene".

FIG. 21 shows an example of a graph of the amount of movement per unit time thus calculated. With respect to the graph 2101 of the amount of movement per unit time, period of time during which it becomes not more than a preset threshold value (indicated by 1202 in FIG. 21) is extracted by the scene determination unit 109, and the earliest time zone (from time t11 to time t19) is determined as "taking-up scene" 2103 by the scene determination unit 109, and the latest time zone (from time t91 to t99) is determined as "putting-down scene" 2105 by the scene determination unit 109, with the middle zone between "the taking-up scene" 2103 and "the putting-down scene" 2105 being determined as "transporting scene" 2104 by the scene determination unit 109.

In this case, even during 2104 determined as "the transporting scene", there is a period of time during which the amount of movement becomes not more than the threshold value. This period of time is assumed to be a state in which the person changes the holding state upon carrying an article that is difficult to be held, a heavy article or an article with a hot drink contained therein. Upon changing the holding state of the article, it takes time because more actions, such as putting down the article once, taking up the article after having changed the holding state of the article, and again transporting the article, are required in comparison with the taking-up action of the article. Therefore, by taking into account the corresponding period of time by the scene determination unit 109, a period of time after the second threshold value time longer than the first threshold value time is set, and by allowing the scene determination unit 109 to also use the holding-state ID of the article in the following period of time, a determination can be made by the scene determination unit 109 in a manner so as to distinguish the transporting state after changing the holding state of the article from the putting-down state of the article.

Figures 22, 23A:
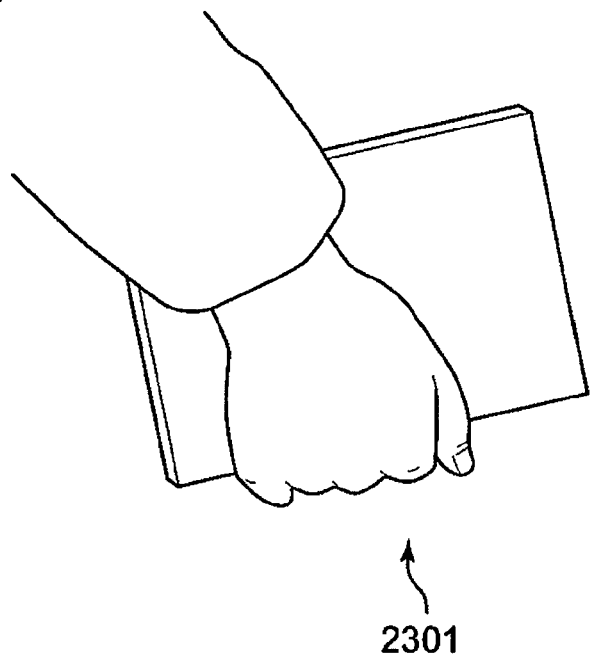
FIG. 22 is a view showing an example of a scene determination result history database in the first embodiment of the present invention.
FIG. 23A is a view showing an example of picked-up image of a scene in which a book is carried in the first embodiment of the present invention.
Figure 23B:
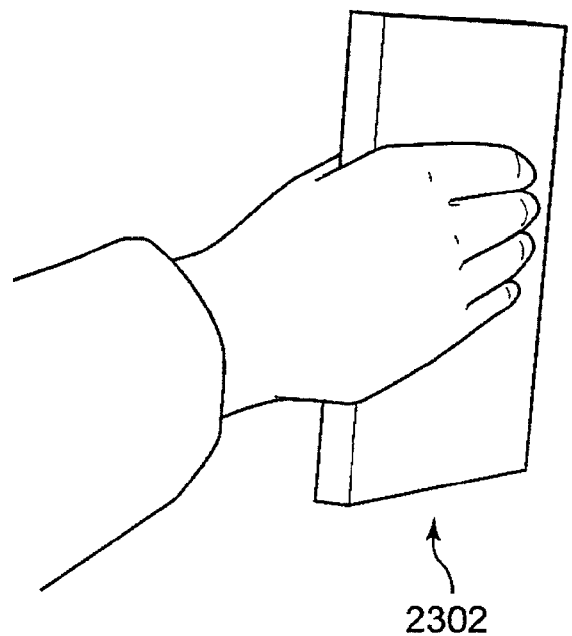
FIG. 23B is a view showing another example of a picked-up image of a scene in which a book is carried in the first embodiment of the present invention.
Figure 23C:
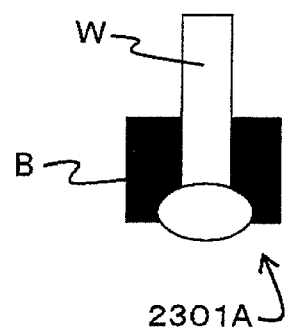
FIG. 23C is a view showing an example of images indicating the hand region and the article region respectively extracted from the picked-up image of FIG. 23A in the first embodiment of the present invention.
Figure 23D:
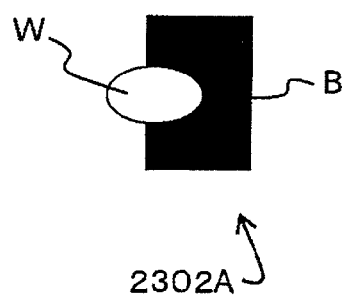
FIG. 23D is a view showing an example of images indicating the hand region and the article region respectively extracted from the picked-up image of FIG. 23B in the first embodiment of the present invention.

FIG. 22 shows an example of the scene determination result history database 110 in which information of the determination results is registered. In the scene determination result history database 110, time information 2201, personal information ID 2203 and information 2202 related to the results of scene determinations are registered.

Note that, in the scene having been determined as "the transporting scene", by allowing the scene determination unit 109 to further refer to the hand detection history database 104, the scene determination unit 109 acquires the fact as to whether the person is walking or making a stop; thus, the scene determination unit 109 may be designed to classify the states of the person into a walking state or a stopped state. For example, as shown in FIGS. 23A to 23D, in "the transporting scene" of a book by the person while walking, the person has the book in a manner so as to hold it by the hand as respectively indicated by 2301 of FIG. 23A and 2301A of FIG. 23C, on the other hand, in "the transporting scene" by the person while making a stop, the person has the book in a manner so as to grab it as respectively indicated by 2302 of FIGS. 23B and 2302A of FIG. 23D; thus, there is a difference between the states. Consequently, the scene determination unit 109 is allowed to obtain more accurate information of the results of assumption, with respect to an article the holding state of which is different depending on the person who is walking or making a stop. Note that, in FIGS. 23C and 23D, a white portion W having an elliptical shape represents the hand portion, and a black column shaped portion B represents an article portion (a book, in this example).

<<First Article Candidate Extraction Means>>

First article candidate extraction unit 114 refers to the holding-state determination result history database 108 and the scene determination result history database 110 so that, by comparing the holding states of an object article with one another depending on the respective scenes, information of candidates of the object article from data registered in the article holding-state related database 123.

Among pieces of information on the results of the holding-state determination of the holding-state determination result history database 108 in the same time zone as each of the times of the respective scenes of "the taking-up scene", "the transporting scene" and "the putting-down scene" of the scene determination result history database 110, the first article candidate extraction unit 114 defines the holding state that has been determined the most as the holding state in the corresponding scene. For example, in the case where information 2401 of the scene determination and information 2402 of the holding-state determination result, as shown in FIG. 24, are obtained, the holding state of "the taking-up scene" is represented by ID=C006, the holding state of "the transporting scene" is represented by ID=C009 and the holding state of "the putting-down scene" is represented by ID=C006.

The first article candidate extraction unit 114 compares the pieces of information of the results with the holding states registered in the article holding-state related database 123 so that an article in which all the correlations between the scene and the holding state are the same is extracted as information of the candidate of the object article by the first article candidate extraction unit 114.

Figure 25:
FIG. 25 is a view describing an example of an article holding-state related database in the first embodiment of the present invention.

FIG. 25 shows an example of the article holding-state related database 123. In the article holding-state related database 123, ID information 2500 of persons, ID information 2501 of articles, information 2502 of item names and information 2503 of the holding states of the article are registered for each of the scenes. The ID information 2501 of the article is commonly used in the registered article database 113. Moreover, the holding state is not necessarily determined uniquely, and with respect to the article that is held in a plurality of holding states, the plurality of holding states are registered in the article holding-state related database 123.

Figure 24:
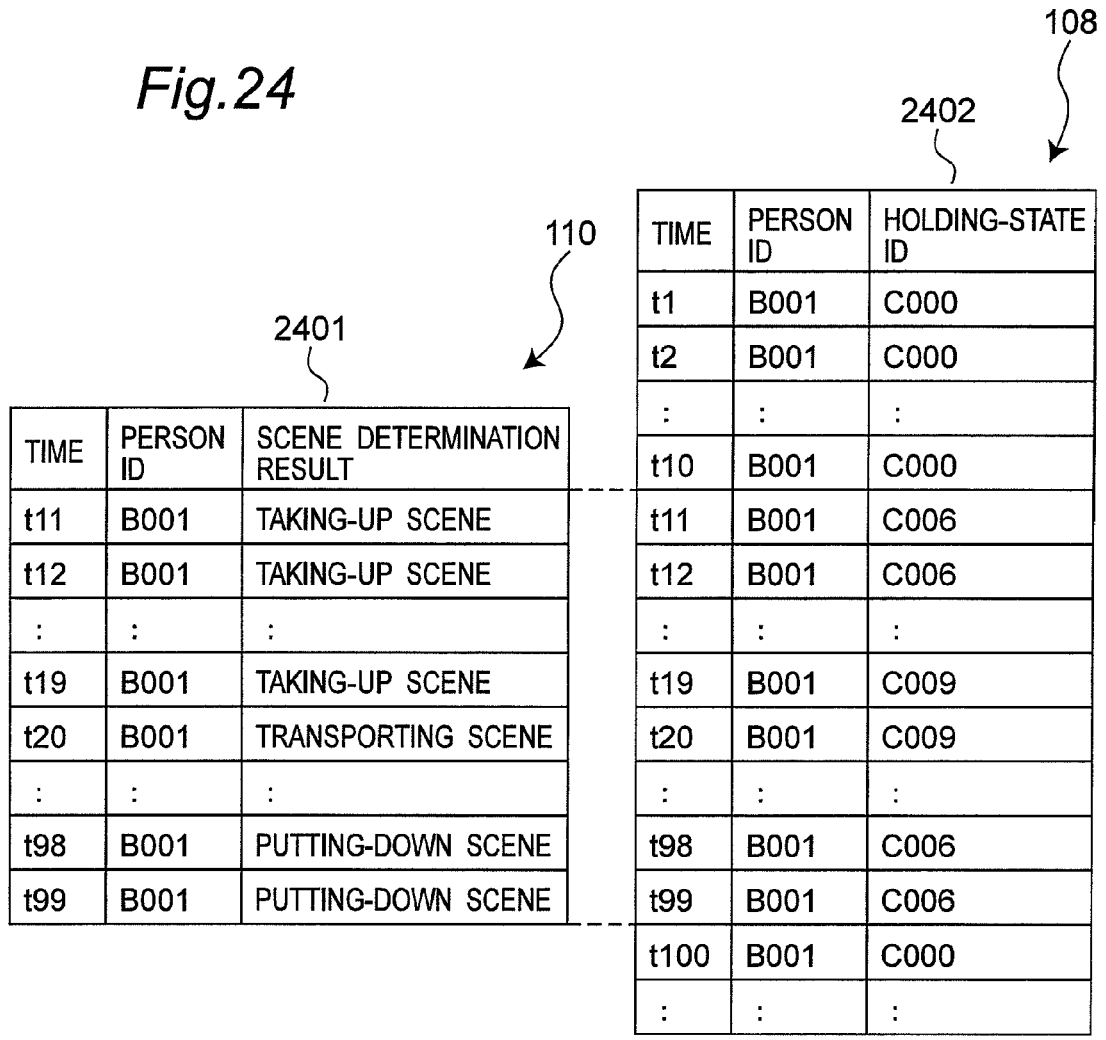
FIG. 24 is a view showing an example of information of scene determination results and information of holding-state determination results in the first embodiment of the present invention.

In the case of the example shown in FIGS. 24 and 25, both of the holding-state IDs of C006 and C009 are included. Therefore, when articles having both of the holding-state IDs of C006 and C009 are extracted by the first article candidate extraction unit 114 from the article holding-state related database 123 of FIG. 25, IDs=A002, A012 and A013 are extracted as the information of candidates of the object article.

<<Second Article Candidate Extraction Means>>

Second article candidate extraction unit 115 refers to the article detection history database 102 and the scene determination result history database 110 so that an article, which is detected at the transfer destination of the moving track of the object article, is extracted as information of the candidate.

Figure 26:
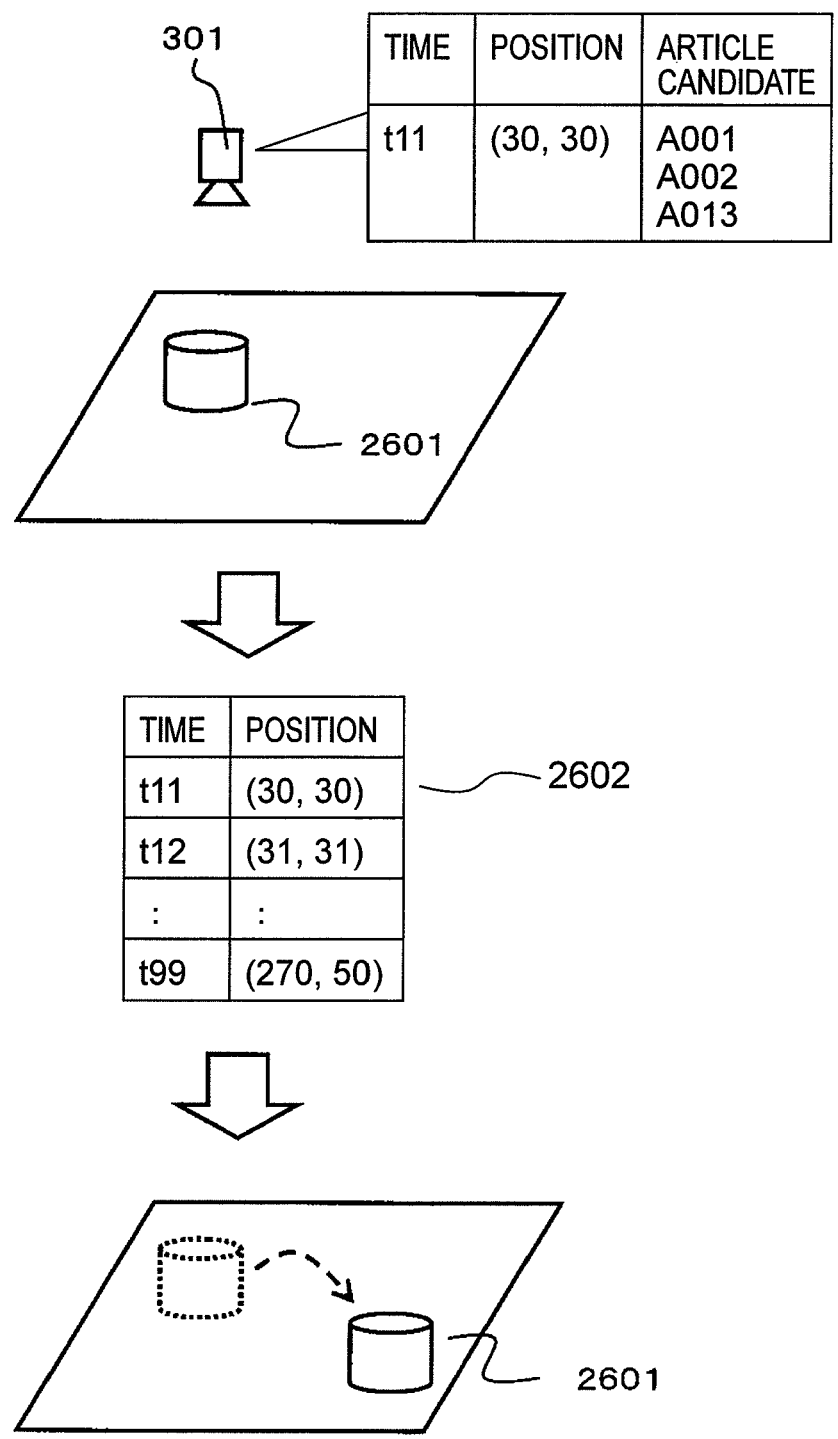
FIG. 26 is a view describing an idea on which second article candidate extraction unit is based in accordance with the first embodiment of the present invention.

FIG. 26 shows the concept of the candidate extraction. First, the camera 301 detects an article 2601 at a position (30, 30) at time t1, and as a result of the image recognition process by the image recognition unit 300, the resulting article is defined as any one of articles A001, A002 and A013, and the resulting information is outputted from the image recognition unit 300. On the other hand, a moving track 2602 indicating that the person has transported any article from a position (30, 30) to a position (270, 50) is obtained by the scene determination unit 109. Then, even in the case where the state of the position (270, 50) is not directly detected, it is assumed by the second article candidate extraction unit 115 that any one of the articles A001, A002 and A013 is present at the position (270, 50).

Figures 42, 43:
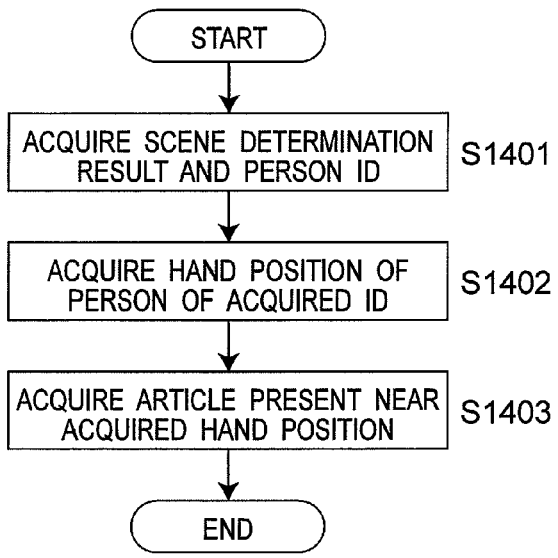
FIG. 42 is a flow chart that specifically describes an extracting method for information of an article candidate in second article candidate extraction unit in the first embodiment of the present invention.
FIG. 43 is a view showing another example of information of scene determination results and information of holding-state determination results in a modified example in the first embodiment of the present invention.

Referring to a flow chart of FIG. 42, the following description will discuss a specific method for extracting article candidates in the second article candidate extraction unit 1125.

First, in step S1401, the scene determination result history database 110 also used upon determination of the scene in step S202 (see FIG. 2) is referred to by the second article candidate extraction unit 1125 so that information as a result of a scene determination for each of the times and the ID of the person corresponding to the moving hands are acquired by the second article candidate extraction unit 1125.

Next, in step S1402, from the information as the result of a scene determination thus acquired, the point of time determined as "the taking-up scene" is acquired by the second article candidate extraction unit 1125 so that among the points of time registered in the hand detection history database 104, the point of time immediately before the specified time is specified by the second article candidate extraction unit 1125. By referring to the hand detection history database 104 by the second article candidate extraction unit 1125, the position of the hand corresponding to the specified point of time and the ID of a person acquired in step S1401 is acquired by the second article candidate extraction unit 1125.

Next, in step S1403, the article detection history database 102 is referred to by the second article candidate extraction unit 1125 so that an article that is located near the hand position at the point of time specified in step S1402 is acquired by the second article candidate extraction unit 1125. The position near the hand is preliminarily defined by the second article candidate extraction unit 1125, for example, as a spherical area having a diameter of 50 cm centered on the position of the hand. Each of articles located within ±25 cm in all the directions and registered in the article detection history database 102 relative to the hand position is determined by the second article candidate extraction unit 1125 as information of the second article candidate, thereby completing the extraction process for information of article candidates by the second article candidate extraction unit 1125.

<<Article Estimating Means>>

The article estimating unit 116 uses pieces of information of candidates of the object article commonly extracted by the first article candidate extraction unit 114 and the second article candidate extraction unit 115 as information of the estimation results of the object article. The information of the estimation results is registered in the article estimation result history database 117.

In the above-mentioned example, the article put at the position (270, 50) is estimated by the article estimating unit 116 as any one of ID=A002 and ID=A013 that are common articles among IDs=A002, A012 and A013 from the information of the extraction results by the first article candidate extraction unit 114 and IDs=A001, A002 and A013 from the information of the extraction results by the second article candidate extraction unit 115.

Figure 27:
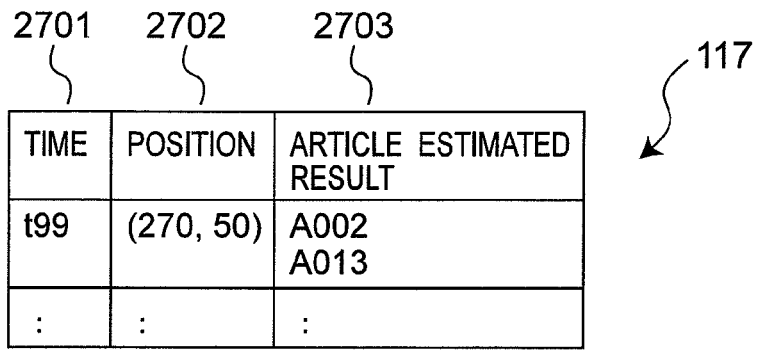
FIG. 27 is a view showing an example of an article estimated result history database in accordance with the first embodiment of the present invention.

FIG. 27 shows an example of the article estimation result history database 117. In the article estimation result history database 117, information 2701 of points of time, positional information 2702 and information 2703 relating to the article estimation result are registered. This example indicates that the article, put at the position (270, 50) at time t99, is estimated by the article estimating unit 116 as either one of ID=A002 and ID=A013.

<<Article Position Estimating Means>>

The article position estimating unit 118 refers to the article detection history database 102 (see FIG. 8) and the article estimation result history database 117 (see FIG. 27) so as to estimate the position of the object article. The information of the estimated results is registered in the article position estimation result history database 119 by the article position estimating unit 118.

Pieces of information of the results of detection and estimation in the same time zone registered in the article detection history database 102 and the article estimation result history database 117 are integrated by the article position estimating unit 118 so that one or more positions of the article registered in the registered article database 113 are estimated by the article position estimating unit 118.

Figure 28A:
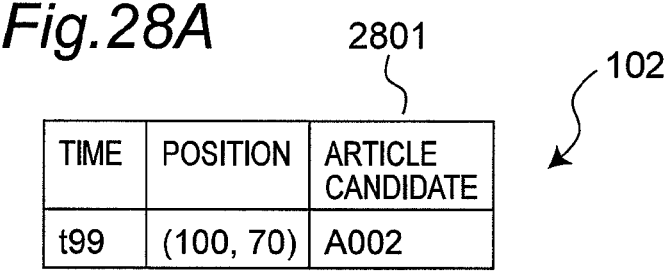
FIG. 28A is a view describing an integrating method for article position estimating unit in accordance with the first embodiment of the present invention.
Figure 28B:
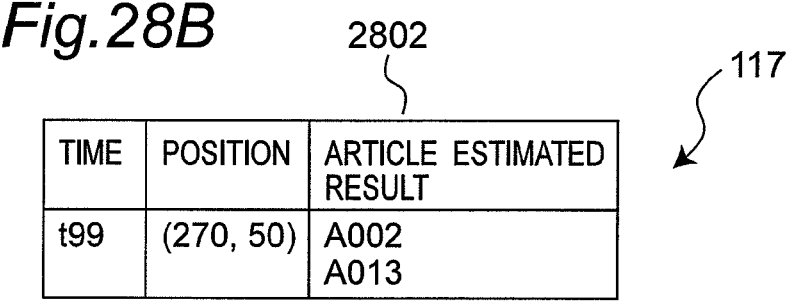
FIG. 28B is a view describing another integrating method for article position estimating unit in accordance with the first embodiment of the present invention.

Referring to FIGS. 28A and 28B, the following description will discuss one example of the integrating method. Suppose that information 2801 of the article candidate in the article detection history database 102 and information 2802 of the result of the article estimation in the article estimation result history database 117 are obtained at time t99. Upon referring to the information 2802 of the result of the article estimation, the article position estimating unit 118 estimates that any one of ID=A002 and ID=A013 is present. On the other hand, upon referring to the information 2801 of the article candidate, the article position estimating unit 118 detects that only the article ID=A002 is present at the position (100, 70). The fact that only the one information of the article candidate is present at one position is considered to provide a higher possibility correspondingly; in contrast, the possibility of the article ID=A002 being present at the position (270, 50) is considered to be lower. That is, the article located at the position (270, 50) is considered to be the article indicated by ID=A013. Therefore, as a result of the integration in the article position estimating unit 118, the state in which the detected result shows that only the article ID=A002 is present at the position (100, 70), rather than the state in which the detected result shows that a plurality of article IDs are present at the position (270, 50), is extracted by the article position estimating unit 118 as information of the results of estimation so that information as the result of estimation that the article ID=A002 is present at the position (100, 70) and the article ID=A013 is present at the position (270, 50) is obtained by the article position estimating unit 118. That is, the information 2801 of the article candidate and the information 2802 of the article estimation result are compared with each other by the article position estimating unit 118, and the state in which only one information of the article candidate is present at one position (for example, only the one article ID=A002 is present at one position (100, 70)) is extracted as information as the result of estimation, while the information 2802 corresponding to the result of estimation of the remaining articles obtained after excluding the extracted article (for example, article ID=A002) from the information 2802 of the article estimation is further compared with the information 2801 of the article candidate, and if there is a state in which only one information of the article candidate is present at one position (for example, only the one article ID=A013 is present at one position (270, 50), this state is also extracted as information as the result of estimation, and the corresponding information as the result of estimation is outputted.

Figure 29A:
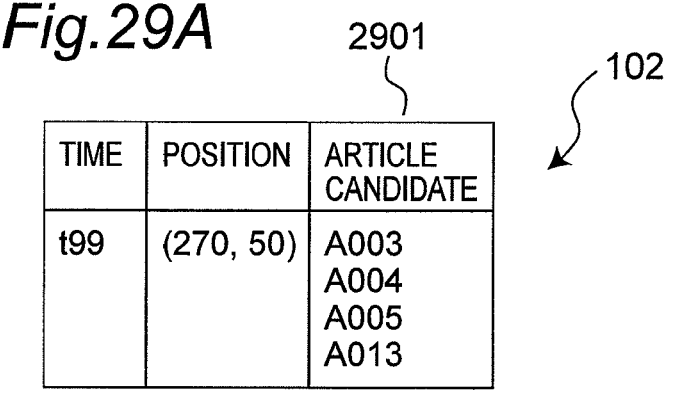
FIG. 29A is a view describing still another integrating method for article position estimating unit in accordance with the first embodiment of the present invention.

Referring to FIGS. 29A and 29B, the following description will discuss another example of the integrating method by the article position estimating unit 118. Suppose that information 2901 as the article candidate of the article detection history database 102 at time t99 and information 2902 as the article estimation result of the article estimation result history database 117 are obtained. Upon referring to the information 2901 of the article candidate, it is detected that at position (270, 50) article IDs=A003, A004, A005 and A013 are present. On the other hand, upon referring to the information 2902 of the article estimation result, it is estimated that either one of article IDs=A002 and A013 is present at the same position (270, 50) as described above. Since both of them detect articles at the same position, the results show that any of the article IDs=A002, A003, A004, A005 and A013 are present at the position (270, 50) when both of them are simply combined with one another. In this case, when the same article is outputted in both of the cases, the possibility of the corresponding article existing at the position is considered to be high. Based upon this idea, although any of the article IDs=A002, A003, A004, A005 and A013 are present at the position (270, 50), the results of integration show that the possibility of the article ID=A013 existing at the position becomes high. The article position estimating unit 118 is allowed to carry out such a determining operation. That is, by comparing the information 2901 of the article candidate and the information 2902 of the result of article estimation, an article (for example, article ID=A013) that is registered at the same position (for example, position (270, 50)) in an overlapped manner is extracted so that the possibility of the extracted article (for example, article ID=A013) existing at the position (for example, position (270, 50)) is estimated to be high, and information as the result of estimation is outputted.

Two simple integration methods by the use of the article position estimating unit 118 have been described above, and as another example, a method is further proposed in which, by allowing the information of the article candidate or the information of the article estimated result to have information of a certain probability for each of the articles, the articles may be estimated on a probability basis. For example, suppose that the first article candidate extraction unit 114 respectively extracts article candidates as the possibility of ID=A001 being set to 60%, the possibility of ID=A002 being set to 30% and the possibility of ID=A003 being set to 10%, and that the second article candidate extraction unit 115 respectively extracts article candidates as the possibility of ID=A001 being set to 40%, the possibility of ID=A002 being set to 40% and the possibility of ID=A003 being set to 20%. In this case, the ratio of probabilities of the article operated by the person is represented by: (ID=A001): (ID=A002): (ID=A003)=60× 40:30×40:10×20. When normalized, the probability of ID=A001 being operated is 63%, the probability of ID=A002 being operated is 32%, and the probability of ID=A003 being operated is 5%. From the above-mentioned processes, the article being operated by the person is determined as the article of ID=A001 having the highest probability. The probability at the time of extracting the first article candidate can be calculated from the tendency of the recognition error upon recognizing the holding state of each of the articles. Moreover, the probability at the time of extracting the second article candidate can be found as the probability of the likelihood of each of the articles, estimated when the article is operated last time. That is, when the person starts an article operation at this position next time, each of the article candidates is extracted while the probability of the second article candidate being ID=A001 is 63%, the probability thereof being ID=A002 is 32% and the probability thereof being ID=A003 is 5%.

FIG. 30 shows an example of the article position estimated result history database 119 in which the information of the estimation results by the article position estimating unit 118 is registered. In the article position estimated result history database 119, time information 3001, positional information 3002 and information 3003 of the article estimated result are registered. That is, as information of the estimated result in the first example of the integrating method by the article position estimating unit 118 using FIGS. 28A and 28B, information indicating the estimated result that at time t99, an article ID=A002 is present at a position (100, 70) and that an article ID=A013 is present at a position (270, 50) is registered therein. Moreover, as information of the estimated result in the second example of the integrating method by the article position estimating unit 118 using FIGS. 29A and 29B, information indicating the estimated result that at time t99, an article. ID=A013 is present at a position (270, 50) is registered therein.

<<Input/Output Means>>

Upon input of an article retrieving request from the user thereto, the input/output unit 120 refers to the article position estimated result history database 119, and outputs the positional information of the article. Moreover, the input/output unit 120 may be connected to another database or another unit so that information of articles or persons used for detecting the corresponding article is preliminarily inputted thereto and registered in the database or the inner storage unit of the other unit. The input/output unit 120 may be designed so as to acquire information of another database or the like through the Internet or the like.

FIG. 31 shows an example of a display screen used for retrieving articles in a monitor 304 serving as one example of the output device as one example of the input/output unit 120. On the monitor 304 as the example of the output device, "Please input an item name to be retrieved" is displayed, and the user inputs an item name (for example, "teapot") thereto by using a keyboard serving as another example of the input device of the input/output unit 120. Based upon the inputted item name, the registered article database 113 of FIG. 7 is referred to by the input/output unit 120 so that, after having been detected that the ID of a teapot corresponds to A008, the article position estimated result history database 119 shown in FIG. 30 is referred to, and the position of A008 at the latest time is found and outputted to the monitor 304 (see FIG. 44).

Figure 44:
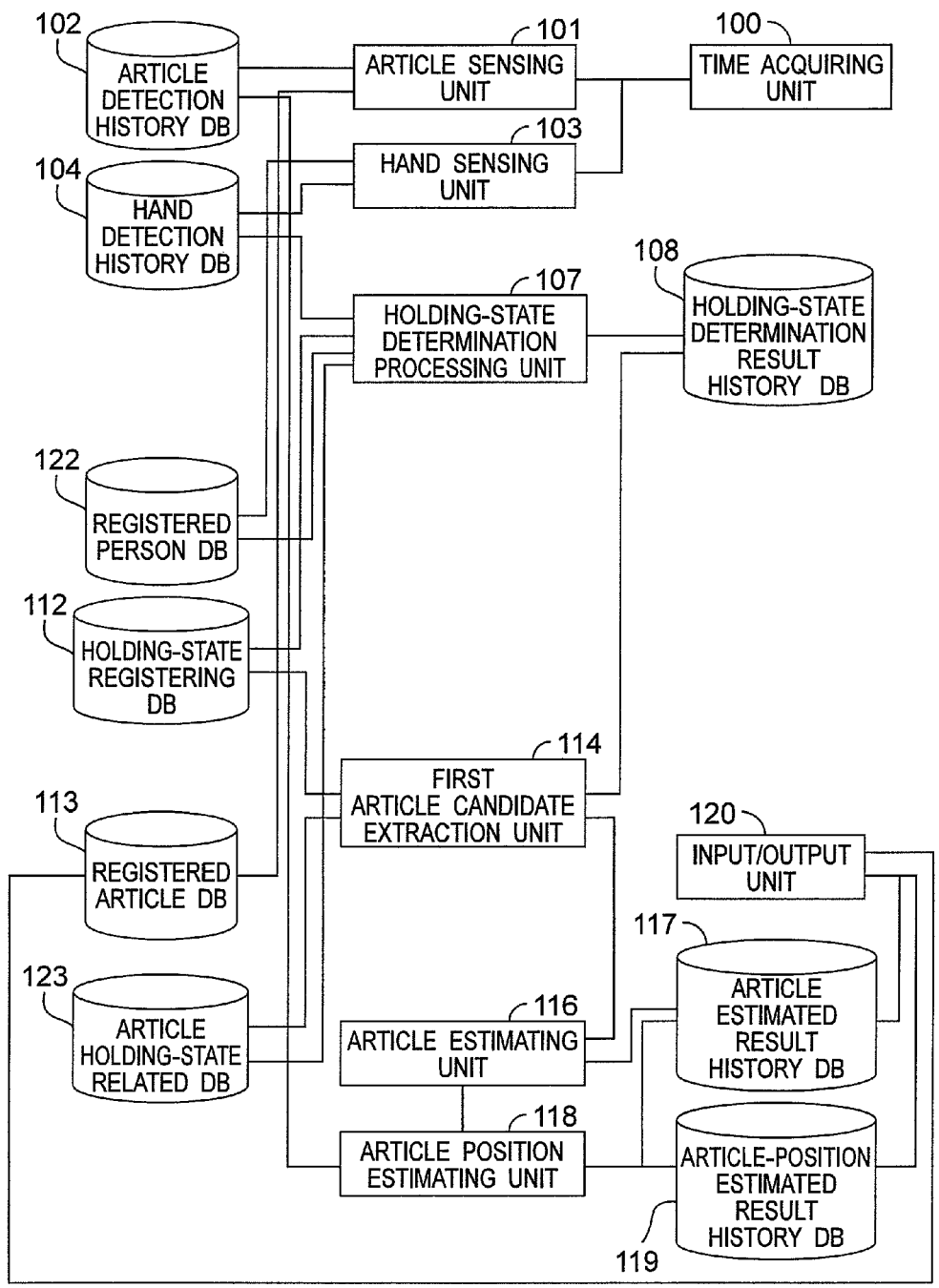
FIG. 44 is a functional block diagram relating to an article estimating apparatus and an article position estimating apparatus in accordance with a modified example of the first embodiment of the present invention.

In the first embodiment, an article that is selected as the first article candidate and the second article candidate in an overlapped manner is estimated by the article estimating unit 116 as an object article. However, the arrangement is not limited thereto, and as a simplified structure for the first embodiment, the second article candidate extraction unit may be omitted so that the first article candidate, as it is, may be estimated by the article estimating unit 116 as an object article. Referring to FIG. 44, the following description will discuss operations of the first article candidate extraction unit 114 and the article estimating unit 116 relating to such a modified example of the first embodiment.

<<First Article Candidate Extraction Means>>

The first article candidate extraction unit 114 refers to the holding-state determination result history database 108 and the scene determination result history database 110 so that by comparing the holding states of the respective scenes, the candidate information for an object article is extracted from data registered in the article holding-state related database 123.

Among pieces of information of the results of the holding-state determination of the holding-state determination result history database 108 in the same time zone as each of the times of the respective scenes of "the taking-up scene", "the transporting scene" and "the putting-down scene" of the scene determination result history database 110, the first article candidate extraction unit 114 defines the holding state that has been determined the most as the holding state in the corresponding scene. For example, in the case where information 2401 of the scene determination result and information 2402 of the holding-state determination result, as shown in FIG. 43, are obtained, the holding state of "the taking-up scene" is represented by ID=C002, the holding state of "the transporting scene" is represented by ID=C006 and the holding state of "the putting-down scene" is represented by ID=C002.

The first article candidate extraction unit 114 compares the pieces of information of the results with the holding states registered in the article holding-state related database 123 so that an article in which all the correlations between the scene and the holding state are the same is extracted as information of the candidate of the object article by the first article candidate extraction unit 114.

FIG. 25 shows an example of the article holding-state related database 123. In the article holding-state related database 123, ID information 2501 of articles, information 2502 of item names and information 2503 of the holding states of the article are registered for each of the scenes. The ID information 2501 of the article is commonly used in the registered article database 113. Moreover, the holding state is not necessarily determined uniquely, and with respect to the article that is held in a plurality of holding states, a plurality of holding states are registered.

In the case of the example shown in FIGS. 43 and 25, ID=A001 is extracted as a candidate for the object article.

<<Article Estimating Means>>

The article estimating unit 116 uses pieces of information of the article commonly extracted by the first article candidate extraction unit 114 as information as the estimation results of the object article. The article estimating unit 116 registers the information as the estimation result in the article estimation result history database 117.

In the above-mentioned example, the article put at the position (270, 50) is estimated by the article estimating unit

116 as ID=A001 from the information as the extraction results by the first article candidate extraction unit 114.

Figures 45, 46:
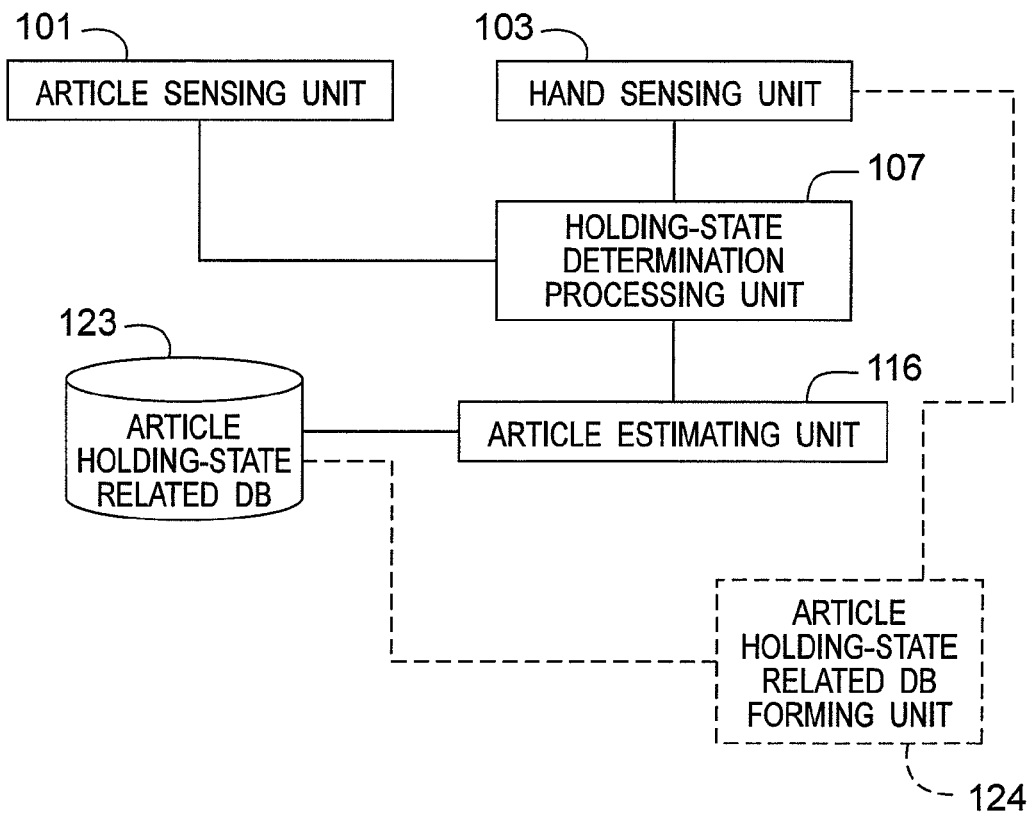
FIG. 45 is a view showing an example of an article estimated result history database in the modified example of the first embodiment of the present invention.
FIG. 46 is a functional block diagram relating to the article estimating apparatus in the modified example of the first embodiment of the present invention.

FIG. 45 shows an example of the article estimation result history database 117. In the article estimation result history database 117, information 4401 of points of time, positional information 4402 and information 4403 relating to the article estimation result are registered. This example indicates that the article, put at the position (270, 50) at time t99, is estimated by the article estimating unit 116 as ID=A001.

Figure 48:
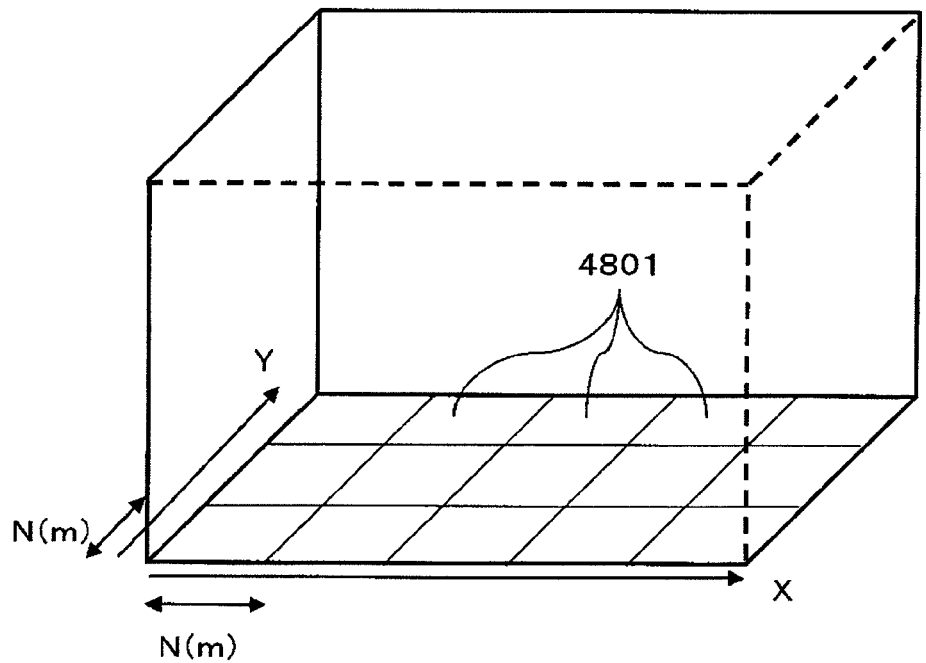
FIG. 48 is an explanatory view showing an example of environmental space that is area-divided in the first embodiment of the present invention.

Next, the following description will discuss processes in which sensing control unit 1220 is not used. Depending on the positional relationship between the camera and the person, the positional relationship between the hand and the article viewed from the camera is sometimes different from an actual positional relationship between the hand and the article. For this reason, the environmental space 91 is divided into a plurality of areas, and the article holding-state related database 123 may be formed for each of the divided areas. At this time, the article holding-state related database 123 is formed based upon the setting position of the camera. As an example of the area division, the environmental space 91 may be divided into square meshes with intervals N(m) in the X-axis direction and the Y-axis direction. FIG. 48 shows an example of the environmental space 91 divided into areas. Reference numeral 4801 in FIG. 48 shows each of the divided square areas. Note that the area divisions are made only in the X-axis direction and the Y-axis direction since the person can move only on the XY plane (floor face) in the environmental space 91.

Next, the following description will discuss a setting method for the interval dimension N(m) of each of the areas 4801. In the case where a camera is attached to a low ceiling, since changes in appearances of the hand and an article relative to the moving person are large, N is preferably set to a relatively small value. Moreover, in the case where a camera is attached to a high ceiling, since changes in appearances of the hand and an article relative to the moving person are small, N is preferably set to a relatively large value.

Moreover, depending on the orientation of the person, the positional relationship between the hand and an article viewed through the camera is sometimes different from the actual positional relationship between the hand and the article. For this reason, an article holding-state related database 123 corresponding to 360/θ in the scale of θ degrees may be formed (in each of the areas). In this case, the article holding-state related database 123 is formed based upon the setting position of the camera. Note that, the direction of the person may be defined, for example, as the orientation of the advancing direction of the person. The advancing direction of the person can be estimated, for example, by using the history of the detected position of a tag.

Moreover, when it is difficult to form the article holding-state related database 123 for each of the areas or the orientations of the person, a method may be proposed in which three-dimensional shape models between the hand in a holding state of an article and the article are preliminarily formed.

FIG. 12A is described as the three-dimensional shape model at the time when the person grabs a glass. In this case, the three-dimensional shape model forms rules based on which the article holding-state related database 123 indicating the positional relationship between the hand and an article viewed through the camera is formed, using pieces of information of the hand position, the setting position of the camera and the shooting direction of the camera.

In this case, the three-dimensional shape model can be formed, for example, by using a CAD or the like. By using the three-dimensional model, the article holding-state related database 123, which shows appearances of the hand and the article, can be preliminarily formed based upon the position (orientation) of the person and the camera setting position. For example, FIG. 12A shows a state in which the position (orientation) of the person is (x, y, z, θ)=(0, 0, 0, 0) and the camera setting position is (x, y, z, angle of elevation, azimuth) =(100, 0, 100, 3π/2, π/2). FIG. 12B shows a state in which the position (orientation) of the person is (x, y, z, θ)=(0, 0, 0, 0) and the camera setting position is (x, y, z, angle of elevation, azimuth)=(−100, 0, 100, π/2, π/2). In this manner, since the positional relationship between the hand and the article is calculated in accordance with the position (orientation) of the person at each point of time, it becomes unnecessary to preliminarily form the article holding-state related database 123 for each of the areas or the orientations of the person.

Moreover, it may be preliminarily designed which position the prepared three-dimensional shape model is located relative to the position (orientation) of the person. In the case where the camera is prepared as a sensor that outputs the coordinates of the foot position, an article held by the hand is supposed to be raised higher in the height (Z-coordinate) relative to the outputted position of the person. For example, when the position (orientation) of the person is given as (x, y, z, θ)=(0, 0, 0, 0), the prepared three-dimensional shape model is set to be located at a position (0, 0, +50, 0) relative to the position of the person. Thus, the positional relationship between the hand and the article viewed through the camera based upon the position (orientation) of the three-dimensional shape model and the setting position of the camera.

The article holding-state related database 123 can be formed in an article holding-state related database forming unit 124. For example, a structure in which an article holding-state related database 123 is added to a structural example in FIG. 46 required in the minimum for estimating an article is indicated by a dotted line. The article holding-state related database 123 is preliminarily formed by the article holding-state database forming unit 124, and upon estimating an article, only the article holding-state related database 123 may be used.

The holding-state related database forming unit 124 maintains a three-dimensional shape model that provides rules for forming the article holding-state related database 123 indicating the positional relationship between the hand and an article viewed through the camera for each of articles.

For example, the holding-state related database forming unit 124 acquires the position (orientation) of the person from the camera 301, and based upon the setting position of the camera 301 preliminarily obtained and the position (orientation) of the person acquired by the camera 301, forms the article holding-state related database 123. Therefore, in a flow chart of FIG. 47 corresponding to the structure of FIG. 46, after the position (orientation) of the person has been acquired from the camera 301 as a hand sensing process, in the preliminary stage of the flow chart of FIG. 47, the article holding-state related database 123 is formed by the article holding-state related database forming unit 124, and processes of the flow chart of FIG. 47 are then executed.

Figure 47:
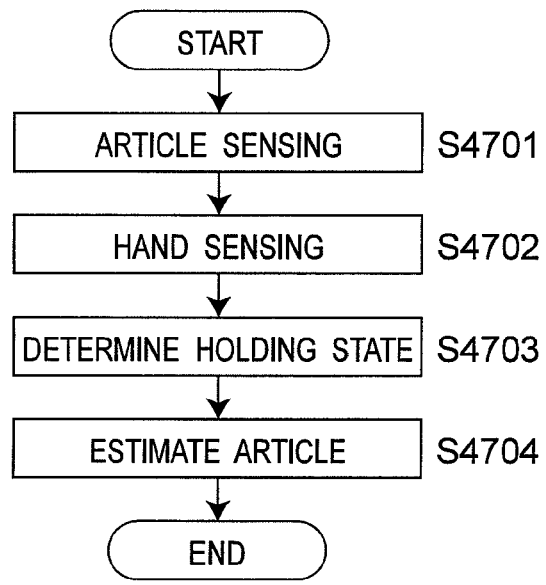
FIG. 47 is a flow chart describing a flow of processes in the article estimating apparatus of FIG. 46.

Note that, for example, the article holding-state related database forming unit 124 is illustrated in FIGS. 46 and 47, and this may be added to another structural drawing and flow chart in the same manner.

By using the structure of the first embodiment or the modified example thereof as described above, even in the case where one portion or the entire portion of an object article is concealed by another article such as a storage rack or equipment such as furniture and when a number of articles having the same shape are present, the holding state of the object article at the time when the person transports the object article is determined by the holding-state determination processing unit 107 so that the information of recognizing candidate of the object article can be estimated in a more focused manner. Further, by using the result, the position of the article can be estimated by using the first article candidate extraction unit 114 and the second article candidate extraction unit 115 or by using only the first article candidate extraction unit 114. Moreover, by determining the holding state of the article for each of the scenes by the scene determination unit 109 or the like, the article can be estimated more accurately.

Moreover, FIG. 46 shows a structural example required in the minimum for estimating the article.

An article estimating apparatus shown in FIG. 46 includes article sensing unit (article sensing unit) 101, hand sensing unit (hand sensing unit) 103, holding-state determination processing unit (holding-state determination processing unit) 107, article estimating unit (article estimating unit) 116 and an article holding-state related database (holding-state related DB) 123, and an article that is handled by a person can be estimated. Additionally, the functions of the respective components are the same as those described above.

Referring to FIG. 47, the following description will discuss a flow of processes of the article position estimating apparatus having the structure of FIG. 46.

In step S4701, the article sensing unit 101 detects pieces of information of positions of a plurality of articles, such as daily necessities or office supplies, located in the environmental space 91.

In step S4702, the hand sensing unit 103 detects information of the position of the hand of a person inside the environmental space 91.

In step S4703, the holding-state determination processing unit 107 acquires the positional relationship between the article and the hand based upon plurality of pieces of positional information of articles and positional information of the hand from the article sensing unit 101 and the hand sensing unit 103, and determines how the person is holding the article, or whether nothing is held by the person.

In step S4704, the article estimating unit 116 refers to the article holding-state related database 123, and estimates that an article having the holding state, determined by the holding-state determination processing unit 107 in step S4703, that is registered in the article holding-state related database 123 corresponds to the article held by the person.

Second Embodiment

In this embodiment, the following description will discuss circumstances in which the entire object article is concealed and in which the holding states of an article are different depending on persons.

Figure 32A:
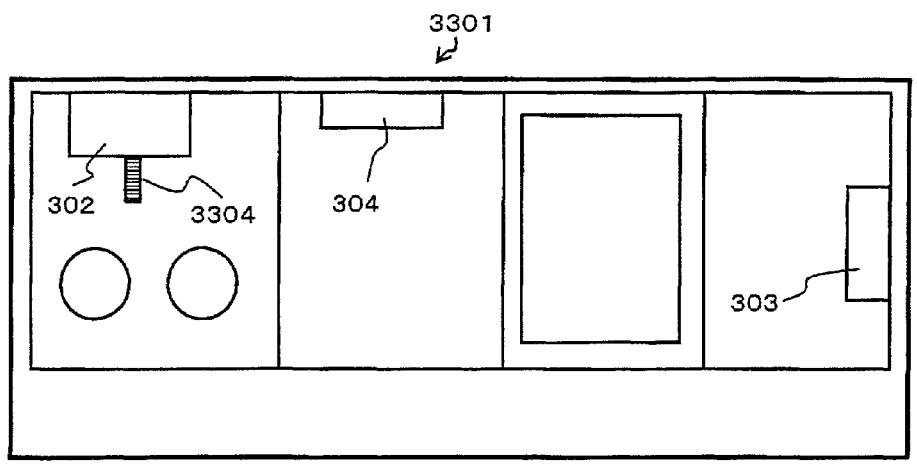
FIG. 32A is a view showing an example of an article state within environmental space in an article estimating apparatus and an article position estimating apparatus in accordance with a second embodiment of the present invention.
Figure 32B:
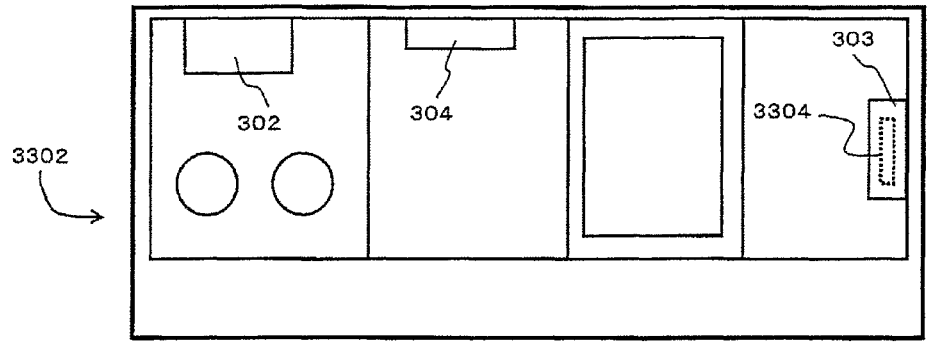
FIG. 32B is a view showing another example of an article state within environmental space in accordance with the second embodiment of the present invention.
Figure 32C:
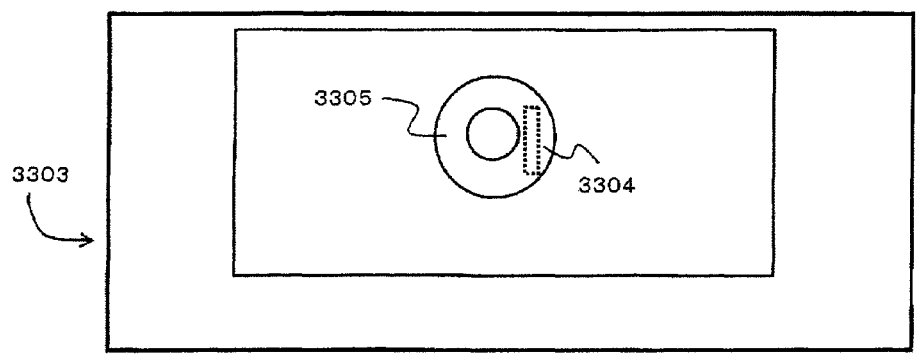
FIG. 32C is a view showing still another example of an article state within environmental space in accordance with the second embodiment of the present invention.

First, as shown in FIG. 32A, a fork 3304 is put on a storage rack 302 with one portion thereof being concealed. In the first circumstance, Hanako takes up this fork 3304 at time t11, transports and puts the fork at a position with the entire portion thereof being concealed by a storage rack 303 at time t99 (see FIG. 32B). In the second circumstance, Hanako takes up this fork 3304 at time t11, transports and puts the fork 3304 at a position with the entire portion thereof being concealed by a vase 3305 on a dining table at time t99 (see FIG. 32C). In FIG. 32, FIG. 32A shows a circumstance 3301 of the article at time t11, FIG. 32B shows a circumstance 3302 of the article at time t99 in the first circumstance, and FIG. 32C shows a circumstance 3303 at time t99 of the article in the second circumstance.

The following description will discuss only the different points from the aforementioned description, in the processes carried out in accordance with the entire flow of processes shown in FIG. 2.

FIG. 33 shows an example of an article detection history database 102 in which information of the detection results of the article sensing unit 101 is registered. At time t11, one article is detected; however, at time t99, all the articles are concealed so that no information of detection results is obtained.

FIG. 34 shows an example of information 3501 of the scene determination result and information 3502 of the holding-state determination result. Although the article has been transported up to time t99; however, since it is concealed by the storage rack 303 at last (time t92 and thereafter in this case), the holding-state determination processing unit 107 determines that nothing is held in the hand in this time zone. Consequently, no information is included in the information 3501 of the scene information result at time t92 and thereafter. Moreover, upon putting down the article, the article thus put down is concealed by the storage rack 303; therefore, since this action is not determined as "the putting-down scene" by the scene determination unit 109, no "putting-down scene" is registered in the information 3501 of the scene determination result.

In step S204 of the aforementioned entire flow of processes in FIG. 2, upon completion of "the putting-down scene", a process for estimating the article is started; however, in this case, since no "putting-down scene" is present, the flow, as it is, is not applicable, and instead of this, upon completion of "the transporting scene", the process for estimating the article is started. That is, the scene determination unit 109 is designed so that, in the case where "the taking-up scene" and "the transporting scene" are present, with no "putting-down scene" being present, upon completion of "the transporting scene", it is determined that "the putting-down scene" of the article is completed in step S204, and starts a process for estimating the article in step S205 and thereafter.

In step S207 after step S206, in the case where information of the first article candidate is extracted by the first article candidate extraction unit 114 in step S207, the following processes are carried out.

First, in the case of the first circumstance, from the information 3502 of the holding-state determination result in FIG. 34, the holding state in "the taking-up scene" is represented by holding state ID=C004, and the holding state in "the transporting scene" is represented by holding state ID=C004. Since no "putting-down scene" is present, the first article candidate extraction unit 114 compares only "the taking-up scene" and "the transporting scene" with each other in step S207 so that information of a candidate for the object article is extracted. By referring to the article holding-state related database 123 shown in FIG. 25, ID=A009, A010, A011 are extracted by the first article candidate extraction unit 114 as pieces of information of the object article.

Next, in step S208, the second article candidate extraction unit 115 refers to the article detection history database 102 of FIG. 33 so that IDs=A009, A010 and A011 are extracted by the second article candidate extraction unit 115 as pieces of information of candidates for the object article. In this case, the position at which the object article has been put is concealed by the storage rack 303, and since the position is unknown, it is supposed in this case that the article is put at the center-of-gravity position (290, 50) of the storage rack 303 that is assumed to conceal the object article. Therefore, the second article candidate extraction unit 115 refers to databases on demand, and extracts the position of the hand at time 91 that is the last information of "the transporting scene" of information 3502 of the holding-state determination result in FIG. 34 to find the fact that the storage rack 303 is located at the extracted position so that the acquired center-of-gravity position (290, 50) of the storage rack 303 is extracted as information of the position of a candidate for the object article.

The following description will discuss a method for determining whether or not the article is concealed. In the case where, upon completion of "the transporting scene", no object article is detected near the position of the hand, the second article candidate extraction unit 115 determines that the object article is placed so as to be concealed by another article. In this example, upon completion of "the transporting scene", since the position' of the hand of the person is located at the position of the storage rack 303, the second article candidate extraction unit 115 can determine that the object article is concealed by the storage rack 303. Note that the center-of-gravity position of the storage rack 303 is recorded in the registered article database 113.

As a result, in step S209, the article estimating unit 116 estimates that the article placed at the position (290, 50) is any one of IDs=A009, A010 and A011 based upon information of candidates extracted by the first article candidate extraction unit 114 and information of candidates extracted by the second article candidate extraction unit 115, and registers IDs (IDs=A009, A010, A011 in this case) of the estimated articles in the article estimation result history database 117.

Moreover, in step S210, the article position estimating unit 118 refers to the article detection history database 102 of FIG. 8 and the article estimation result history database 117 of FIG. 27 so that the position of the article is estimated, and in this case, since the entire portion of the object article is concealed by the storage rack 303 leaving no data to be referred to the article detection history database 102, the information of the result of the article estimated result history database 117 is adopted so that the information of the estimated result that any one of IDs=A009, A010 and A011 is present at the position (290, 50).

By using the above-mentioned arrangement, even under a circumstance in which the object article is entirely concealed, the article and the position thereof can be estimated.

<<Database Switching Means>>

Next, in the case of the second circumstance, suppose that up to the processes (step S201 to S204) of the holding-state determination processing unit 107 and the scene determination unit 109, the same processes as those of the first circumstance are carried out to obtain the resulting information as shown in FIG. 34.

In this case, by preparing a plurality of article holding-state related databases 123 for each of places or persons, data to be referred to by the first article candidate extraction unit 114 can be switched by database switching unit 111 in accordance with each of places or persons to which or by which an object article is carried. More specifically, a switching is made by the database switching unit 111 at step S206 between data corresponding to the ID of a person registered in the scene determination result history database 110 and data corresponding to the place of the hand position registered as the moving track of the hand.

FIGS. 35A and 35B show an example of the article holding-state related database 123. In addition to information of article IDs, information of item names and information of holding states of the articles for each of the scenes, information 3601 of IDs of persons and information 3602 of places are registered in the article holding-state related database 123. With respect to the information 3601 of IDs of persons and the information 3602 of places, IDs of persons and places to which the respective data are applied or names are preliminarily registered in the article holding-state related database 123. That is, the ID of a person and the information of a place (where the person is present) are detected by the sensing unit 101. Moreover, the article holding-state related database 123 shown in FIGS. 35A and 35B is supposed to be preliminarily prepared, and is not recorded by the respective unit on demand. In the case where the ID and place of the person are determined by the sensing unit 101, database corresponding to the determined ID and place of the person is selected among the article holding-state related databases 123 of FIGS. 35A and 36B, and candidates for the article can be extracted.

FIG. 35A shows one portion of first data 3603 in the case of person's ID=B001 and place=kitchen, and FIG. 35B shows one portion of second data 3604 in the case of person's ID=B001 and place=living room or dining room.

In the example shown in FIGS. 35A and 35B, the holding states of the article of article ID=A009 (knife) are different from each other between the first data 3603 and the second data 3604. This is because, in the kitchen, upon washing the knife, the holding state C004 in which the center portion of the grip of the knife is held is sometimes employed, and therefore C004 is registered in the article holding-state related database 123 in the first data 3603. However, in the living room or dining room, only the holding state C003 in which the edge portion of the grip of the knife is held is employed so as to avoid danger, therefore only C003 is registered in the article holding-state related database 123 in the second data 3604.

Moreover, although not shown in the figures, the holding states are considered to be different depending on persons, such as adults and children, and in such cases, different holding states may be registered in the holding-state related database 123 in the same manner.

In the second circumstance, since a person is carrying the object article to a dining table, the database switching unit 111 selects the second data 3604 of FIG. 35B in accordance with this place (dining table). From FIG. 34, the holding state of "the taking-up scene" corresponds to ID=C004, the holding state of "the transporting scene" corresponds to ID=C004. Since no "putting-down scene" exists, the first article candidate extraction unit 114 only compares "the taking-up scene" and "the transporting scene" in step S207 so that information of candidates for the object article is extracted. When the first article candidate extraction unit 114 refers to the data 3604 of the article holding-state related database 123 shown in FIG. 35B to search for the article of ID=C004, IDs=A010 and A011 are extracted by the first article candidate extraction unit 114 as pieces of information of candidates for the object article.

In step S208, in the same manner as in the first circumstance, by referring to the article detection history database 102 of FIG. 33 by using the second article candidate extraction unit 115, IDs=A009, A010 and A011 are extracted as pieces of information as candidates for the object article.

As a result, in step S209, based upon the information of candidates extracted by the first article candidate extraction unit 114 and the information of candidates extracted by the second article candidate extraction unit 115, the article estimating unit 116 estimates which one of IDs=A010 and A011 corresponds to the article placed at the position (290, 50), and registers the resulting information in the article estimation result history database 117. Moreover, in step S210, the article position estimating unit 118 refers to the article detection history database 102 and the article estimation result history database 117 to estimate the position of the article, and obtains information of the estimated result that any one of IDs=A010 and A011 is present at the position (290, 50).

By using the above-mentioned arrangement, a plurality of article holding-state related databases 123 are registered for each of places or persons, and depending on the place or person to which or by which an object article is carried, the data to be referred to by the first article candidate extraction unit 114 are switched by the database switching unit 111 so that the article and its position can be estimated more accurately.

Third Embodiment

In this embodiment, a description will be given on a method for updating the article holding-state related database 123.

Figure 36A:
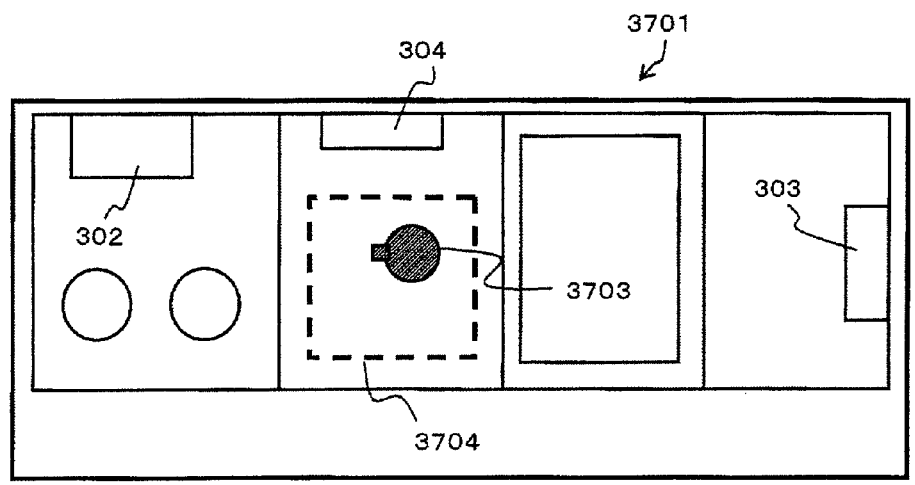
FIG. 36A is a view showing an example of an article state within environmental space in an article estimating apparatus and an article position estimating apparatus in accordance with a third embodiment of the present invention.
Figure 36B:
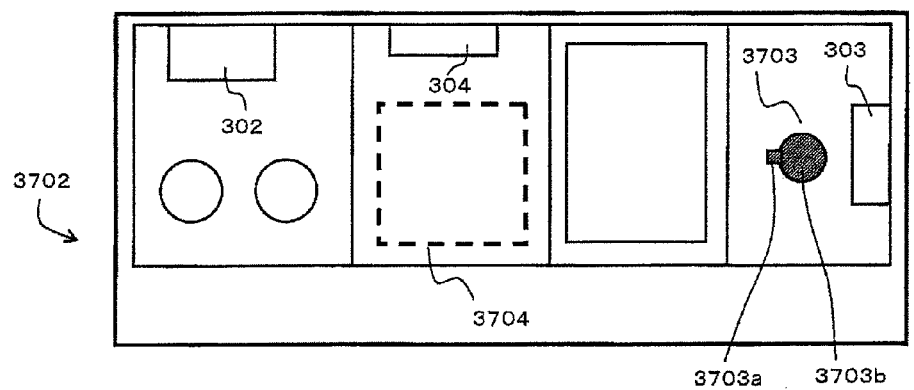
FIG. 36B is a view describing an example of an article state within the environmental space in the third embodiment of the present invention.

First, as shown in FIG. 36A, suppose that a mug 3703 is placed in front of the monitor 304. It is supposed that at time t11, Hanako takes up this mug, carries and puts the mug in front of the storage rack 303 at time t99 as shown in FIG. 36B. At this time, suppose that the mug is held by the hand like an ordinary glass, not at the handle portion 3703a of the mug 3703, but at the main body portion 3703b of the mug 3703. Moreover, a radio IC tag sensor 3704 serving as, for example, article sensing unit 101 is placed in front of the monitor 304. FIG. 36A shows a state 3701 of the article at time t11, and FIG. 36B shows a state 3702 of the article at time t99.

Figure 37:
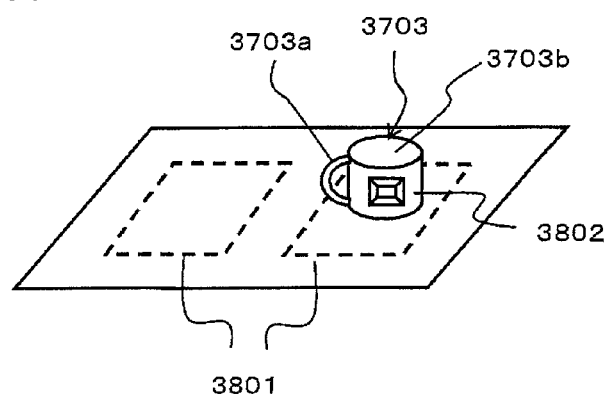
FIG. 37 is a view describing a processing of a radio IC tag sensor in the third embodiment of the present invention.

Referring to FIG. 37, the radio IC tag sensor 3704 will be described. A reading antenna 3801 is placed so as to set a detection area for an article within its detection range. A radio IC tag 3802 is attached to the article. When the article with the radio IC tag attached thereto is put within the detection range of the reading antenna 3801, the information of the radio IC tag 3802 of the article is read by the reading antenna 3801 so that the position of the article can be detected. In this case, however, since it is unknown which portion of the detection range of the reading antenna 3801 the article is present, the precision of the detected position is dependent on the size of the detection range of the reading antenna 3801. Moreover, by preliminarily registering ID information of each of articles to be handled in the radio IC tag 3802, it becomes possible to identify what the detected article is.

The processes thereafter are carried out in accordance with the entire flow chart of processes shown in FIG. 2.

In step S201, since the radio IC tag sensor 3704 is installed as described above, the article sensing unit 101 makes it possible to uniquely identify the ID of the article. FIG. 38 shows an example of the article detection history database 102 in which information of the detection result is registered. At time t11, one article is detected, and identified as a single article corresponding to article ID=A004.

<<Database Updating Means>>

Upon completion of "the putting-down scene" in step S204 in the entire flow of processes in FIG. 2, a process for estimating the article is started. In this case, as described above, since the object article is identified as one article by the article sensing unit 101, a process of database updating unit 121 is carried out in step S205.

FIG. 39 shows an example of information 4001 of the scene determination result and information 4002 of the holding-state determination result. Consequently, the holding state of "the taking-up scene" corresponds to holding-state ID=C006, the holding state of "the transporting scene" corresponds to holding-state ID=C006, and the holding state of "the putting-down scene" corresponds to holding-state ID=C006.

Figures 40, 41:
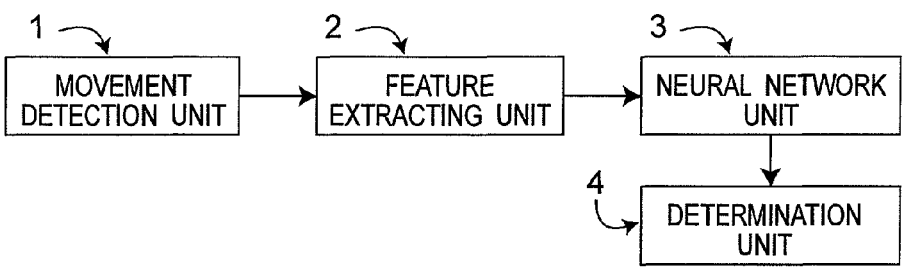
FIG. 40 is a view showing an example of an updated article holding-state related database in the third embodiment of the present invention.
FIG. 41 is an explanatory view of a conventional object recognizing device.

Then, the first article candidate extraction unit 114 refers to the article holding-state related database 123 so that "holding-state ID=C006" is added to the holding state of "the taking-up scene", "holding-state ID=C006" is added to the holding state of "the transporting scene", and "holding-state ID=C006" is also added to the holding state of "the putting-down scene", in the item of the holding state of the article (mug 2) corresponding to article ID=A004. Relative to the example of the article holding-state related database 123 shown in FIG. 25, FIG. 40 shows the result of the update of the article holding-state related database 123 by the database updating unit 121.

In the case where the corresponding holding state has been registered in the article holding-state related database 123 prior to the update, no change is made in the contents of the article holding-state related database 123 before and after the update by the database updating unit 121. However, for example, the number of updates carried out by the database updating unit 121 may be counted by the database updating unit 121 itself, and based upon the number of times, weighting process are carried out by the database updating unit 121 so that, with reference to the information of the weighting processes upon carrying out the article estimating process, the tendency of the carrying way of the person may be reflected to the estimation of the article.

The processes thereafter are carried out in the same manner as in the aforementioned examples.

By using the arrangement described above, the article holding-state related database 123 is properly updated by the database updating unit 121 so that the article and its position can be estimated more accurately.

The above-mentioned unit and databases except for the sensing unit can be respectively functioned by a computer so as to be utilized as an article estimating program or an article position estimating program. For example, a computer program having the steps of the above-mentioned respective flows of the processes may be readably stored in a recording medium such as a storage device (hard disk or the like), and the computer program may be read by a temporary storage device (semiconductor memory or the like) of a computer and stored therein, and executed by using a CPU. Thus, by carrying out the aforementioned operations or processes, it becomes possible to obtain the same functions and effects as those in the article estimating apparatus or the article position estimating apparatus.

By properly combining the arbitrary embodiments of the aforementioned various embodiments, the effects possessed by the embodiments can be produced.

INDUSTRIAL APPLICABILITY

In the article estimating apparatus and article position estimating apparatus, as well as the article estimating method and the article estimating program, in accordance with the present invention, by determining a holding state of an article carried by a person, when the article, such as any of daily necessities or office supplies, that are handled by a user, is transported in environmental space, it becomes possible to estimate recognizing candidates for the object article in a focused manner, and the article estimating unit is further allowed to estimate the article by using the resulting information so that it also becomes possible for a person to further estimate the position of the article by using the article estimating unit. This method is effectively applicable to an article estimating apparatus, an article position estimating apparatus and an article position estimating method, as well as an article estimating program, that are used when a person searches for the position of a desired article. This method is also applied to the entire services and applications that utilize the positions of articles.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An article estimating apparatus comprising:
   an article sensing unit that detects information of positions of a plurality of articles located in environmental space;
   a hand sensing unit that detects information of a position of a hand of a person that exists in the environmental space;
   a holding-state determination processing unit that determines a positional relationship between the information of the position of the article and the information of the position of the hand, respectively detected by the article sensing unit and the hand sensing unit, as a holding state of the article by the hand; and
   an article estimating unit that estimates an article whose ID corresponds to the information of the holding state determined by the holding-state determination processing unit as the article held by the person, based upon a holding-state registering database in which the holding state of each article by the person is registered as a positional relationship between the article and the hand of the person, for each ID of the article.

2. An article estimating apparatus comprising:
   an article sensing unit that detects ID information of a plurality of articles located in environmental space and information of positions of the articles so as to register the detected information in an article detection history database;
   a hand sensing unit that detects ID information of a person existing in the environmental space and information of a position of a hand of the person so as to register the detected information in a hand detection history database;
   a holding-state determination processing unit that determines a holding state of the article by the hand based upon a positional relationship between the positional information of the article and the positional information of the hand, respectively detected by the article sensing unit and the hand sensing unit and registered in the article detection history database and the hand detection history database, so as to register information of the determined holding state in a holding-state determination result history database for each of IDs of the articles;
   a first candidate article extraction unit that extracts an ID of an article corresponding to the information of the holding state acquired by the holding-state determination processing unit, from a holding-state registering database in which the holding state of the article by the person is registered as a positional relationship between the article and the hand of the person for each of IDs of the articles, as a first candidate article; and
   an article estimating unit that estimates the first candidate article extracted by the first article candidate extraction unit as an article that is being carried by the person.

3. An article estimating apparatus comprising:
   an article sensing unit that detects ID information of a plurality of articles located in environmental space and information of positions of the articles so as to register the detected information in an article detection history database in association with information of time at which the information is detected;
   a hand sensing unit that detects ID information of a person existing in the environmental space and information of a position of a hand of the person so as to register the detected information in a hand detection history database in association with information of time at which the information is detected;
   a holding-state determination processing unit that determines the holding state of the article by the hand, or whether or not no article is held by the hand, based upon a positional relationship between the positional information of the article and the positional information of the hand, respectively detected by the article sensing unit and the hand sensing unit, and registered in the article detection history database and the hand detection history database, so as to register information of the determination result in a holding-state determination result history database in association with information of time at which the respective pieces of information are registered in the article detection history database and the hand detection history database in association with the pieces of information respectively detected by the article sensing unit and the hand sensing unit;
   a first article candidate extraction unit that extracts an ID of the article corresponding to the information of the holding state acquired by the holding-state determination processing unit from a holding-state registering database in which the holding state of the article by the person is registered as a positional relationship between the article and the hand of the person for each of IDs of the articles, as a first candidate article;
   a scene determination unit that refers to the holding-state determination result history database to acquire information of time section which includes a point of time at which the holding state of the article is determined;
   a second article candidate extraction unit that refers to the hand detection history database to acquire the position of the hand in the time information immediately before the time section acquired by the scene determination unit, and that also refers to the article detection history database based upon the acquired information of the position of the hand and the time information immediately before the time section, so as to extract a second candidate article that is present at an original position where the article is placed prior to the taking-up and transporting states of the article with the hand by the person; and
   an article estimating unit that estimates an article that is in common with the first candidate articles extracted by the first article candidate extraction unit and the second candidate articles extracted by the second article candidate extraction unit, as an article being carried by the person.

4. The article estimating apparatus according to claim 2, wherein at least one of the article sensing unit and the hand sensing unit includes an image sensor that picks up image information including the articles located in the environmental space and the hand of the person, and an image recognizing unit that carries out an image recognizing process based upon the image information picked up by the image sensor, and
   the image recognizing unit has either a function as the article sensing unit that detects ID information of the articles and the positional information of the articles so as to register the detected information in the article detection history database, or a function as the hand sensing unit that detects ID information of the person and the positional information of the hand of the person so as to register the detected information in the hand detection history database.

5. The article estimating apparatus according to claim 3, wherein the scene determination unit refers to the hand detection history database, and based upon positional information of the hand and information of time at which the positional information of the hand is detected in the acquired information of the time section, calculates an amount of movement of the hand per unit time so that a plurality of pieces of information of time sections in which the calculated amount of movement of the hand becomes a value that is a predetermined threshold value or less are extracted, and determines information of a time section corresponding to earliest time information among the extracted time sections as a taking-up scene of the article, and also determines information of a time section corresponding to latest time information among the extracted time sections as a putting-down scene of the article, with a time section between the taking-up scene of the article and the putting-down scene of the article being determined as a transporting scene of the article, so as to register results of the determination in a scene determination result history database;

an article holding-state related database is prepared in which the holding state of the article by the person is registered for each ID information of the articles and the information of the holding state at time when the person transports the article is registered for each of the scenes, as positional information between the article and the hand of the person; and the first article candidate extraction unit extracts an article whose holding state determined by the holding-state determination processing unit in the scene determined by the scene determination unit, is registered, among articles registered in the article holding-state related database, in the scene registered in the scene determination result history database, as a candidate article.

6. The article estimating apparatus according to claim 5, further comprising:

a database switching unit that switches data to be referred to by the first article candidate extraction unit, between the holding-state registering database and the article holding-state related database, in accordance with the person transporting the article by the hand, or a place to which the person is transporting the article by the hand.

7. An article position estimating apparatus comprising:
the article estimating apparatus according to claim 2; and
an article position estimating unit that refers to the article detection history database so that information of a position of an ID of the article corresponding to the ID information of the article estimated by the article estimating unit is estimated as an estimated position.

8. The article position estimating apparatus according to claim 7, further comprising:

an input/output unit that receives a request for retrieving the article, and that outputs information of the position of the article corresponding to ID information of the article relating to the request for retrieving, in the ID positional information of the article estimated by the article position estimating unit.

9. An article estimating method comprising:
detecting information of positions of a plurality of articles located in environmental space by using an article sensing unit;
detecting information of a position of a hand of a person that exists in the environmental space by using a hand sensing unit;
determining a positional relationship between the information of the position of the article and the information of the position of the hand, respectively detected by the article sensing unit and the hand sensing unit, as a holding state of the article by the hand, by using a holding-state determination processing unit; and
estimating an article whose ID corresponds to the information of the holding state determined by the holding-state determination processing unit as the article held by the person, based upon a holding-state registering database in which the holding state of each article by the person is registered as a positional relationship between the article and the hand of the person, for each ID of the article, by using an article estimating unit.

10. An article estimating method comprising:
detecting ID information of a plurality of articles located in environmental space and information of positions of the articles by using an article sensing unit so as to register the detected information in an article detection history database;
detecting ID information of a person existing in the environmental space and information of a position of a hand of the person by using a hand sensing unit so as to register the detected information in a hand detection history database;
determining a holding state of the article by the hand based upon a positional relationship between the positional information of the article and the positional information of the hand, respectively detected by the article sensing unit and the hand sensing unit and registered in the article detection history database and the hand detection history database by using a holding-state determination processing unit, so as to register information of the determined holding state in a holding-state determination result history database for each of IDs of the articles, by using the holding-state determination processing unit;
extracting an ID of an article corresponding to the information of the holding state acquired by the holding-state determination processing unit, from the holding-state registering database in which the holding state of the article by the person is registered as a positional relationship between the article and the hand of the person for each of IDs of the articles, as a first candidate article by using a first article candidate extraction unit; and
estimating the first candidate article extracted by the first article candidate extraction unit as an article that is being carried by the person, by using an article estimating unit.

11. An article estimating method comprising:
detecting ID information of a plurality of articles located in environmental space and information of positions of the articles by using an article sensing unit so as to register the detected information in an article detection history database in association with information of time at which the information is detected;
detecting ID information of a person existing in the environmental space and information of the position of a hand of the person by using a hand sensing unit so as to register the detected information in a hand detection history database in association with information of time at which the detected information is detected;
determining the holding state of the article by the hand, or whether or not no article is held by the hand, based upon a positional relationship between the positional information of the article and the positional information of the hand, respectively detected by the article sensing unit and the hand sensing unit, and registered in the article detection history database and the hand detection history database, by using a holding-state determination processing unit, so as to register information of determination result in a holding-state determination result history database in association with information of time at which the respective pieces of information are registered in the article detection history database and the hand detection history database in association with the pieces of information respectively detected by the article sensing unit and the hand sensing unit;

extracting an ID of the article corresponding to the information of the holding state acquired by the holding-state determination processing unit from the holding-state registering database in which the holding state of the article by the person is registered as a positional relationship between the article and the hand of the person for each of IDs of articles by using a first article candidate extraction unit, as a first candidate article;

referring to the holding-state determination result history database by using a scene determination unit to acquire information of time section which includes a point of time at which the holding state of the article is determined;

referring to the hand detection history database by using a second article candidate extraction unit to acquire a position of the hand in time information immediately before the time section acquired by the scene determination unit, and also referring to the article detection history database based upon the acquired information of the position of the hand and the time information immediately before the time section, so as to extract a second candidate article that is present at an original position where the article is placed prior to the transporting of the article by the person; and estimating an article that is in common with the first candidate articles extracted by the first article candidate extraction unit and the second candidate articles extracted by the second article candidate extraction unit as an article being carried by the person, by using an article estimating unit.

12. A computer-readable recording medium including an article estimating program, which allows a computer to function as:

a holding-state determination processing means for determining a positional relationship between positional information of a plurality of articles located in environmental space, detected by an article sensing means, and positional information of a hand of a person existing in the environmental space, detected by a hand sensing means, as a holding state of the article by the hand; and an article estimating means for estimating an article whose ID corresponds to the information of the holding state determined by the holding-state determination processing means as the article held by the person, based upon a holding-state registering database in which the holding state of each article by the person is registered as a positional relationship between the article and the hand of the person, for each ID of the article.

13. A computer-readable recording medium including an article estimating program, which allows a computer to function as:

a holding-state determination processing means for, based upon a positional relationship between positional information of an article and positional information of a hand respectively registered in an article detection history database in which ID information of each of a plurality of articles located in environmental space, detected by an article sensing means, and information of positions of the articles are registered, and a hand detection history database in which ID information of each of persons existing in the environmental space and positional information of the hand of each person, detected by a hand sensing means, are registered, determining the holding state of the article by the hand, and registering the determined information of the holding state in a holding-state determination result history database for each of the IDs of the articles;

a first article candidate extraction means for extracting an ID of an article corresponding to the information of the holding state acquired by the holding-state determination processing means, as a first candidate article, from a holding-state registering database in which the holding state of the article by the person is registered as a positional relationship between the article and the hand of the person for each ID of the article;

an article estimating means for estimating the first candidate article extracted by the first article candidate extraction means as an article that is being carried by the person.

14. A computer-readable recording medium including an article estimating program, which allows a computer to function as:

a holding-state determination processing means for, based upon a positional relationship between positional information of an article and positional information of a hand respectively registered in an article detection history database in which ID information of each of a plurality of articles located in environmental space, detected by an article sensing means, and information of positions of the articles are registered in association with information of time at which the information is detected, and a hand detection history database in which ID information of each of persons existing in the environmental space and positional information of the hand of each person, detected by a hand sensing means, are registered in association with information of time at which the information is detected, determining the holding state of the article by the hand, or whether or not no article is held by the hand, and registering information of determination result in a holding state determination result history database in association with information of time at which the respective pieces of information are registered in the article detection history database and the hand detection history database in association with the pieces of information respectively detected by the article sensing means and the hand sensing means;

a first article candidate extraction means for extracting an ID of the article corresponding to the information of the holding state acquired by the holding-state determination processing means from the holding-state registering database in which the holding state of the article by the person is registered as a positional relationship between the article and the hand of the person for each of IDs of articles, as a first candidate article;

a scene determination means for referring to the holding-state determination result history database to acquire information of time section which includes a point of time at which the holding state of the article is determined;

a second article candidate extraction means for referring to the hand detection history database to acquire a position of the hand in time information immediately before the time section acquired by the scene determination means, and for also referring to the article detection history database based upon the acquired information of the position of the hand and the time information immediately before the time section, so as to extract a second candidate article that is present at an original position where the article is placed prior to the transporting of the article by the person; and an article estimating means for estimating an article that is in common with the first candidate articles extracted by the first article candidate extraction means and the second candidate articles extracted by the second article candidate extraction means as an article being carried by the person.

* * * * *